(12) United States Patent
Temple

(10) Patent No.: US 10,275,153 B2
(45) Date of Patent: Apr. 30, 2019

(54) MULTIDIRECTIONAL BUTTON, KEY, AND KEYBOARD

(71) Applicant: Will John Temple, Placerville, CA (US)

(72) Inventor: Will John Temple, Placerville, CA (US)

(*) Notice: Subject to any disclaimer, the term of this patent is extended or adjusted under 35 U.S.C. 154(b) by 145 days.

(21) Appl. No.: 15/444,297

(22) Filed: Feb. 27, 2017

(65) Prior Publication Data

US 2017/0168711 A1 Jun. 15, 2017

Related U.S. Application Data

(63) Continuation-in-part of application No. 14/539,977, filed on Nov. 12, 2014, and a continuation-in-part of application No. 13/068,817, filed on May 19, 2011.

(51) Int. Cl.
*G06F 3/0488* (2013.01)
*G06F 3/0489* (2013.01)
*G06F 3/0484* (2013.01)
*G06F 3/023* (2006.01)
G06F 3/02 (2006.01)

(52) U.S. Cl.
CPC ........ *G06F 3/04886* (2013.01); *G06F 3/0233* (2013.01); *G06F 3/0237* (2013.01); *G06F 3/0489* (2013.01); *G06F 3/04842* (2013.01); *G06F 3/04883* (2013.01); *G06F 3/0221* (2013.01)

(58) Field of Classification Search
CPC .... G06F 3/0221; G06F 3/0233; G06F 3/0237; G06F 3/04842; G06F 3/04883; G06F 3/04886; G06F 3/048; G06F 2200/1637; G06F 2203/04806; G06F 3/17; G06F 3/0346; G06F 3/0485; G09G 2340/0407; G09G 2340/045; G09G 2354/00; G09G 5/346; H04M 2250/12
See application file for complete search history.

(56) References Cited

U.S. PATENT DOCUMENTS

| | | | | |
|---|---|---|---|---|
| 5,189,632 A | * | 2/1993 | Paajanen | G06F 1/1616 455/556.2 |
| 7,199,786 B2 | * | 4/2007 | Suraqui | G06F 3/0237 345/168 |
| 8,627,233 B2 | * | 1/2014 | Cragun | G06F 3/04812 715/823 |
| 8,957,865 B2 | * | 2/2015 | Cieplinski | G06F 3/04883 345/173 |
| 9,100,494 B1 | * | 8/2015 | Rao | G06F 21/32 |
| 2004/0212617 A1 | * | 10/2004 | Fitzmaurice | G06F 3/0481 345/440 |
| 2004/0259599 A1 | * | 12/2004 | Okawa | G06Q 30/02 455/567 |
| 2005/0125570 A1 | * | 6/2005 | Olodort | G06F 1/162 710/15 |
| 2007/0180392 A1 | * | 8/2007 | Russo | G06F 3/0482 715/765 |
| 2007/0216659 A1 | * | 9/2007 | Amineh | G06F 3/0236 345/173 |

(Continued)

*Primary Examiner* — Dmitriy Bolotin

(57) ABSTRACT

A multidirectional button, key, or menu for use in a user interface of a computing device (10). An object of the user interface may include a software keyboard (14) on a display screen (16) comprised of multidirectional buttons, keys, or menus.

18 Claims, 13 Drawing Sheets

(56) References Cited

U.S. PATENT DOCUMENTS

| | | | | |
|---|---|---|---|---|
| 2007/0256029 | A1* | 11/2007 | Maxwell | G06F 3/0482 |
| | | | | 715/834 |
| 2008/0316183 | A1* | 12/2008 | Westerman | G06F 3/0416 |
| | | | | 345/173 |
| 2009/0327963 | A1* | 12/2009 | Mouilleseaux | G06F 3/0482 |
| | | | | 715/834 |
| 2009/0327964 | A1* | 12/2009 | Mouilleseaux | G06F 3/0482 |
| | | | | 715/834 |
| 2010/0171712 | A1* | 7/2010 | Cieplinski | G06F 3/04883 |
| | | | | 345/173 |
| 2010/0231537 | A1* | 9/2010 | Pisula | G06F 3/0481 |
| | | | | 345/173 |
| 2011/0074710 | A1* | 3/2011 | Weeldreyer | G06F 3/0481 |
| | | | | 345/173 |
| 2011/0080359 | A1* | 4/2011 | Jang | G06F 1/1643 |
| | | | | 345/173 |
| 2011/0102455 | A1* | 5/2011 | Temple | G06F 3/017 |
| | | | | 345/619 |
| 2011/0161809 | A1* | 6/2011 | Gilmour | G06F 1/1626 |
| | | | | 715/702 |
| 2011/0285651 | A1* | 11/2011 | Temple | G06F 3/04883 |
| | | | | 345/173 |
| 2012/0036556 | A1* | 2/2012 | LeBeau | G06F 3/048 |
| | | | | 726/3 |
| 2013/0063386 | A1* | 3/2013 | Kojima | G06F 3/03547 |
| | | | | 345/173 |
| 2013/0169579 | A1* | 7/2013 | Havnor | G06F 3/04883 |
| | | | | 345/173 |
| 2014/0362016 | A1* | 12/2014 | Matsuki | G06F 3/041 |
| | | | | 345/173 |
| 2015/0135108 | A1* | 5/2015 | Pope | G06K 9/00006 |
| | | | | 715/767 |

* cited by examiner

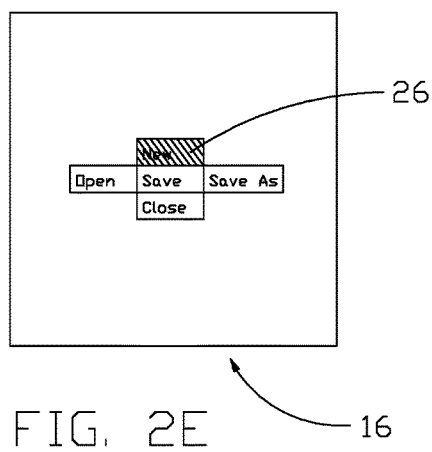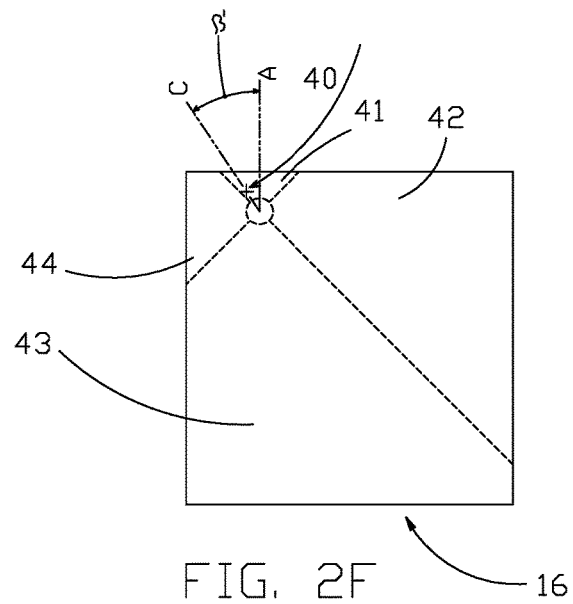
FIG. 2E
FIG. 2F
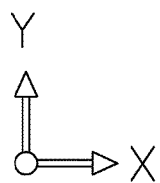

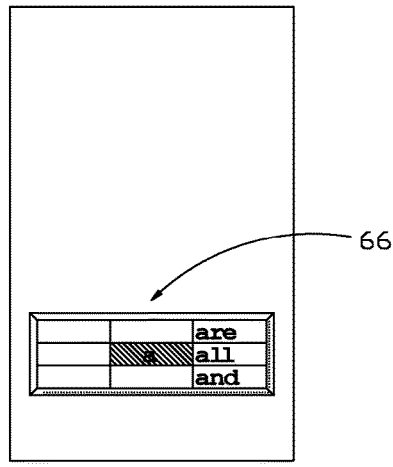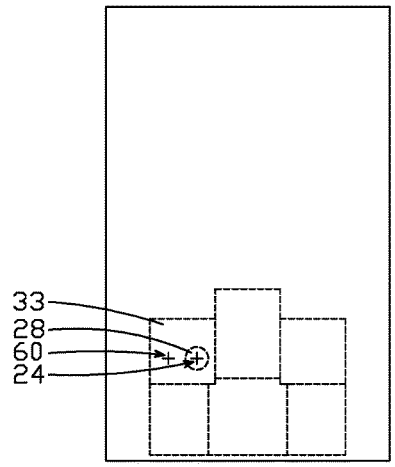
FIG 6A          FIG 6B
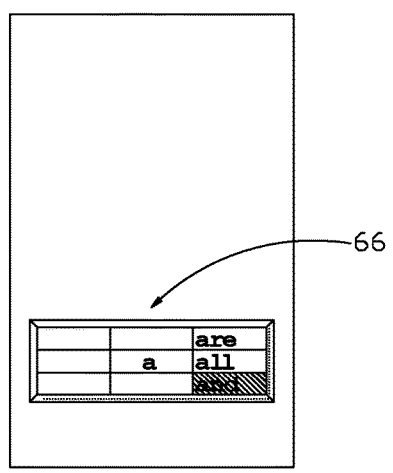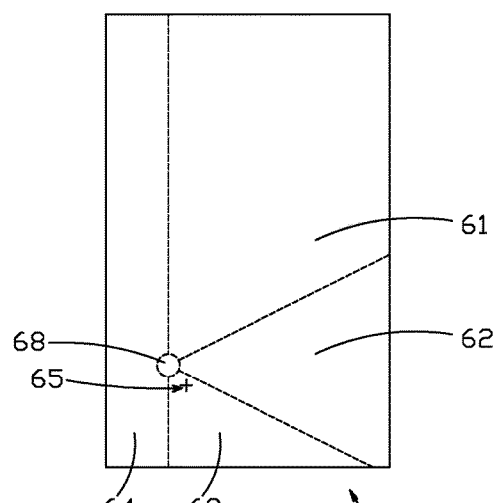
FIG 6C          FIG 6D

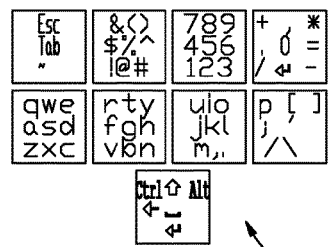
FIG. 7 — 70
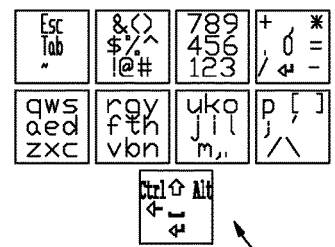
FIG. 8 — 80
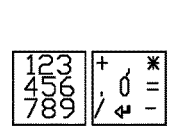
FIG. 9 — 90
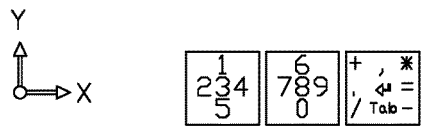
FIG. 10 — 100
FIG. 11 — 110
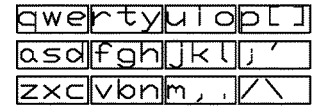
FIG. 16 — 160

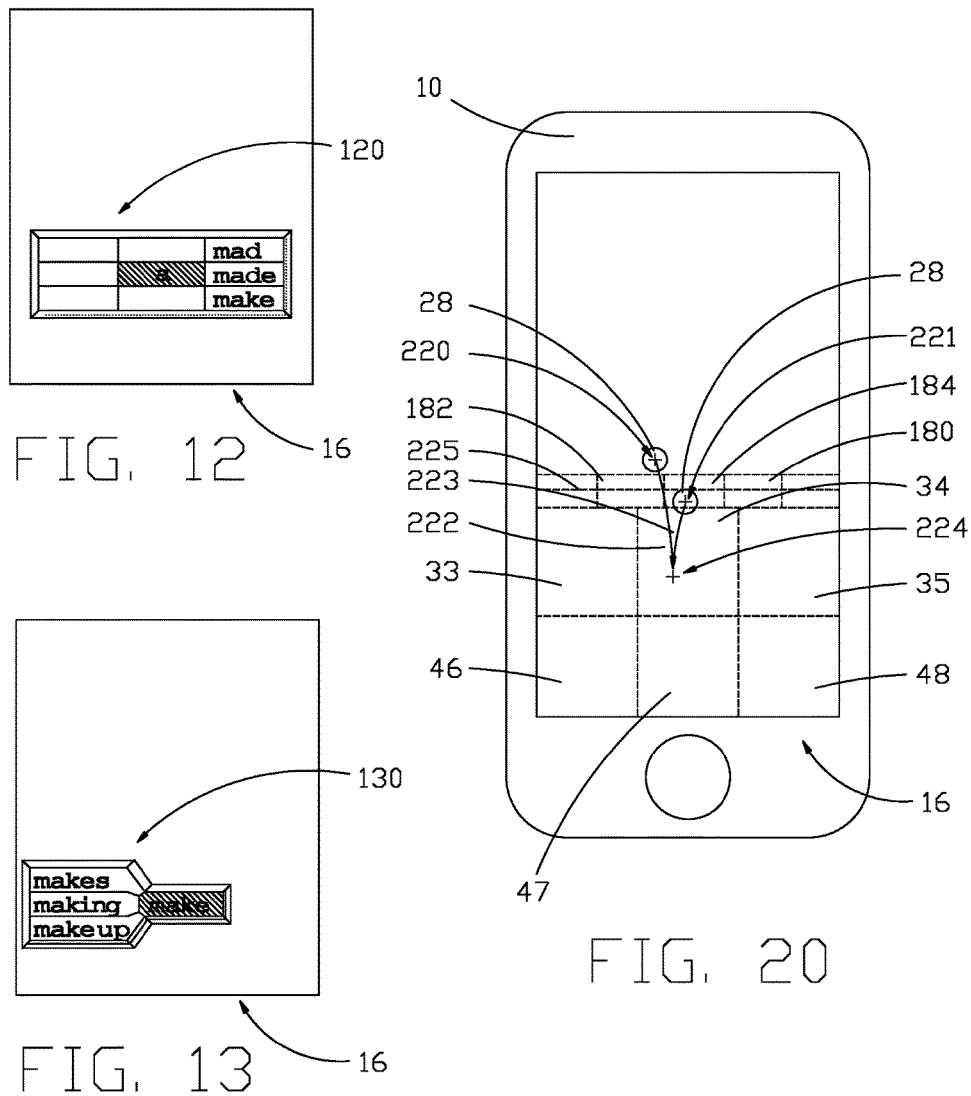

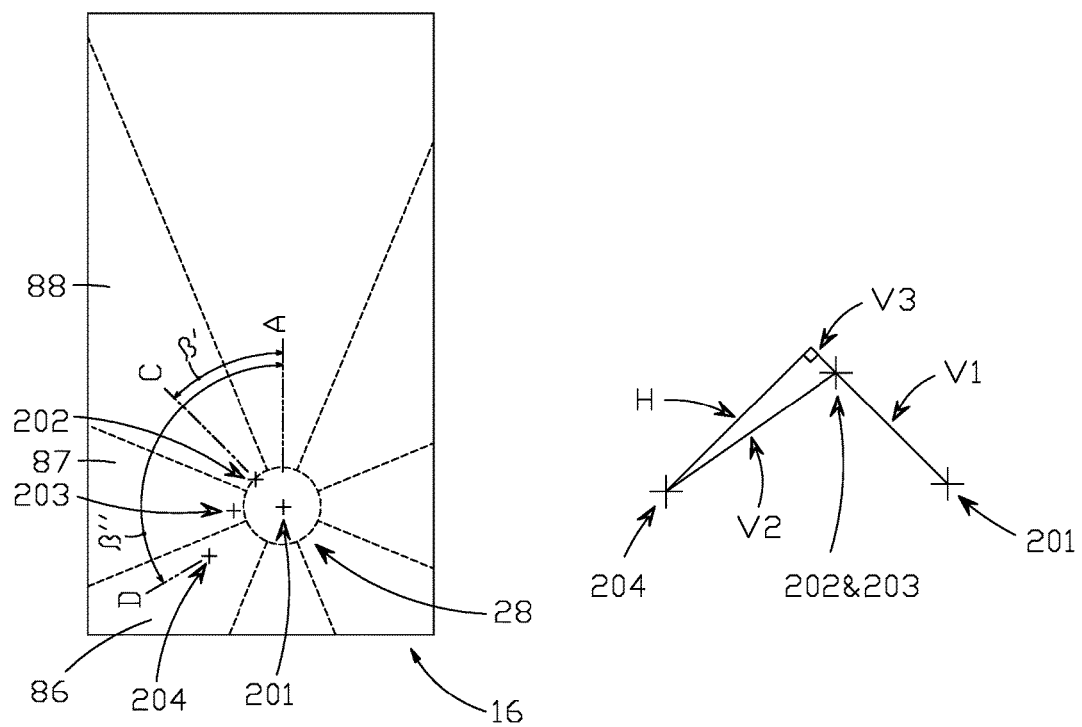
FIG. 14
FIG. 15
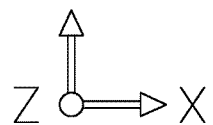

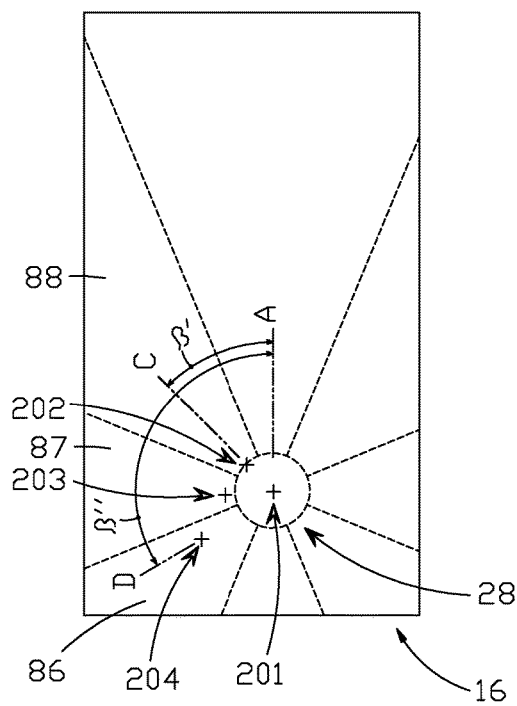
FIG. 20
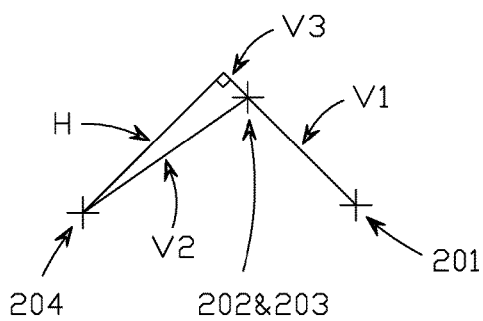
FIG. 21
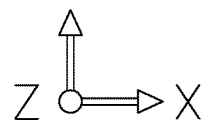

MULTIDIRECTIONAL BUTTON, KEY, AND KEYBOARD

CROSS-REFERENCE TO RELATED APPLICATIONS

This application is a continuation-in-part of application Ser. No. 13/068,817, filed 2011 May 19 by the present inventor; and this application is a continuation-in-part of application Ser. No. 14/539,977, filed 2014 Nov. 12 by the present inventor. Both of these applications are incorporated by reference.

BACKGROUND

Field of Invention

The disclosed embodiments and methods relate generally to user interfaces of computing devices and mobile electronic devices, and more particularly, to computing devices and mobile electronic devices that interpret user presses, releases, and motions of buttons, keys, or touch screen objects to determine device commands.

Description of Prior Art

Users of computing devices control the devices through a user interface. User interfaces have evolved from text based interfaces to graphical user interfaces, often referred to as GUI (Graphical User Interface). Graphical user interfaces generally use a pointer, controlled by a mouse, to select menus or buttons to input commands to the device. Menus act like a list of buttons and selecting a menu item requires placing the pointer over the menu item and then clicking on the menu item. Clicking on a menu item generally consists of pressing a mouse button and then, releasing the button. Menus are generally invoked by one of two methods. The first method is to move the pointer over a top menu item and click, whereby a submenu appears. The second method is to pop up a menu by clicking a mouse button, usually the right button. Menus are somewhat inefficient in that the pointer is usually at the top of the menu which usually consists of a vertical list of menu items. The user has to move the pointer half the distance of the list, on average, to choose a menu item. This is a farther distance than if the pointer were centered in the list. Both top level menus and buttons take up display screen real estate reducing the amount of program content that can be displayed. Menus are almost impossible to use without the user visually keeping track of the position of the pointer, and which menu item the pointer is over.

Radial menus were disclosed decades ago that solve some of the above listed menu problems. But their large display area and limit of just one initial radial menu may have been the reason they have not been widely adopted. Radial menus, sometimes referred to as "pie menus", were first disclosed by Don Hopkins ("The Design and Implementation of Pie Menus", December 1991, pp. 16-26, Dr Dobbs Journal). Some improvements to radial menus were taught by Driskell (U.S. Pat. No. 5,596,699) and Atkinson (U.S. Pat. No. 5,701,424-A) and Mouilleseaux (2009/0327964). However, these radial menus were menus and not buttons. They do not offer the user the efficiency and expediency of functioning like a button where the user may simply press and release a button to input a command. The radial menus require further interaction, such as pressing a button just to initialize and popup a radial menu onto the display screen, from which the user may then select a command through further interaction with the radial menu.

As portable computing devices become smaller, the size of their display screens and the objects available for physical user input have become smaller. A small display screen, one that is much smaller than a desktop or laptop computer's display screen, presents a significant challenge to provide a user interface that allows users to easily interact with a computing device with a minimum of misinterpreted commands and gestures. This is particularly true on the small screens of smartwatches.

On many portable computing devices, touch screen user interfaces have replaced mouse and pointer user interfaces. The user touches the screen with a finger, or stylus to enter commands into a device. The user may touch an on-screen button to invoke a command. Touch user interfaces generally dispense with menus, as they take up to much screen space, in favor of on-screen touch buttons. Buttons, however, are limited to one command and, thus, limit the functionality of the application programs.

With touch screen user interfaces, the user may touch and drag, or "flick" an object to change the object directly. It is common to scroll objects and navigate through pages of information as well as to give the object a command. However, it is not common to be able to give the object a multitude of different commands, beyond the direction of a scroll or navigation. A plurality of buttons is commonly used when a plurality of different commands for the object may be presented to the user. However this takes up valuable screen space. If many buttons are required, sometimes called keys, then the size of each button, or key, has to be very small. This makes it hard for the user to use the button, or key, with accuracy.

Many portable computing devices contain keyboards. Keyboards consist of a collection of buttons that are commonly called keys. The keyboards on many portable computing devices often have a minimum of keys with one or more keys to switch the set of commands that the keys generate. An example of this is the common "shift" key. Whether the keyboards are physical keyboards or touch screen keyboards, they are being condensed in size to the point where it becomes difficult for the user to press a desired key without inadvertently pressing an unintended key. Further, users of portable computing devices generally hold the device with one, or both, hands while using the keyboard. This limits the user to using less than all fingers to operate the keyboard. Users generally use one or more fingers of one hand, or both thumbs of both hands. The limited size of keyboards on portable computing devices, along with the users using a limited number of fingers to operate the keyboards, make touch typing nearly impossible for the user. This makes typing on portable computing devices difficult. The user not only has to look at the keyboard when typing, but the user has to look at the text being entered to see the typing mistakes. Most of the mistakes made are due to the small size of the keys on the keyboard, and the user typing with a limited number of fingers. After a mistake has been made, the user then has to correct the typing mistake, which generally requires the user to also look at different places on the screen and keyboard. Every time a mistake and subsequent correction is made, it takes significant time to correct. Reliably translating a user's intended input, through buttons and the like, into device commands is very important to the user's satisfaction in using a computing device.

Several solutions have been proposed, and implemented to try and improve typing with small keyboards. One such example are keyboards that allow a user to touch a key on a touch screen keyboard, and then to swipe the users finger across each letter of the word before lifting the touch when the last letter has been touched. This is the method of operation of keyboards such as Swype (U.S. Pat. No. 7,808,480 Gross, U.S. Pat. No. 7,098,896 Kushler, http://www.swypeinc.com/), Shapewriter (U.S. Pat. No. 7,895,518 Kristensson, http://www.shapewriter.com/), and SlideIT (U.S. Pat. No. 7,199,786 Suraqui, http://www.mobiletextinput.com/Download/).

To operate these swiping keyboards, the user still has to slide his finger over each letter of a word. These keyboards have a similar number of keys to a conventional touch keyboard and, thus, have similarly sized small keys. Sliding a finger across a key is in no way more accurate than simply taping each letter of a word. Accordingly, the swiping keyboards heavily rely on predicting what the user intended to type. While predictive technologies improve a user's experience by predicting correctly more often than not, prediction has an associated error rate. Predictive corrections force a user to correct whole words instead of individual characters of a word. This represents no overall improvement to the user.

A method to enhance typing on a small keyboard is to use a smaller number of keys. One technology to use this strategy is the T9® text input system (U.S. Pat. No. 5,818,437 Grover). In this system, the user presses a key that represents more than one character. After pressing the keys that have the characters on them that comprise a word, the system decodes the keys pressed and enters the word that it thinks that the user was intending to type. This method, of course, has a high error rate as more than one word can be represented by the same sequence of key presses. A high error rate is obviously undesirable to the user.

Another keyboard to use a smaller number of keys is MessagEase (U.S. Pat. No. 6,847,706 Bozorgui-Nesbat, www.exideas.com). It uses only nine keys, in a 3 by 3 grid, to contain all the letters of the alphabet. A user types with MessagEase by entering individual characters with either a tap of a key, or by touching a key, and then sliding a finger across to be released on another key. This allows a single key that is larger than a convention key, for a given keyboard size, and yet lets the user select from multiple keystrokes choices, unambiguously, from a single key. This represents an improvement to the user, as the larger keys can be pressed by the user with a lower error rate than the small keys of a conventional keyboard. However, the keys of MessagEase require the user to slide, or swipe, a specific distance and direction to select certain characters. The distance must be enough to leave the key that the user initially pressed and not so far as to pass the adjacent key. Further, the MessagEase keys may only be swiped in the direction of an adjacent key, which limits the number of character choices that can be selected with an initial key press. Further, the keyboard layout of MessagEase does not resemble a conventional keyboard layout, which limits market acceptance.

Another keyboard that uses a limited number of keys is the Tiki6Keys® keyboard (http://tikilabs.com/index.php?p=home). This keyboard provides different modes of use. In one mode, the user is required to press multiple keys to enter a character. This obviously slows text input verses a conventional keyboard that only requires a single key press. In another mode, the user may press a key and then slide to another key to enter a character. This is similar to MessagEase and has the same limitations.

On small devices, keyboards generally have the requirement of needing to give the user a reliable selection method between many choices, as there are many characters in a language. Due to this, many creative solutions have been tried for small keyboards with varying degrees of success. However, user input objects that can quickly enable a user to input a multitude of commands, or characters, within the small confines of a small space can be useful in many applications, beyond keyboards. What is needed is a button, menu, or key, that can enable a user to reliably select from a plurality of commands with high reliability, efficiency, and little user motion and effort. A preferred solution has been described and disclosed in U.S. Provisional Patent Application 61/396,261 (May 24, 2010) (to the inventor of the present invention), and further disclosed in U.S. Provisional Patent Application 61/902,502, Filed Nov. 11, 2013 (to the inventor of the present invention) to which the present application claims priority.

BRIEF DESCRIPTION OF THE DRAWINGS

For a better understanding of the embodiments of the invention, as well as additional embodiments thereof, reference should be made to the Description of Embodiments below, in conjunction with the following drawings, in which like reference numerals refer to corresponding parts throughout the figures.

FIGS. 2A, 2B, 2C, 2D, 2E, and 2F illustrate an example of a user input sequence as processed by some methods of the invention.

FIGS. 6A, 6B, 6C, and 6D illustrate some methods of the invention.

FIGS. 7, 8, 9, 10, and 11 illustrate some embodiments of the invention.

FIGS. 12 and 13 illustrate some methods of the invention.

FIGS. 14 and 15 illustrate some methods of some embodiments of the invention.

FIG. 16 illustrates some embodiments of the invention.

FIG. 20 illustrates some methods of some embodiments of the invention.

REFERENCE NUMERALS IN DRAWINGS

Figure 1:
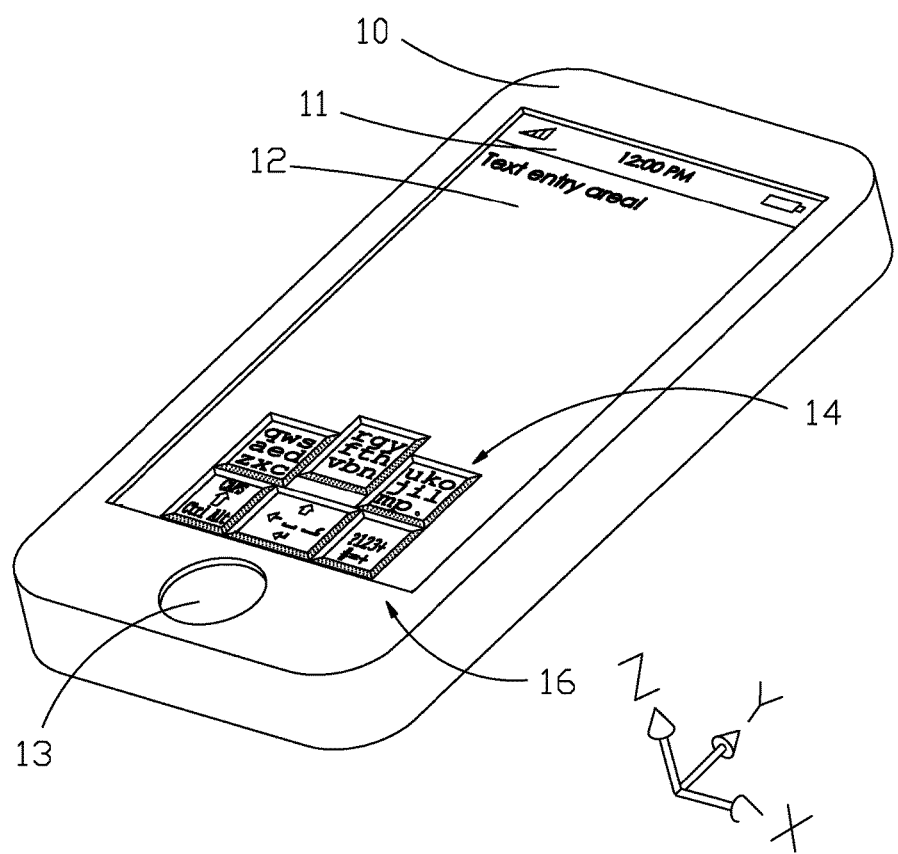
FIG. 1 is a perspective view of the device of FIG. 3A.

10 Computing Device (May include conventional and common computing means and features, such as means to generate press, release, and press motion signals, provide coordinates of the press, release, and press motion signals, generate timer signals, store data values and characters, track characters, parse words, contain and access data including software dictionaries and frequency and probability data, generate audible and tactile feedback, vibrators, determine device orientation, display traditional software keyboards, input and execute commands, etc. Includes common computing elements including, but not limited to, one or more processors, memory, one or more programs, and one or more instructions.)

11 Status Bar

12 Text Entry Area

13 Home Button
14 Software Keyboard
15 Software Keyboard
16 Display Screen (May be a Touch Screen, Also represents a plane generally coincident to the top surface of the multidirectional button, key, or menu)
20 Multidirectional Button (Top Surface)
21 System Pointer
22 Button Boundary
24 Initial Press Position
26 Displayed Multidirectional Button
28 Motion Threshold
30 Multidirectional Button (Top Surface)
31 Multidirectional Button (Top Surface)
32 Multidirectional Button (Top Surface)
33 Button Boundary
34 Button Boundary
35 Button Boundary
36 Multidirectional Button (Top Surface)
37 Multidirectional Button (Top Surface)
38 Multidirectional Button (Top Surface)
40 Selection Point (And Current Position of the User Press Motions)
41 Selection Region
42 Selection Region
43 Selection Region
44 Selection Region
45 Second Motion Threshold
46 Button Boundary
47 Button Boundary
48 Button Boundary
60 New Press Position
61 Selection Region
62 Selection Region
63 Selection Region
64 Selection Region
65 Press Position
66 Secondary Multidirectional Button (Also referred to as a Sub-Multidirectional Button, Key, or Menu)
68 Secondary Motion Threshold
70 Keyboard Layout
80 Keyboard Layout
81 Selection Region
82 Selection Region
83 Selection Region
84 Selection Region
85 Selection Region
86 Selection Region
87 Selection Region
88 Selection Region
90 Number Pad
100 Number Pad
110 Keyboard Layout
120 Secondary Multidirectional Button (Also referred to as a Sub-Multidirectional Button, Key, or Menu)
130 Sub Multidirectional Button
160 Keyboard Layout
170 Multidirectional Button
171 Multidirectional Button
172 Multidirectional Button
173 Multidirectional Button
174 Multidirectional Button
175 Multidirectional Button
176 Multidirectional Button
177 Multidirectional Button
178 Multidirectional Button
180 Candidate/Autocorrect/Prediction/Spell Check Bar
181 Currently Typed Word/Button
182 Disable Autocorrection Word/Button
183 Disable Autocorrection Symbol/Button
184 Prediction Word(s)/Buttons(s)
190 Secondary Multidirectional Button (Also referred to as a Sub-Multidirectional Button, Key, or Menu)
201 Press Position
202 Press Position
203 Press Position
204 Press Position
220 Initial Press Position
221 Initial Press Position
222 Press Path
223 Press Path
224 Press Release Position
225 Displacement Threshold

DETAILED DESCRIPTION OF THE EMBODIMENTS

Reference will now be made in detail to embodiments and methods of the invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known and/or common processes, programming methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms may only be used to distinguish one element from another. For example, a first motion could be termed a second motion, and, similarly, a second motion could be termed a first motion, without departing from the scope of the present invention.

The terminology, used in the description of the invention herein, is for the purpose of describing particular embodiments and methods only and is not intended to be limiting of the invention. As used in the description of the invention and the appended claims, the singular forms "a", "an" and "the" are intended to include the plural forms as well, unless the context clearly indicates otherwise. It will also be understood that the term "and/or", as used herein, refers to and encompasses any and all possible combinations of one or more of the associated listed items. It will be further understood that the terms "comprises" and/or "comprising," when used in this specification, specify the presence of stated features, steps, methods, operations, elements, and/or components, but do not preclude the presence or addition of one or more other features, steps, methods, operations, elements, and/or components thereof.

Embodiments of a computing device, a user interface for such devices, and associated methods and processes for using such devices are described. In some embodiments, the device is a portable communications device with a touch screen display such as a mobile telephone that may also contain other functions, such as Web browsing, PDA, music player, and other functions as well as downloadable applications for unlimited functionality. In another embodiment the device is a keyboard.

For simplicity, in the discussion that follows, a computing device, in most cases a smartphone or tablet, is used as an exemplary embodiment. It should be understood, however, that the disclosed multidirectional button, key, or menu user interfaces and associated processes and/or methods may be applied to other devices, such as, but not limited to, computer keyboards, hand held electronic displays, personal computers, laptop computers, tablet computers, portable music players, GPS units, and electronic watches and smartwatches. The computing device may be capable of performing a plurality of tasks and are sometimes referred to as a "multifunction device". For simplicity the computing device is sometimes simply referred to as "the computing device" or as "the device".

A computing device may have one or more screens for the display of user viewable program content. The screens may be, but not limited to, side by side screens or screens on different sides of the device. For simplicity, the one or more screens currently viewable by the user may be referred to as the "display screens" or as the "display screen".

For simplicity, the term 'button' will represent a physical button or a visual on-screen button drawn on the display screen. An on-screen button may be used with a pointing device or may be a touch screen button intended to be touched directly by the user. Buttons are user input objects and are means to issue user commands to the device. The term "user command" generally refers to a command for the device that is external to a multidirectional button, key, or menu method or embodiment, and does not refer to a command intended for changing the display or processing of a multidirectional button, key, or menu of the device. One exception is that a command of a multidirectional button, key, or menu may comprise a command to initiate a secondary or sub-multidirectional button, key, or menu. In this case the command is clearly specified as for that purpose, as are other exceptions.

In all figures that display an X, Y, Z axis legend, the X axis and the Y axis define a plane coincident with the plane of the top surface of one or more buttons. In all figures, the position of the buttons are illustrated as being on the top surface of a computing device 10, however, they need not be on the top surface. The buttons are all illustrated on the top surface of the computing device for simplicity. The Z axis is defined as perpendicular to the buttons with the positive Z direction extending upwards from the button. For simplicity, it is assumed that the positive Z direction points toward the user of the device, which assumes that the user is facing the display screen.

The term "user input" refers to the means by which the user uses the buttons. This may be accomplished by manipulating the buttons with the user's fingers. The user's input to the buttons may also be accomplished with, but not limited to, a stylus or touch screen pen, a mouse, or any device whose output can be interpreted into presses, releases, and motion of the presses.

Common to all embodiments are means to sense user input and generate signals. The processing of the user input sensing signals and the means and methods to translate those signals into screen changes and device commands need not occur in the portable device that houses the display screen and/or multidirectional buttons of the invention. For example: press, release of the press, and motion of the press signals and the processing of the signals may be communicated to a processor outside of the portable device. The programming of the display may, likewise, be communicated from an outside processor. In the example portable device described herein, all means to sense user input signals and the means to translate those signals into screen changes and device commands are contained in the one portable device. However, the term "computing device" should be construed to comprise: one or more display screens, the means to sense user input signals and the means to translate the signals into commands, wherever the processing of the user input signals may take place.

Common to all embodiments and methods is a button, which will generally be referred to in this disclosure as a "multidirectional button", "button", or "menu" for simplicity, but may also be referred to as a "key", "switch", "toggle", or "pick list". The button detects user input presses and releases, as does a common button, but additionally detects user input motion or force in a direction substantially perpendicular to the direction of the press. The button generates and/or detects signals containing a direction and/or a value of the user motion or force in a direction substantially perpendicular to the direction of the press. For simplicity, the direction substantially perpendicular to the direction of the press may be referred to as the "lateral direction". The buttons of the embodiments and methods of this disclosure detect button events that are comprised of presses, motions and/or forces, the exceeding of motion and/or force thresholds, and releases of the presses. The buttons of the embodiments and methods of this disclosure may additionally detect the exceeding of time thresholds as a button event. The methods and embodiments of the multidirectional buttons of this disclosure detect one or more button events to determine one or more commands for the device. The multidirectional buttons of this disclosure have a plurality of choices that the user may choose to enter a command into the device.

In common user input objects, a "menu" generally refers to an input object from which a user can choose between a plurality of selection choices. A "button" or "key" (a "key" is generally a button in a keyboard) generally refers to an input object from which a user can choose a single selection choice with a single tap—which comprises a press and release. Common buttons and keys are fast and efficient, but only give the user one command to select from. Common menus give the user more choices, but are slower in operation, and generally require the user to keep his eyes on the menu to make sure the user has moved a press motion to a selection, and not past a selection. Similar to a menu, input objects such as spin pickers, pick lists, and lists that can be scrolled have become common. These objects allow a user to press a button in the list, or spin or scroll the list first, and then tap to select. Spinning or scrolling first and then selecting second is a two-step process.

The multidirectional buttons, keys, or menus of the present invention provide the fast and efficient, as well as accurate, selection of a button or key in combination with giving the user a plurality of commands, or selection choices, from which to choose from common menu and pick list objects. They provide the advantages of all the types of discussed user input objects into one input object. As such, the terms "button", "key", and "menu" all refer to the same basic multidirectional user input object, which can replace the function of a common menu, spin picker, spin list, and/or one or more buttons or keys. The basic multidirectional button, key, or menu may be configured, particularly through what it displays to the user (in a wide variety of ways), to more closely resemble a common button or key or menu. However, the methods to implement this input object and function is substantially the same to the device. Thus the terms "button", "key", and "menu" are sometimes used interchangeably within the disclosure in reference to the multidirectional user input objects of the invention. Presently, there is no commonly used name for this new and novel input object. The inventor is presently referring to the objects as "flick-keys".

Common to all button methods is the means to detect user changes to input objects that comprise at least one multidirectional button. The input objects may be manipulated directly by the user if the objects are physical buttons. If the input objects are on-screen buttons they may be manipulated by a pointer and pointer controller buttons, which is commonly known as a mouse interface. If the input objects are on-screen touch screen buttons, the buttons may be manipulated by directly touching a touch screen. Many common means exist to process the signals and this invention should not be limited to one particular method. For example, the operating system may receive signals from the buttons and send messages to processes, or application programs. In another example, individual applications, or processes, may poll button devices for changes in the state of the buttons.

In an embodiment, the user presses one or more multidirectional buttons, moves the presses, and releases the presses to input commands into the device. Instructions for performing these functions may be included in a computer readable storage medium or other computer program product configured for execution by one or more processors. Instructions for performing these functions may apply one or more methods and heuristics to the motion of the presses to determine a command for the device, and instructions for processing the command.

In an embodiment, the button may be a physical button that can detect presses, releases, and force and/or motion in the lateral direction. The button may be movable or may detect force through means such as, but not limited to, strain gages. The lateral motion of the button or detected user applied force, in the X/Y plane in all figures, will be referred to in this disclosure as a "press motion", and sometimes just called a "motion". The user lifting one or more fingers from the physical button will be referred to as a "release".

In a method of the invention, the user presses a physical multidirectional button to initiate a multidirectional button, or command, method. The button method comprises: receiving a first press signal that initiates the method; saving information about the press; detecting substantially lateral motion, or movement, of the button; detecting if the motion of the button has exceeded a motion threshold; detecting the release of the button; determining the direction of the motion of the button; and determining a command for the device, wherein the command for the device may be, but not limited to, the entry of keystrokes, any commands that are commonly issued by menus or buttons or other input objects, and/or the initiation of secondary button methods.

In a method of the invention, the method detects a user pressing a common button to initiate a multidirectional button; detects the press and release of one or more cursor control keys to detect press motion beyond a motion threshold and determine a direction of the press; detects a release of the common button; determines a command for the device from a heuristic applied to the detections and determinations of the method, and inputs a command to the device. For example, the user presses a common button, then the user presses and releases the cursor control keys comprising the "up" and "right" keys, the user releases the common key. The method upon detecting the sequence inputs a command from the upper right selection region in to the device.

In an embodiment, the multidirectional buttons, keys, or menus comprise regions, or areas, of a display screen that the user may move a pointer over to initiate methods for generating user interface commands. Moving a pointer on the screen may be comprised of the user moving the pointer with a mouse or mouse substitute. The mouse, or mouse substitute, contains one or more buttons which are referred to as "pointer buttons". The pressing of one or more of the buttons, while the pointer is over a button boundary, will be referred to as a "press". Moving the mouse with one or more pointer buttons pressed down will be referred to in this disclosure as a "press motion", sometimes just called a "motion". The user releasing one or more of the pointer buttons will be referred to as a "release".

In a method of the invention, the user moves a pointer, with a mouse or mouse substitute, on the display screen over a button boundary and presses a pointer, or mouse, button to initiate a multidirectional button, or command, method. The button method comprises: receiving a first press signal that initiates the method; saving information about the press; detecting motion, or movement, of the mouse, or mouse substitute; calculating displacement of the motion; determining if the motion has exceeded a displacement threshold; detecting the release of the pointer button; determining the angular displacement; and determining a command for the device, wherein the command for the device may be, but not limited to, the entry of keystrokes, any commands that are commonly issued by menus or buttons or other input objects, and/or the initiation of secondary button methods.

In an embodiment, the buttons comprise regions, or areas, of a touch screen display that the user may touch to initiate methods for generating user interface commands. The touching of the screen may be comprised of the user touching the touch screen with one or more fingers or other parts of his hands or body. Or the touching of the screen may be comprised of the user touching the touch screen with one or more objects, such as, but not limited to, a stylus or pen. For simplicity, it is assumed that the user uses his fingers to touch the screen for this disclosure. The initial touch of the touch screen will be referred to as a "press". The user may slide one or more fingers across the touch screen while maintaining contact with the screen. This is commonly referred to as a "flick" or "swipe" and will be referred to in this disclosure as a "press motion", sometimes just called a "motion". The user lifting one or more fingers from the screen will be referred to as a "release".

In an aspect of the invention, touch screens, as well as any display screens, may not comprise a flat and planar surface. Presently in the art there exists electronic devices with screens that are curved. An example of this is the Google Nexus S smartphone. It has a slightly curved surface. Further, bendable display and/or touch screens have been demonstrated. As such, defining the press motion as lateral motion substantially in a plane that is concurrent with the plane of the display screen should infer that the lateral motion could follow a curved path along a curved screen, as this should be considered to be substantially planar motion, while not exactly planar motion. The reference plane may thus be defined to be tangential to the surface of the display/touch screen at the point of the press, which should be considered to be generally concurrent with a top surface of the multidirectional button, key, or menu. Provided the display/touch screen is not so curved as to interfere with the normal operation of a multidirectional button, it is substantially inconsequential to the user if the screen is curved, as opposed to exactly planer and flat to operate a multidirectional button, key, or menu.

With touch screen user interfaces, the user may touch and drag, or "flick" or "swipe" an object to change the object directly. It is common to scroll objects and navigate through pages of information, as well as to give the object a command directly. However, it is not common to be able to give the object a multitude of different commands, beyond the direction of a scroll or navigation. In a difference between the user manipulating an object directly, and a button object, the user manipulates a button to issue a command to the object indirectly, or to the device indirectly. In a multidirectional button, the user manipulates a multidirectional button in able to choose between more than one command for the object, and/or the device. The advantage of a multidirectional button is to give the user a choice of commands from a single button object.

In a method of the invention, the user touches a touch screen within a button boundary to initiate a multidirectional button, or command, method. The button method comprises: receiving a first touch press signal that initiates the method; saving information about the touch press; detecting motion, or movement, of the touch; calculating displacement of the touch; determining if the touch has exceeded a displacement threshold; detecting the release of the touch; determining the angular displacement; and determining a command for the device, wherein the command for the device may be, but not limited to, the entry of keystrokes, any commands that are commonly issued by menus or buttons or other input objects, and/or the initiation of secondary button methods.

In an aspect of the invention, motion-sensing technology now exists to determine presses and press motions on an electronic device without the user physically touching a multidirectional button. A leader in this field is Leap Motion (WO2013109609A2 and WO2013109608A2). Leap Motion uses one or more cameras, and/or one or more infrared sensors to determine 3D objects and their proximity to a device. Using this technology, a user may simply press a multidirectional button by moving his finger toward and/or within a threshold of distance or displacement from the top surface of the multidirectional button. The device may detect the user moving his finger across the top surface of the multidirectional button, or across a display screen, above the button or screen to determine the press motion. In an aspect of the invention, the user's one or more fingers may touch the multidirectional button or touch screen, or may hover above the button or screen. The release of the press may comprise the user moving his finger away from the multidirectional button or screen, or detecting the user having moved his finger beyond a threshold of distance or displacement from the button or screen. Whereby a user may enter a command selected from a plurality of commands to an electronic device reliably and quickly without actually touching the device, or the multidirectional button of the device. The methods of the present invention work with any motion sensing technology that can determine and/or provide user presses, press motions, and user press releases.

In an aspect of the invention, the multidirectional button method may also detect, but not limited to: further user presses; the positions of the presses; time intervals between button events; and the time of the presses in some data variables; whereby the button method may determine one or more commands for the device.

In an aspect of the invention, a multidirectional button method may determine the angular displacements of the one or more presses from the initial press position and the press position at the time of release, or the press position at the time the press motion exceeded a motion threshold, or at another time. The user of a multidirectional button will, most likely, not move a press in a single direction. For instance, if a user touches a touch screen with his finger and flicks his finger in a direction, the motion will likely follow a substantially arc shaped curve as his finger rotates about his finger joints. The most accurate method of interpreting a user's intended motion may depend on the user's style and skill. A multidirectional button may vary its behavior based on data values, and/or settings, which may, or may not, be user configurable. Configuring behavior of a user input object, software method, or process, and allowing a user to change settings affecting the behavior is common in computing devices. A multidirectional button method may read one or more stored data values to determine how to handle button events. For instance, the multidirectional button method may choose which method to use, from a data value, to calculate the angular displacement.

In a method of the invention, the user touches a touch screen within a button boundary to initiate a button, or command, method. The button method comprises: receiving a first touch press signal that initiates the method; detecting further touch presses; saving the position of the one or more touch presses and/or the time of the press in some data variables; detecting motion, or movement, of the touches; calculating displacements of the touches; determining if a touch has exceeded a displacement threshold; detecting the release of the touches; determining the time of the release if more than one press was detected; determining the position of the touch at the time of release of the touch; calculating the angular displacement from the initial touch position and the release touch position; determining a command for the device, wherein the command for the device may be, but not limited to, the entry of keystrokes, any commands that are commonly issued by menus, and/or the initiation of secondary button methods.

Common to all embodiments that use pointer based user input, and touch screen based user input based on a user press and movement of the touch, is the calculation of the displacement of the motion of a pointer or touch. The displacement of a touch is the distance the user's finger, pen, or stylus, has moved along a display screen from an initial screen contact point to a current screen contact point. The displacement of a pointer is the distance the pointer has been moved along a display screen from an initial position to a current position. The term displacement will be used instead of distance as the distance the motion of the press or touch has traveled to reach a displacement is insignificant.

The operating systems of portable devices commonly provide signals which include positional information of a pointer position or a touch. The position data is generally given in X and Y coordinates, commonly known as the Cartesian coordinate system. However, position data may be provided in other ways such as an angle and displacement from a reference point, commonly known as the Polar coordinate system. The position information may be in terms of a pixel location on the screen or in terms of a global coordinate system that may be translated from the coordinates of the current screen, or a section of the screen.

Calculating a displacement with Cartesian coordinates may be accomplished by applying the Pythagorean Theorem to an initial pointer or touch position and a current pointer or touch position. Assuming that the device is providing pointer or touch position signals with X and Y data values, calculating the displacement is accomplished by taking the square root of the addition of the square of the difference of the initial and current pointer or touch position X values and the square of the difference of the initial and current pointer or touch position Y values. Calculating pointer or touch displacements is common knowledge in the art.

Finding the angle of a current pointer or touch position from an initial pointer or touch position is a simple matter of using the inverse tangent function (sometimes called "arctan") with the differences of the X and Y initial and current components. This is common geometry and common knowledge in the art.

Finding displacements and angles from an initial position to a current position is also common knowledge for Polar coordinates.

In an aspect of the invention, a user press is comprised of touching a touch screen and the user may slide the press (the press motion) beyond an edge, or a detectable portion, of the touch screen 16. In a method of the invention, the method detects the press motion crossing off the edge of a touch screen display. (Some mobile operating systems make detecting the press motion crossing off the edge of a touch screen simple by providing edge flags to touch or press motion messages.) Upon this detection, the method initiates a system timer with a set interval. The method also detects a second press or press motion, which comprises a touch crossing back onto the screen before the system timer sends a timer signal to the method. The method may detect the touch crossing back onto the screen by detecting a second press motion on the screen within a displacement of distance from the position where the first touch crossed off the screen. The method may also determine the velocity of the press motion at the time the first press motion crossed off the screen, and the velocity of the second press motion reentering the screen to determine if the two press motion are one continuous user press motion that just happened to move off and quickly back on to the detectable portion of the screen. If the method determines that the first and second press motion/touches comprise one continuous user press motion, then the system timer is canceled. If a second press motion/touch is not detected before the system timer signal is received, a release signal is detected and the method continues normally and determines a command for the device. Alternatively, the method may simply exit without determining a command for the device upon receiving the system timer signal. In an aspect of the invention, detecting press motion leaving a touch screen can be comprised of detecting a release signal of the user press, and determining if the last position of the press motion is at the edge of the screen, or within a threshold of displacement of the edge of the screen. In another aspect of the invention, determining the velocity of the press motion can simply be comprised of determining the displacement of the press (or touch) position from a current position 24 to a last position 40, and dividing it by the time interval determined from the time of each of the two signals giving the positions.

In an aspect of the invention, a users finger may temporarily skip on the screen of a touch screen device. In a method of the invention, the method detects the release of the user press on the screen. Upon this detection, the method initiates a system timer with a set interval. The method also detects a second press or press motion, which may be a second touch and user press onto the screen before the system timer sends a timer signal to the method. The method may detect the touch back onto the screen by detecting a second press motion 40 on the screen within a displacement of distance from the position where the first touch left the screen 24. The method may also determine the velocity of the press motion at the time the first press motion left the screen, and the velocity of the second press motion reentering the screen and compare the two velocities in terms of direction and/or magnitude to determine if the two press motion are one continuous user press motion that just happened to skip off and quickly back on to the detectable portion of the screen. If the method determines that the first and second press motion/touches comprise on continuous user press motion, then the system timer is canceled. If a second press motion/touch is not detected before the system timer signal is received, a release signal is detected and the method continues normally and determines a command for the device.

In an aspect of an embodiment of the invention, touch screens 16 sometimes have enough friction to substantially inhibit the smooth sliding of the touch/press motion of the user's finger. In a method of the embodiment, the method upon detecting a button event turns on a device vibrator 10. The method may turn on the vibrator for the duration of the method, or just when it is detected that the press is in motion—the user's finger is sliding across the touch screen. Vibrators are common in modern smart devices 10, such as smartphones. Turning on the vibrator can reduce the friction of the user sliding his finger across a touch screen. The present method may be combined with the prior method so a users finger temporarily skipping on and off the touch screen display will be detected as a continuous press and press motion. Determining the press in motion may be comprised of determining the current velocity of the press motion, as disclosed elsewhere in the present disclosure, and detecting the press motion above a threshold of velocity.

Figures 3A, 3B:
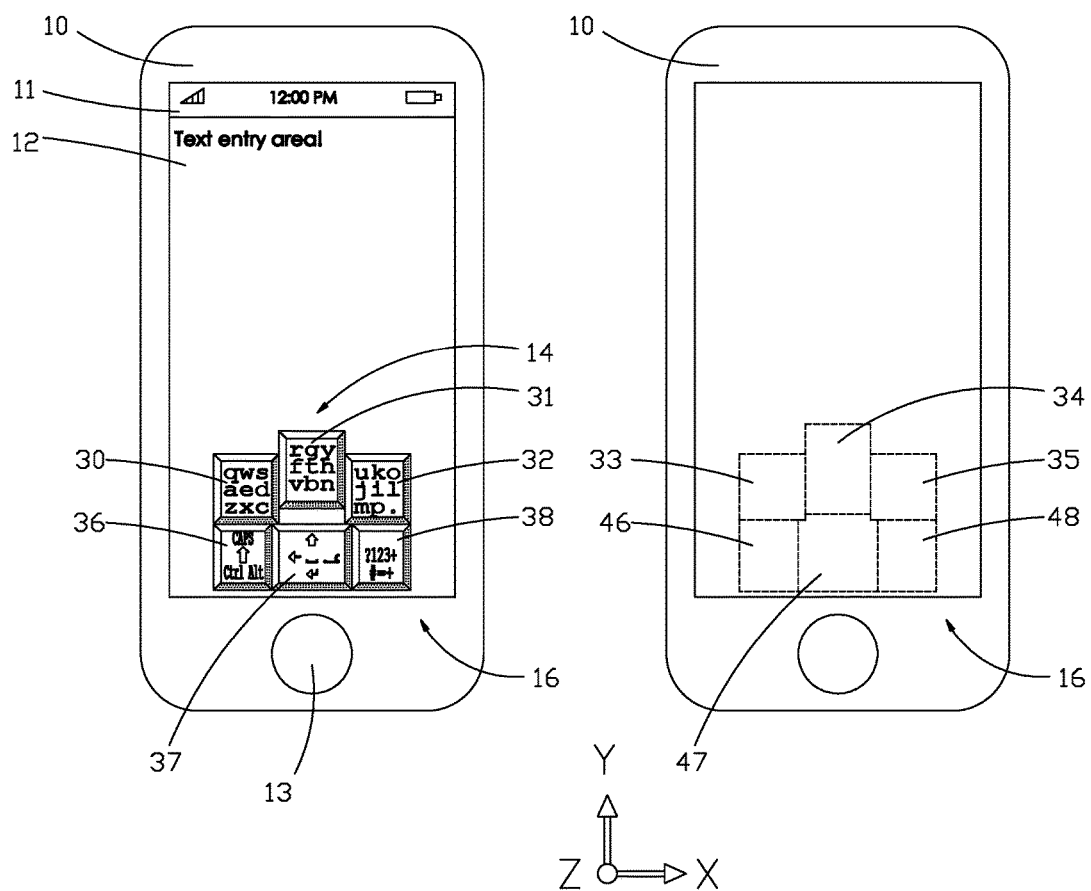
FIGS. 3A and 3B are front views of an electronic device in accordance with some embodiments of the invention.

FIG. 1 is a perspective view of the device of FIG. 3A and illustrates a portable computing device 10 with touch screen display 16 in accordance with some embodiments. The portable computing device resembles a popular smart phone and contains a status bar 11 and a home button 13 for visual orientation. The touch screen display contains an on-screen keyboard 14 in accordance with some embodiments. The on screen keyboard is comprised of a plurality of multidirectional buttons. The buttons of the example contain as many as nine different user selectable choices within one press, motion or no motion, and one release.

Figure 2A:
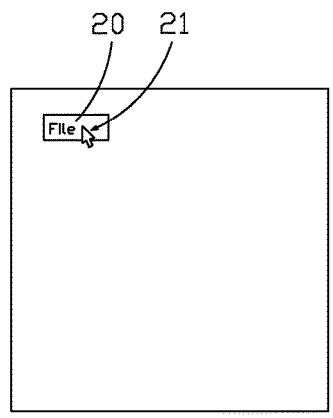
Figure 2B:
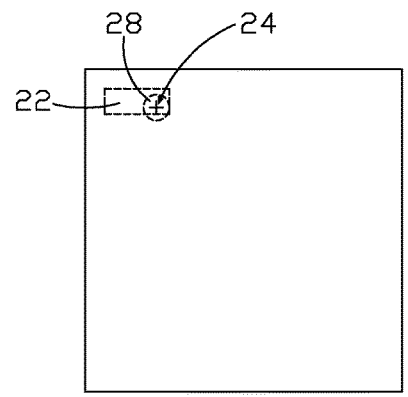
Figure 2C:
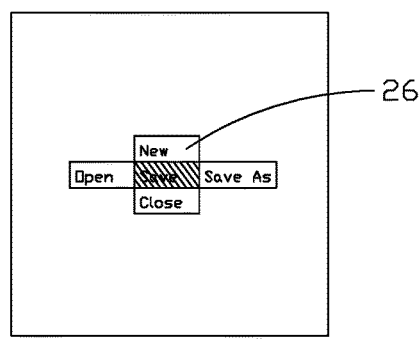
Figure 2D:
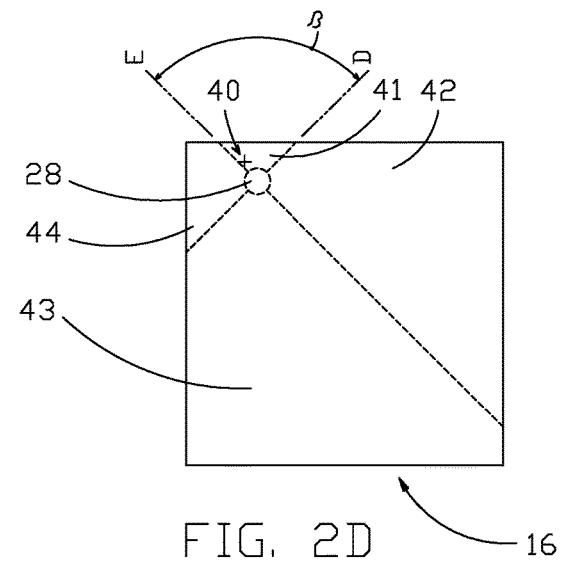

FIGS. 2A, 2B, 2C, 2D, and 2E illustrate an example sequence in which a user selects one command from a plurality of commands that may be selected from a multi-directional button in order to illuminate the operation of multidirectional buttons. FIGS. 2A, 2C, and 2E illustrate what is displayed to the user on a display screen 16. FIGS. 2B and 2D show positions of boundaries and thresholds and touch points on the display screen. (The "touch point" is the point on the screen where a user is touching a touch screen, or the point where the pointer is when a mouse button is pressed.) FIGS. 2B and 2D do not display the content that the user sees on the display screen in order to not obscure these objects. The positions of boundaries and thresholds and touch points are not displayed to the user but are shown only to illustrate methods of enabling a user to select from a plurality of choices from a button. The bounding button areas are the areas of a display screen that will initiate the methods of this disclosure for on-screen directional buttons, when pressed by the user.

FIG. 2A illustrates a display screen 16 which is displaying an example of a single multidirectional button 20. The display of the multidirectional button, which is what the user sees, appears as a common button or menu item. If the button is to be selected with a pointer 21, the user places the pointer over the button and presses a pointer, or mouse, button. If the button is to be selected with a touch on a touch screen, the user will directly press the button on the touch screen. The button press initiates a button method for determining a command from a sequence of user motions and releases.

FIG. 2B illustrates a button boundary 22 which represents the portion of the display screen 16 within which a press 24, or touch, will initiate a multidirectional button method. The press 24, initiating the button method, is represented by a small cross. Upon receiving a press signal or message initiating a button method, the method detects motion of the press and checks for motion exceeding a motion threshold 28. In this example, the button threshold represents a displacement threshold of press motion from the initial press position 24. As such, the motion threshold is represented by a circle centered on the initial press position.

In an aspect of the invention, the motion threshold need not be directly related to motion of the press, but may be a threshold value based upon the signal of the pointer or touch motion.

Once the user press has occurred within a button boundary, this example button method changes what is displayed to the user, as illustrated in FIG. 2C. In this example button, five command choices are now displayed. As can clearly be seen in FIG. 2C, the five command choices are "New", "Open", "Save", "Save As", and "Close". A person of ordinary skill in the art will immediately recognize the commands of this particular embodiment as common file commands. It is also commonly known that these common file commands are not for the use of typing. Thus, this particular button/menu embodiment, showing only common file commands, is exclusive from the use of typing. The center choice of the displayed multidirectional button 26 is highlighted, as the button method has just been initiated and press motion beyond the motion threshold has not yet been detected. If the user were to release the press at this time, without press motion beyond the motion threshold, the button method would issue a command associated with the center choice to the device.

In an aspect of the invention, button methods may or may not change what is displayed to the user when the user presses a button. Further, button methods may or may not change what is displayed to the user when the user moves the press past motion or time thresholds. Further, button methods may use any common methods to display choices and highlight current selections of the choices.

In an aspect of the invention, button methods may place what is displayed to the user anywhere on the display screen. In this example, the button method has placed the displayed multidirectional button 26 near the center of the display screen 16. The display of this button is not displayed directly under the press, or touch, so that the user's finger does not obscure the user seeing the choices that are now displayed.

FIG. 2D illustrates the next step in the sequence of the user selecting a command from the multidirectional button. In this step, the user has moved the press 40 beyond the initial motion threshold 28. In a difference between common button behavior and a multidirectional button, the button boundary that initiated the button method is no longer significant. If the user moves the press to a selection other than the center selection, or choice, the displacement of the press need not exceed the button boundary but needs to exceed the motion threshold. The button method, upon detecting that the current position of the press has exceeded the motion threshold, determines which selection region currently contains the current press position. Software methods for making this determination are common and may be accomplished by many methods. In this example, the angle of the displaced press, from the initial press position ($\beta'$ in FIG. 2F), is compared to four angular selection regions 41, 42, 43, and 44. (As can be seen in FIG. 2F, $\beta'$ is the angle between axis A, which is in the Y direction, and axis C, which passes through the current press point and the initial press point.) In this example, each of the four selection regions has an angular aperture $\beta$ of 90 degrees. (As can be seen in FIG. 2D, $\beta$ is the angle between axis D and axis E.)

In an aspect of the invention, the angular aperture of selection regions need not be at regular intervals. Certain user input motions may be more accurate than others. For example, a programmer may implement a multi-direction button with larger selection region angular apertures for motions that are harder for the user to reliably execute.

In an embodiment of the invention, a process may create a database tracking user input errors and adjust selection region apertures and/or motion thresholds and/or time thresholds based on the error rate of selecting certain commands. The rate of user error may be kept track of by common methods such as, but not limited to, tracking the commands that were issued prior to a backspace, or other error correction commands. The user input errors may be determined by comparing the command entered by the user following a correction command and comparing the command with the command entered prior to the correction command. The prior, correction, and corrected commands may be comprised of pluralities of device commands.

In the example user input sequence illustrated in FIG. 2D, the button method has detected that the press is now in selection region 41. In this example, the button method updates the display screen 16, as seen in FIG. 2E, to highlight the top menu item.

The last step of the user input selection sequence is the user releasing the press. Upon detection of the release, the method issues one or more commands. This example method then updates the screen to remove the popup multidirectional button, or menu, display.

In an aspect of the invention, software methods may implement algorithms to determine that the command that can be selected by the user, or highlighted, is associated with a selection region neighboring the selection region that a press is currently in. Users will most likely not move a press in a straight line, as their fingers are composed of pivots that tend to produce arcing motions. As such, a variety of methods may be chosen from to determine the direction the user intended to move a press. For example, the angle of press motion at the time the press exceeded a motion threshold may be averaged with the angle of the release of the press. In another example, the initial motion of the press may be weighted more highly than more recent motion.

In another method of the invention, a second motion threshold may be used for averaging the angles of the press motion to find the direction of the press motion. (The term "second motion threshold" should not be confused with a "secondary motion threshold".) The second motion threshold may be larger than the first. If the motion of the press never exceeds the second threshold, then the first motion threshold is used for averaging the direction of the press motion from the initial press position, as described above. If the press motion does exceed the second motion threshold, then the angle calculated from the position of the press motion, at the time the motion has been detected crossing the second threshold, may either be substituted for the angle calculated when the motion crossed the first threshold, or the two angles determined from the crossing of the two thresholds may both be used to average with the angle at the release of the press and determine the direction of the press.

In an aspect of the invention, more than two motion thresholds could be used for averaging the angle of the press motion and finding the direction of the press motion. Further, a method of the invention could calculate running averages over an interval of time, or a number of motion signals, to determine the direction of the press. (Calculating running averages is known in the art.) This method would weight the last direction of the press motion more highly than the initial direction of the press motion.

When a user presses a touch screen device, the user does not usually press a single coordinate on the screen. Modern operating systems generally have algorithms to detect a multiple of clustered touch points and to assign a single touch coordinate to the cluster. Assumedly, this is done through finding the center of area of the cluster. As a user touches the screen and slides his finger along the screen, generally called the press and press motion in this disclosure, the size of the cluster may vary in size and shape. For instance, a user may slightly roll his finger on the screen during the press, press motion, or release. If the user rolls his finger when initially touching the screen, and the device is quite responsive, the initial touch/press position will be slightly different the next touch/press positions communicated through the motion signals. Greater accuracy in determining the crossing of motion thresholds, and determining the angles at the time of the crossing of the thresholds and the time of release of the press may determined by adjusting the initial press position over a threshold of time, or a threshold of displacement from the time of the detection of the press, or over the first few motion signals. A method of the invention may adjust the initial press position through averaging these first few positions, or through replacing or averaging the initial press position with a subsequent position upon the method detecting the crossing of a time and/or displacement interval.

Modern mobile computing devices, such as smartphones, may include sensors for determining the motion of the device. Many devices contain an accelerometer, a gyroscope, a magnetometer, inclinometer, and other sensors. Also many devices contain an accelerometer in combination with other sensors, such as a gyroscope, and algorithms to fuse the data from the various sensors to provide more accurate sensor data. For instance, data from the gyroscope can be used to more accurately remove the force of gravity from the accelerometer data to provide X, Y, and Z acceleration values of the device as it is moved by the user. These values are often called the "linear" or "user" acceleration values and these values are provided by the two most popular mobile operating systems (iOS and Android), provided an accelerometer and gyroscope are available in the device.

When a user touches the display screen of a touch screen device, it may not be possible determine from touch signals that the operating systems provide whether the user has slid his finger a small amount, or whether the user has rolled his finger on the screen. On small-screened devices, it may be necessary to have a small motion threshold. Distinguishing sliding from rolling motion of the users finger can improve the accuracy in determining if the user intended to choose the center selection of a multidirectional button, or an outside selection region.

To provide this improvement, a method of the invention receives acceleration signals and values from the device to determine if the user has put a force or acceleration above or below a threshold of force or acceleration in a substantially linear direction on the device. If so determined, the method determines if a release signal of the press has been received and determines if the position of the press is within a threshold of distance from the motion threshold 28 (FIG. 4B), and issues the command associated with the center selection region 28 or an outside selection region 81-88 corresponding to determination of the force or acceleration being above or below the threshold.

In an aspect of the invention, a method of the invention may also use displacement and/or velocity values in place of accelerations values. Displacement and velocity values may be derived from acceleration values, provided time intervals between sensor signals are determined, and initial values are determined, through known and common formulas, such as the Equations of Motions. A method of the invention may also use angular displacement, angular velocity, and angular acceleration values to distinguish between the user rolling, and sliding a finger on a touch screen. A method of the invention may use any combination of these values and sensor data.

In Microsoft's Windows operating systems, the right mouse button 'pop's up' a menu in many applications. In an aspect of the invention, the multidirectional buttons of this disclosure may likewise 'pop up' in response to a user press, be it the press of a mouse button or the touching of a touch screen or the press of a physical button. An initial on-screen button need not be displayed to the user.

In an aspect of the invention, any number of angular apertures of selection regions may exist in any multidirectional button. There is no theoretical limit to the number of selections and commands that can exist in a multidirectional button as the angular selection regions can be infinitely small. However, the practical limit is the minimum angular aperture that defines a selection region into which the user can reliably move a press.

In an aspect of the invention, the selection regions need not be at regular angular intervals or symmetrically placed around the motion threshold. Multidirectional buttons may have selection regions that adapt to suit the needs of the application that control them.

In an aspect of the invention, the function of the methods and embodiments of the invention could be approximately duplicated by other methods within the abilities of one skilled in the art. For example, a programmer could implement popup buttons on the screen with associated button boundaries within which a user must release a press, upon detecting a press of an initial button. If the button boundaries comprise common rectangles, the method or embodiment would function similarly, but with less accuracy than the methods and embodiments of the invention, as the user press release position, or the position of the press motion, may more easily miss a box or rectangle than the approximately pie shaped selection regions of the invention. If a programmer implemented a popup button with a substantially comparable shape, this would simply comprise an alternative description of the same methods and embodiments of the invention.

Detailed Description of a Keyboard Comprised of Multidirectional Buttons

In another embodiment, a plurality of multidirectional buttons comprises a keyboard. FIG. 3A illustrates an example computing device 10 containing a software keyboard 14. A software keyboard, sometimes called a "soft keyboard", is a keyboard without physical keys. The keyboard may be a touch screen keyboard or may be operated with a pointing device, or stylus, or any common method of operating an on-screen software keyboard. Software keyboards are common on small portable computing devices which do not always have the room for a physical keyboard.

The multidirectional button keyboard of this example has a plurality of multidirectional buttons, of which three of the multidirectional buttons contain all of the alphabetical letters, of a single case, of the English alphabet. Each of these three buttons is a multidirectional button with nine key choices per button. As can been seen in FIG. 3A, a plurality of the multidirectional buttons are concurrently displayed.

Figures 18, 19:
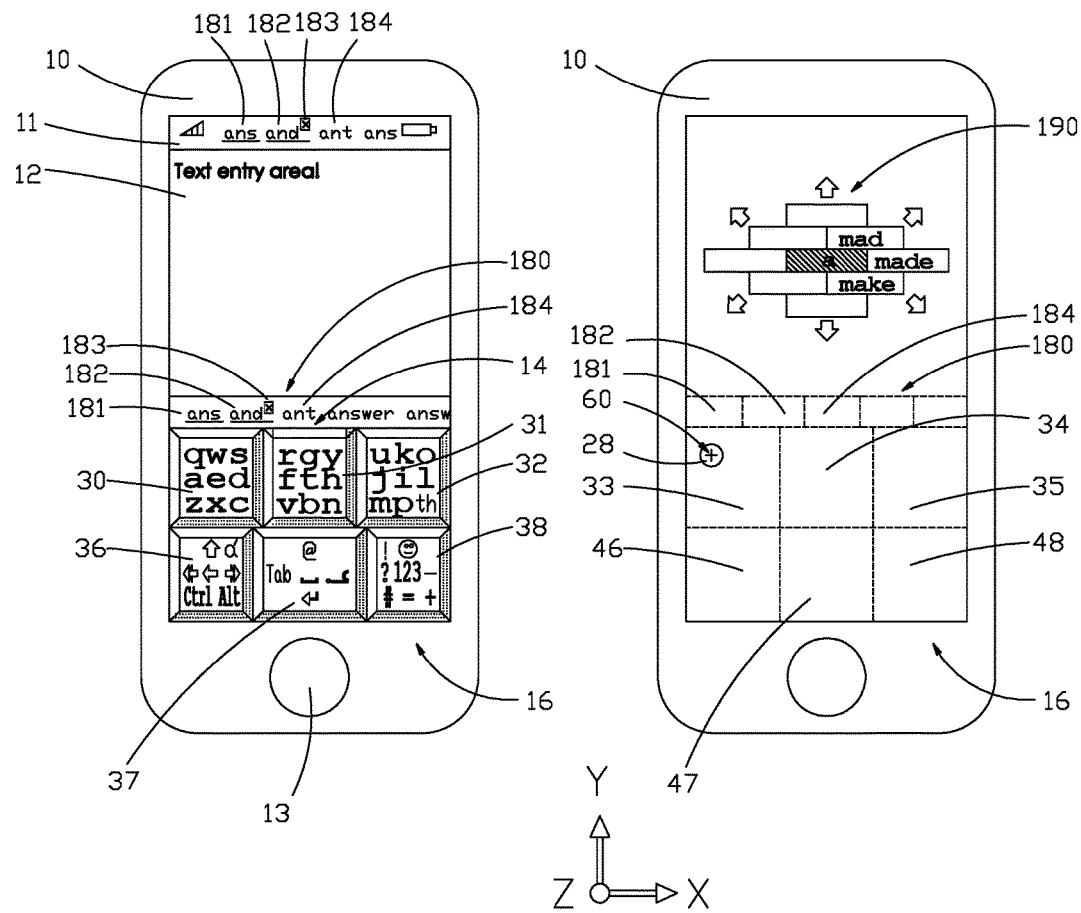
FIGS. 18 and 19 illustrate some methods of some embodiments of the invention.

As the reader can also see in FIG. 3A and FIG. 18, this example keyboard comprises six multidirectional buttons or keys with many common keyboard functions and symbols contained in some of the multidirectional keys. In this example and embodiment, the command of the center selection of the center bottom multidirectional key 37 comprises the space character. (Shown with a horizontal 'bar' graphic FIG. 3A & FIG. 18.) The user may simply press and release (also referred to as a tap) anywhere on this multidirectional key to input a space character to the device. The space character is usually the most common character a user enters when typing common text. In this embodiment of the present invention, the reader can see that the multidirectional key containing the space command is greater than one third of the height of the keyboard. Further, it is approximately half the height of the keyboard in FIG. 18. This provides the user with the advantage, compared with other keyboards, that the user may simply tap (which is a press and release with no lateral press motion) a relatively large key in both height and width to input the space character. Further, as this key is near the center of the keyboard, the finger path to reach this key is generally small, and a simple tap (press and release) is exceptionally efficient. Thus pressing this key is both fast and it is also very accurate—due to the large relative size of the key to the size of the keyboard. This advantage increases as the overall size of the keyboard decreases. Thus, on very small devices, such as smartwatches, this is a decided performance advantage to this keyboard of the present embodiment.

FIG. 3B illustrates the button boundaries of the multidirectional buttons of the software keyboard on the display screen 16 of the example computing device 10. Button boundaries 33, 34, and 35 are the boundaries of multidirectional buttons 30, 31, and 32 respectively which contain all 26 characters of the English alphabet. Button boundaries 46, 47, and 48 are the boundaries of multidirectional buttons 36, 37, and 38 respectively which contain other common keys, or commands, found on a common keyboard. As can clearly be seen in FIGS. 1, 3A, and 5A, the command of the left selection region of multidirectional button 37 comprises a backspace command.

In an aspect of the invention, the methods implementing the software keyboard may track user press positions within the button boundaries, and or user press errors, and adjust the positions of the button boundaries to adjust to user preferences or use patterns.

Figure 4A:
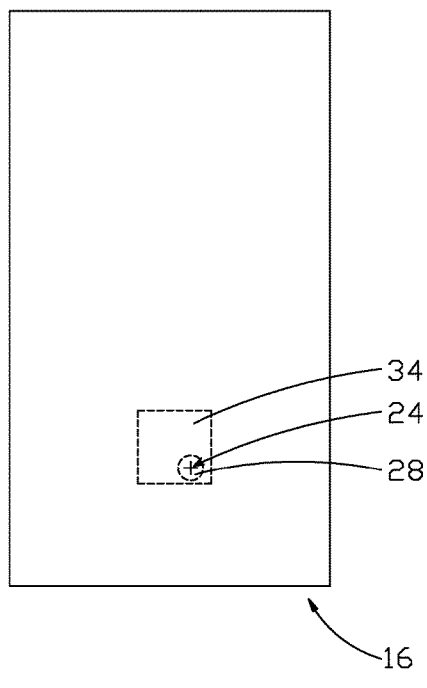
FIGS. 4A and 4B illustrate some methods of the invention.
Figure 4B:
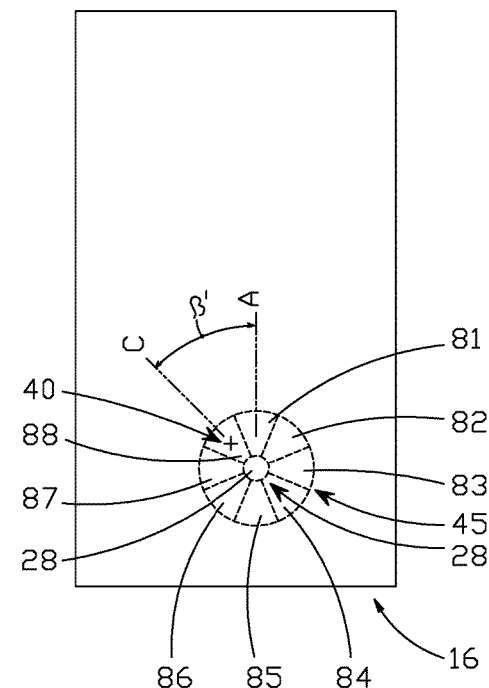

FIGS. 4A and 4B illustrate an example sequence in which a user selects one command from a plurality of commands that may be selected from a multidirectional button in order to illuminate the operation of multidirectional buttons. In this example sequence, an alphabetic character is entered into the computing device by a user. FIGS. 4A and 4B show positions of button boundaries and press motion thresholds and press, or touch, positions on the display screen without displaying the content of the display that the user sees. The positions of boundaries and thresholds and press positions are not displayed to the user but are shown only to illustrate methods of enabling a user to select from a plurality of choices from a single button. The button boundary areas are the areas of a touch screen that will initiate the multidirectional button methods of this disclosure for on-screen multidirectional buttons when selected by the user.

The first step of the example sequence consists of a user press within a button boundary 34. FIG. 4A illustrates the initial press position 24, represented by a small cross, within the button boundary 34. The button boundary corresponds to the upper center button on the software keyboard 14, as illustrated in FIG. 3A. Upon receiving a signal or message initiating the button method, the method detects motion of the press and checks for motion exceeding a motion threshold 28.

In this example method, the user's finger, or other selection device, is over the displayed on-screen button obscuring the displayed button. In this example method, the button, as displayed on screen does not change as the change would not be seen by the user.

In an aspect of the invention, the current key, or command, that would be selected if the user were to immediately release the press could be displayed anywhere on the computing device.

The second step in the example sequence is the user moving the press from the initial press position to a new selection point 40, as illustrated in FIG. 4B. In this example, each of the eight selection regions 81-88 has an angular aperture of 45 degrees. The new selection point has exceeded the motion threshold 28 for this button method. In this example, the angle of the displaced press, from the initial press position is angle $\beta'$. (As can be seen in FIG. 4B, $\beta'$ is the angle between axis A, which is in the Y direction, and axis C, which passes through the current press point and the initial press point.) The multidirectional button method of this example compares angle $\beta'$ to the eight angular selection regions to determine which selection region the press has been moved into. As can clearly be seen in FIG. 4B, determining a direction in this embodiment from angle $\beta'$ is unrelated to any button boundaries, and is thus unrelated to the placement of any buttons or keys."

In an aspect of the invention, the angular aperture of selection regions need not be at regular intervals but may be of any angular aperture and thresholds that suit a particular purpose.

The software keyboard 14, illustrated in FIG. 3A, shows multidirectional buttons with a variety of command selection choices. In this embodiment of a software keyboard, multidirectional button 36 has four command choices, multidirectional button 37 has five command choices, and multidirectional button 38 has two command choices.

In an aspect of the invention, the application program, or process, implementing a multidirectional button may reconfigure a multidirectional button at any time. For instance, command choices could be added, or subtracted, from the buttons.

In an aspect of the invention, multidirectional buttons need not be limited to a single command per selection, but may issue multiple commands or initiate other methods. For example, in the multidirectional button 37 illustrated in FIG. 3A, the command issued by the user choosing the right selection, or choice, would initiate a method that comprises the period character being entered into the device, followed by the space character being entered into the device, followed by the capitalization of the next key entered.

In an aspect of the invention, a command to be entered into the device may be comprised of a state change. For example, the lower left multidirectional button 36 of the software keyboard contains four selection choices comprising the common keyboard state changes: the Caps Lock key, the Shift key, the Control key, and the Alt key.

In a method of the invention, the Shift key may be pressed twice to toggle the "Caps Lock" state between on and off.

In the current example method, the example multidirectional button has a secondary motion threshold 45. If the user moves the press beyond the secondary threshold, no commands will be issued and the method will move buttons of the software keyboard to a new position on the display screen. In this way, the user can easily move the keyboard on screen to adapt to the user.

In an aspect of the invention, the multidirectional buttons that comprise a software keyboard may be moved, or positioned, on the display screen to match the user's style of typing. For instance, the user may switch from using the keyboard with one finger, or input device, to using the keyboard with a plurality of fingers, or input devices. The optimal button layout on the display screen will be different for the different ways in which a user chooses to use the keyboard.

In an aspect of the invention, on a touch screen, the user may touch the screen with more than one finger concurrently. This is known in the art as "chording". If a user is using a mouse with buttons, pressing more than one mouse button at a time is also referred in the art as "chording". Chording may be used to expand the number of command choices available to the user.

In a method of the invention, a multidirectional button method detects chording. Chording may be detected in the following ways: A multidirectional button method, after being initiated by a signal responding to an initial button press, detects press signals generated by one or more user presses subsequent to the initial press. The subsequent user presses may be comprised of the user touching the touch screen with another finger, or fingers, and/or the user pressing another button, or buttons, which may or may not be multidirectional buttons. The user presses may be comprised of the user pressing more than one mouse buttons while the system pointer is over a multidirectional button. The user presses may be comprised of the user pressing a plurality of physical multidirectional buttons. Upon detection of a press, the multidirectional button method detects further presses, motion of the presses, and releases to determine a command for the device.

In an aspect of the invention, a button method, upon detection of another press, may initiate another button method to interpret a user sequence of presses, motions, and releases to determine a command for the device.

In an aspect of the invention, a multidirectional button method may set timers and/or record the time of presses to differentiate between user intentions. For example, a plurality of buttons pressed or released within a time threshold could be interpreted as a simultaneous multi-button user press or release.

In a method of the invention, as illustrated in FIG. 1 and FIG. 3A, a multidirectional button method detects two user presses, within a time threshold, on the software keyboard 14 on the display screen 16 of the computing device 10. The method, upon detection of user releases of the presses, enters a "space" key command to the device.

In a method of the invention, as illustrated in FIG. 1 and FIG. 3A, a multidirectional button method detects two user presses on the software keyboard 14 on the display screen 16 of the computing device 10. The method, upon detection of user releases of the presses, within a time threshold, enters a "space" key command to the device.

Common keyboards allow a user to enter multiple keystrokes, or commands, by pressing a key, or button, and holding it down. A common process starts a system timer, when the press of a key is detected, that sends a timer signal to the process at a set interval, or rate of time. If the timer signal is received, prior to the detection of the release of the pressed key, the process enters a keystroke, or command, into the device. Upon detection of the release of the press, the process turns the system timer off.

In a method of the invention, a multidirectional button method starts a system timer, when the press of a multidirectional button is detected and/or a button press has exceeded a motion threshold. The system timer sends a timer signal to the button method at a set interval, or rate of time. If a timer signal is received, prior to the detection of the release of the pressed key, the process enters a keystroke, or command, into the device. Upon detection of the release of the press, the button method turns the system timer off. Whereby, the user may enter a plurality of commands into the device.

In an aspect of the invention, multidirectional button methods may change other buttons, or objects, or the display of other buttons, or objects on the display screen.

In a method of the invention, a multidirectional button method, initiated by an initial button press, changes the button display and processing of one or more buttons. The method, upon detection of a second press, a motion of the second press if any, and the release of the second press prior to the release of the press that initiated the method, enters a command into the device. Upon release of the initiating press, the command that would be entered into the device, if the second press had not been detected, will be suppressed.

In a method of the invention, a multidirectional button method, initiated by an initial button press, changes the button display and processing of one or more buttons to display alphabetical characters of the opposite case. The method, upon detection of a second press and a motion of the second press, if any, prior to the release of the press that initiated the method, enters one or more characters into the device. Upon release of the initiating press, the command that would be entered into the device, if the second press had not been detected, will be suppressed.

Figure 5A:
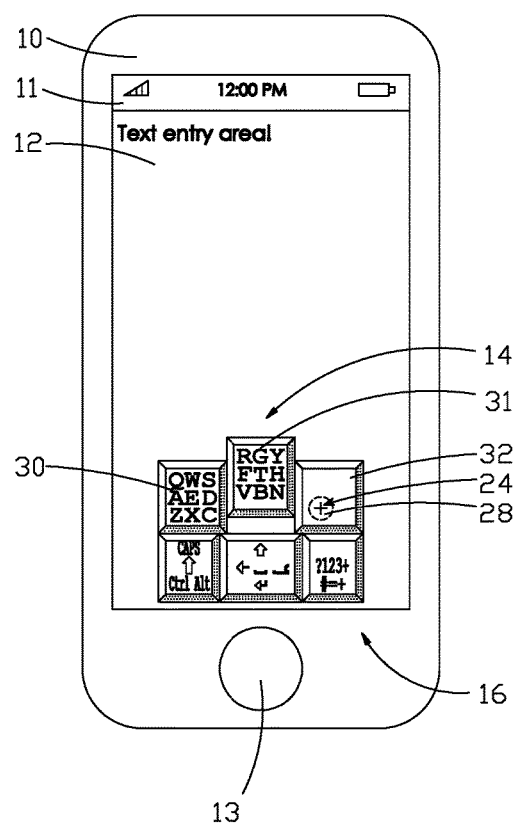
FIG. 5A illustrates some methods of some embodiments of the invention.

For example, if one of the three buttons 30, 31, and 32 of software keyboard 14 of FIG. 3A is pressed by the user, a multidirectional button method, upon detection of the button press, may change the other two buttons to display and process characters of the opposite case. FIG. 5A illustrates an example user press 24 on multidirectional button 32. (The characters that the user sees on button 32 have been removed from the drawing so the reader can see the initiating button press 24 and motion threshold 28.) As the reader can see, the case has changed from the lower case characters seen if FIG. 3A to uppercase characters on multidirectional buttons 30 and 31 illustrated in FIG. 5A.

In an aspect of the invention, the second press may have to occur beyond a threshold of time after the press initiating the multidirectional button method for the method to change the case of the other buttons.

In a method of the invention, a multidirectional button method detects motion of an initiating press beyond a motion threshold, and/or a press exceeding a time threshold, and changes other buttons or objects, which may or not be multidirectional buttons. The changes are comprised of, but not limited to, the replacement of a screen object with another object which may be a multidirectional button, changing the commands issued by a multidirectional button, and/or changing multidirectional button boundaries, motion thresholds, and/or time thresholds, and/or the display of a multidirectional button, or other screen object on the display screen. Multidirectional buttons contain pluralities of command choices and the choices may initiate more multidirectional buttons.

Figure 5B:
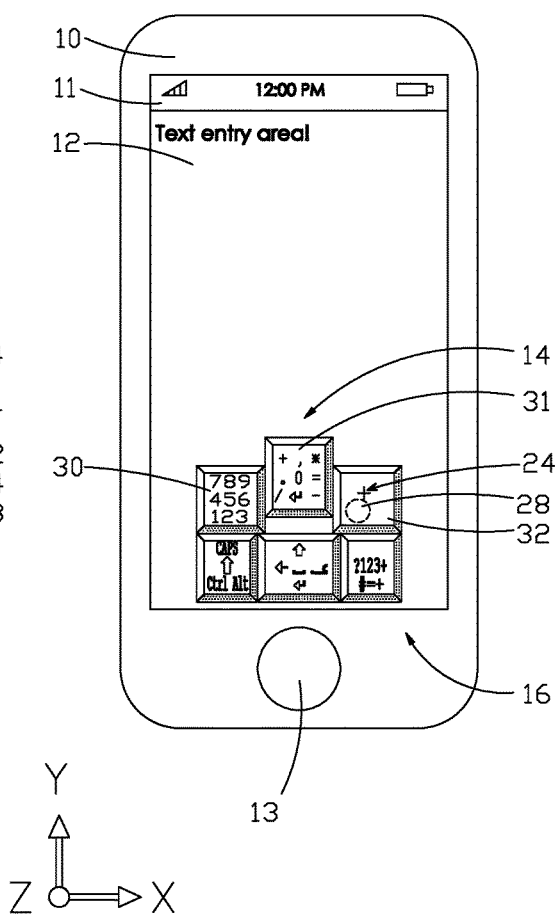
FIG. 5B illustrates some methods of some embodiments of the invention.

In another example, if one of the three buttons 30, 31, and 32 of software keyboard 14 of FIG. 3A is pressed by the user, a multidirectional button method, upon detection of the button press, may change the other two buttons to display and process non-alphabetical characters in place of alphabetical characters. FIG. 5B illustrates an example user press 24 on multidirectional button 32. (The characters that the user sees on button 32 have been removed from the drawing so the reader can see the initiating button press 24 and motion threshold 28.) In this example, the user has moved the press beyond the motion threshold 28. The method, upon detection of the press exceeding the motion threshold, has changed multidirectional buttons 30 and 31 to display and process non-alphabetical characters which comprise a number pad, as illustrated in FIG. 5B.

In an aspect of the invention, the second press may have to occur beyond a threshold of time after the press initiating the method.

In an aspect of the invention, the changing of the display of multidirectional buttons, that have had their commands changed, may not occur until a threshold of time has passed after the time of the press initiating the method.

In an aspect of the invention, the display of multidirectional buttons, that have had their commands changed, may not change if all presses are released within a threshold of time from the time of the press initiating the method.

In a method of the invention, the user pressing the software keyboard with two fingers and then moving the two presses in substantially the same direction, beyond motion thresholds, moves the keyboard on the display screen. Whereby, the user may move the keyboard to suit his typing style.

In a method of the invention, the user pressing the software keyboard with two fingers and then moving the two presses in opposite, and generally rotational, directions, optionally beyond motion thresholds, changes the orientation of the keyboard.

In a method of the invention, the user pressing the software keyboard with two fingers and then moving the two presses towards, or away from each other resizes the keyboard, and/or repositions buttons of the keyboard of the invention, and/or splits the keyboard into two or more sets of keys, or re-joins the two or more sets of keys into one keyboard.

Figure 17:
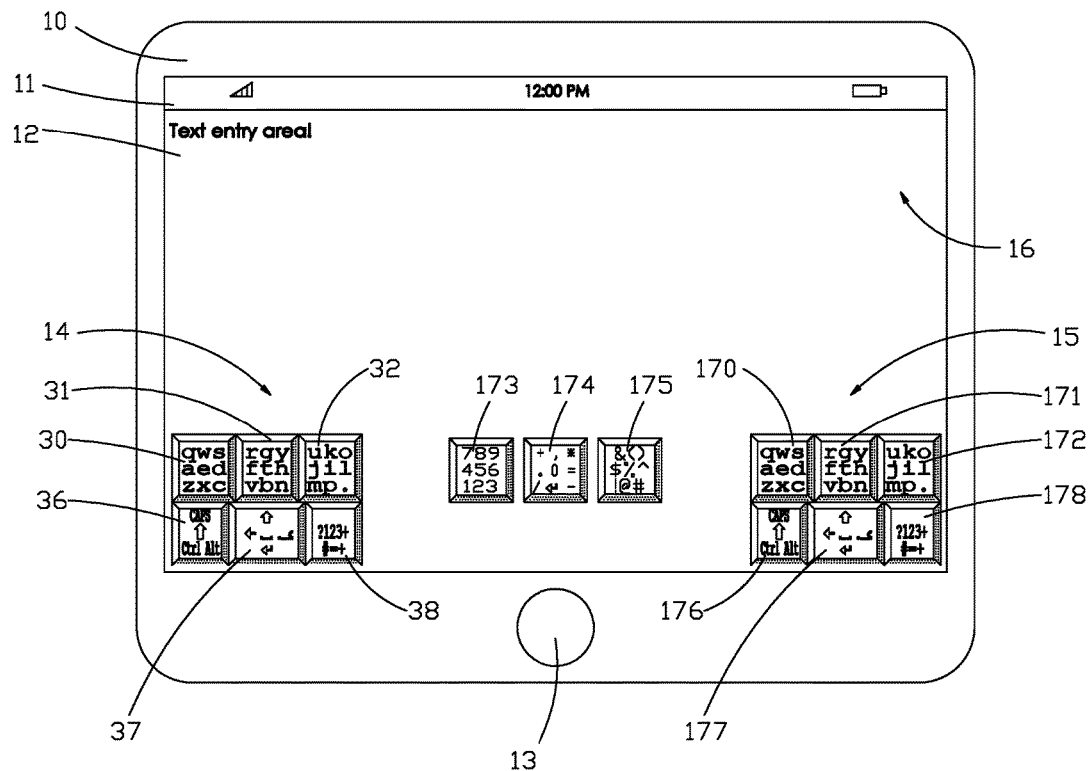
FIG. 17 is a front view of an electronic device in accordance with some methods of some embodiments of the invention.

For example, if the keyboard does not fill the extents of the width or height of the display screen, which it might not on a tablet computer, and the user presses on the keyboard with two fingers, the user could move his fingers apart to enlarge the keyboard. Further, if the user kept moving his fingers, past a set maximum enlargement, the keyboard could split into two sets of buttons, or keys, which, further, could contain copies of keys. The two sets of keys could then be positioned on opposite sides of the display screen. An embodiment of the invention comprising two or more sets of keys is illustrated in FIG. 17. In this provided example of the method, the user could change the keyboard from a smaller keyboard preferable for typing on with one hand, to two sets of keys that would be a preferable layout for the user using two hands to type. One such method of typing with two hands, that is preferable to have a split keyboard, is "thumb" typing.

FIG. 17 illustrates an embodiment of the invention. The device 10, of this embodiment, resembles a popular tablet computer. A Status Bar 11, Text Entry Area 12, and Home button 13 are shown for reader orientation. The display screen 16 contains a software keyboard of the invention comprising: two identical sets of multidirectional buttons, 14 and 15, which contain the alphabetical characters. As the reader can see in the illustration, the buttons 30, 31, 32, 36, 37, and 38 of the left set of buttons look and function identically to the buttons 170, 171, 172, 176, 177, 178 of the right set of buttons. Whereby the user may choose to type with the keyboard of this embodiment by holding the device in both hands and typing with his thumbs. The user can choose to type by using buttons of the right set, or left set, or a combination of the two sets of keys. The user may, thus, use the keyboard in a variety of ways, to his preference. This embodiment further includes a set of multidirectional buttons 173, 174, and 175, which contain the number pad, as well as other characters. These three buttons are centrally placed, and do not have copies on the display screen.

It is common in the art to split the keys of a common keyboard. However, splitting keys comprised of multidirectional buttons, as well as placing a plurality of copies of keys comprised of multidirectional buttons, or common keys, comprising alphabetical characters is novel and unobvious. A person skilled in the art could adjust the number, placement, display, and composition of the keys without departing from the scope of the invention. Further, the copied keys need not be identical, but could be similar while containing similar functionality.

In an aspect of the invention, the minimum displacement the user needs to move a press from the center selection area of a multidirectional button, which is the area within the motion threshold, is unrelated to the size of the button boundary. Further, the motion, or displacement, of the press required to pass a motion threshold is not based on the size or placement or shape of the multidirectional button on screen display, or graphic. A difference between multidirectional buttons and common menus, or buttons, is that the displacement of the press needed to exceed the motion threshold and move to another selection region may be less than the displacement needed to move from one similarly sized menu item to another. Further, the maximum displacement of a press need not be limited by an adjacent button boundary. The maximum displacement need only be limited by the extents of press motion, which on a touch screen is the screen boundary. On a common menu, or button, the user can often move between menu items, or adjacent buttons, by moving a press from one menu item, or button, to another, but the press must be over whichever menu item or button that is to be selected. An advantage of multidirectional buttons is that the user may be less accurate with a press motion.

In a traditional menu system, the user must be aware of the limits and selection boundaries of the menu item, or button, the user is selecting. In a pointer based user input system, the user must watch the pointer on the screen to see that it has moved over the menu item to be selected, and not beyond the menu item. In a touch based user input system, the user must likewise be aware of the placement of his fingers over the menu item to be selected, and not beyond the menu item. With directional buttons, the user only needs to watch the placement of the press. For the remainder of the methods of selection, the user only need to have a feel for how far the touch or pointer has moved, and in what general direction it has moved. In practice, the user of a multidirectional button will find it far easier to "touch type", which is to say that the user may issue commands while not having to maintain visual contact with the button, or menu, interface.

Common to all embodiments that use pointer based user input, and touch screen based user input based on a user press and movement of the touch, is the detection of displacement of the pointer or touch that has exceeded threshold values. A threshold value may have one value if the threshold consists of a radius of displacement and the angle of the radius. A threshold consisting of a radius and angle defines a circular threshold area, assuming that the X and Y coordinates represent equal distances per unit. A threshold value may have a plurality of values needed to define other shapes. For example, a threshold value consisting of an X and a Y value will define a rectangular threshold area.

In an embodiment, a multidirectional button has a plurality of motion thresholds with increasing press motion displacements, from the initial press, required to move the press to new selection regions. For example, on a touch screen, the user may move his finger past a first press motion threshold and continue to move his finger past a secondary press motion threshold. The user may continue to move his finger past more motion thresholds limited only by the size of the display screen.

In an aspect of the invention, the methods and embodiments of pointer, touch, and physical multidirectional button based input need not be mutually exclusive in the computing device but may be implemented in any combination.

FIGS. 3A, 6A, 6B, 6C, and 6D illustrate an example sequence in which a user selects one command from a plurality of commands that may be selected from a multidirectional button in order to illuminate the operation of a multidirectional button that displays a second plurality of command choices. FIGS. 3A, 6A, and 6C illustrate what is displayed to the user on a display screen 16. FIGS. 6B and 6D show positions of boundaries, thresholds, and touch points on the display screen, without displaying the content the user sees. The positions of boundaries and thresholds and touch points are not displayed to the user, but are shown only to illustrate methods of enabling a user to select from a plurality of choices from multidirectional buttons. The bounding button areas are the areas of a touch screen that will initiate the methods of this disclosure for multidirectional buttons, when pressed by the user.

FIG. 3A illustrates a display screen 16 which is displaying an example of a software keyboard comprised of multidirectional buttons. In this example sequence, the first step is comprised of the user pressing button 30. Upon receiving a press signal, the example button method determines the initial press position 24, illustrated in FIG. 6B. The method then detects motion of the press to determine if the press has exceeded a first motion threshold 28, illustrated in FIG. 6B.

The second step of the example sequence is comprised of the user moving the press beyond the motion threshold to new press position 60. The method, upon detection of the press having moved outside of the first motion threshold, initiates a new multidirectional button. The method now highlights the current command that will be selected if the user releases the press, which in this case is the "a" key, as illustrated in FIG. 6A. In this example method, the method initiates the display and processing of a secondary set of commands. As can be seen in FIG. 6A, the original button, as displayed to the user, has been replaced by a secondary multidirectional button 66. FIG. 6D illustrates a new, secondary motion threshold and new selection regions. In this example, three new commands may be selected from the multidirectional button consisting of English words followed by a space character. The user may now move the press to the right, the positive X direction, at an angle appropriate to release the press in one of the three selection regions to choose one of the three secondary commands.

Illustrated in FIG. 6D, the third step of the example sequence is comprised of the user moving the press beyond the secondary motion threshold 68 to the final press position 65. This final press position is in selection region 63. The method, upon receiving a signal that the motion has exceeded the secondary motion threshold, changes the display of the secondary multidirectional button 66, as illustrated in FIG. 6C, to highlight the command in the lower right of the button. In this example, the selection region 64, illustrated in FIG. 6D issues the same command, upon press release, as will be issued if the release occurs when the selection position is within the secondary motion threshold.

In the fourth step of the example sequence, the user releases the press in selection region 63. This selection region corresponds to the English characters, and word, "and", which is entered into the device.

In an aspect of the invention, a multidirectional button method may simply check, upon press release, that a press has not exceeded a motion threshold and the press has or has not moved in a direction. For example, in the previous example sequence, the button method may detect, upon press release, if the release position is in the negative X direction. If so, the press has not moved in the positive direction and the method would enter the command "a" into the device.

In the previous example sequence, the user pressed a button, moved the press in a direction, then moved the press in another direction, and released the press. This user input sequence resulted in a full word, and following space character, being entered into the device; whereby the reader can ascertain that typing can be accomplished little effort, high speed, and great accuracy with multidirectional buttons.

In an aspect of the invention, the exceeding of a secondary motion threshold and/or a press exceeding a time threshold when the press is in a secondary selection region or the center selection region, may initiate yet another level of commands. The terminology used to describe secondary menus in common software menus is the term "submenus". Just as menus can lead to submenus, which can lead to more submenus, multidirectional buttons can lead to more and more multidirectional buttons. There is no theoretical limit to the number of command choices and multidirectional buttons, or we could say "sub-multidirectional-buttons", which can come from an initial multidirectional button.

In an aspect of the invention, given the present disclosure, a programmer skilled in the art could easily implement multidirectional buttons, keys, and menus and secondary multidirectional buttons, keys, and menus, or sub-multidirectional buttons, keys, and menus as one method, or as two or more methods. A main difference between the a first level multidirectional button, key, or menu and a next level is that the initial position of the press is set at the position of the detected user press, whereas in a next level multidirectional button, key, or menu the initial position of the press is set from the current press position at the time of the initiation of the level. Also, some data values and functions of the method may be reset at the time of the initiation of the level. For example, the system timer may need to be reset at the time of the initiation of the level. Further, sub-multidirectional buttons, keys, and menus may display differently to the user, but may share methods to process some button events. Further, the methods may be exactly the same methods, with only some data of the multidirectional buttons, keys, and menus and secondary multidirectional buttons, keys, and menus, or sub-multidirectional buttons, keys, and menus differing.

In a method of the invention, a method for implementing a software keyboard tracks the characters of a word that is currently being entered by the user. The method detects motion of one or more presses. The method, upon detection of motion exceeding a primary motion threshold initiates a secondary level of commands. The commands that will be executed upon the release of the press, if the motion of the press has exceeded a motion threshold, consist of keystrokes that complete possible words that are currently being typed. For example, if the user has currently begun a new word by typing the character "m", before beginning the same user input sequence as in the previous example, the method will display a different set of secondary commands. FIG. 12 illustrates a secondary multidirectional button 120. In this example, three common English words are displayed in the secondary multidirectional button, as seen on the display screen 16. The three words displayed: "mad", "made", and "make" represent common English words that may be completed if the user chooses to move the press beyond a secondary motion threshold into one of their respective selection regions.

In an aspect of the invention, the display of the secondary, or sub-multidirectional buttons, keys, or menus may be displayed to the user in an unlimited number of ways. For example, button 120 in FIG. 12 illustrates a multidirectional button comprising nine selections and choices. A number of these selection regions are empty and do not display commands. (This does not limit the selections from having associated commands, but they are not displayed in this example.) Further, the button need not be displayed to the user under the users finger, where he may not be able to see the selections, but may be placed anywhere on the screen convenient to the user. FIG. 13 illustrates another display of a multidirectional button 130 that displays only four selections. Both these buttons may comprise the same methods and embodiments of the method, but may comprise some different data associated with the respective buttons resulting in different displays of the buttons.

FIG. 19 likewise illustrates yet another different display of the multidirectional button 190. This example button 190 is functionally equivalent to button 120, but with an alternative display of the button. The methods and embodiments of the invention should not be limited to the example graphic displays of the multidirectional buttons, keys, or menus.

In a method of the invention, some methods implementing a software keyboard with multidirectional buttons: store characters entered by the user into the software keyboard; parse the stream of entered characters to determine the characters that have been entered of a word that is currently being entered into a device containing the software keyboard; look up possible words that the user may be entering in a software dictionary; and display multidirectional buttons, keys, or menus, which may be secondary (or sub-) multidirectional buttons, keys, or menus that contain one or more commands that consist of one or more words, optionally followed by the space character, that have been found in the software dictionary.

In an aspect of the invention, many modern device operating systems, such as but not limited to iOS and Android provide methods to access built in software dictionaries and methods to obtain completion words and spell checking. Accessing a software dictionary is common in the art.

In an aspect of the invention, a software dictionary may comprise a plurality of dictionaries. Dictionaries may comprise, but not limited to, a common dictionary comprising a list of words in a language, a dictionary comprising a list of words and a frequency or ranking of the use of the word in common language, a dictionary comprising a list of frequently used words, a dictionary comprised of user defined words, a dictionary of second, or first, or any order frequency words, and any dictionary common in the art. In a method of the invention, the method first searches a dictionary to determine the most likely words that the user is typing or intending to type, and then proceeds to check dictionaries with less likely words or results. For example, a method may check for results from a smaller dictionary, such as a dictionary comprising frequently used words, and then if the dictionary does not provide enough results, the method will search a larger dictionary, such as a common dictionary comprising a list of words in a language. Whereby more likely word completions and replacement word candidate may be returned from the search first, thus improving the reliability of an autocorrect, spell check, word prediction, or word completion function.

In an aspect of the invention, the software dictionary may contain words and some values comprising ranking of frequency or probabilities of use of the words in common language. The software dictionary may also comprise frequency and/or probability data for n-grams. N-grams are another term for first, second, or any order word frequencies. A multidirectional button may contain a list of words in order of their frequency ranking found from the software dictionary.

In an aspect of the invention, the software dictionary may contain words and a ranking of the second order frequency of use of the words in common language. A multidirectional button, key, or menu may contain a list of words in order of their second order frequency ranking found from the software dictionary. Wherein second order frequency ranking comprises the frequency ranking of words that follow the last typed word. For example, if the last typed word is "this", the word "is" would have a high frequency ranking and the multidirectional button, key, or menu would likely contain this word as a command and selection choice if it uses the second order frequency ranking to populate its command choices.

In a method of the invention, a multidirectional button is populated with commands retrieved from a data file. A parsed stream of characters that comprise the current word being entered into the device is used as a key. Using the key, the data file is searched for a list of possible completion words that the user may be entering. If one or more completion words are found, the multidirectional button selections are then populated with these words. The user of the button may then choose one of these words to quickly enter the remaining characters of the word into the device from the multidirectional button. Whereby the user can quickly select and input full words without having to enter all the characters of the word.

In an aspect of the invention, the lists accessed by the keys may contain full words, or may contain only the remaining characters of the word. If only the remaining characters are stored, the data file will be smaller. The complete word would be comprised of the remaining characters appended to the characters of the key.

The present method of the invention further including: determining if all the selections of the multidirectional button are filled by words from the list of completion words found from the data file. If it is determined that there are fewer words in the list than open selections to be populated, the method fills the remaining empty selections with possible completion words determined from a software dictionary. The completion words may be ordered by first or second order frequency rankings, whereby the empty selections may be filled with the most frequently expected next word.

The present method of the invention may further include ranking the possible completion words found in a software dictionary by frequency or probability. The most frequently used words are then added as command selections to the empty selections of the multidirectional button to further populate the button selections. Using this method, the data file does not need to have a full complement of possible completion words.

In an aspect of the invention, the data file may use a variety of methods to arrange the order of the lists of words to give the user some consistency in the direction of the press motion to select similar words. For example, the word "up" may be entered into a list in the data file to always be in the top selection position—so the user may move the press motion, or we could say "flick", the button "up" to select the word "up". Further, words that are in the past tense cold be ordered in the list to the in the left selection position—so the user may "flick" back from the current typing direction, which is left (for left to right written languages).

Further, words with common endings can be located in the same directions of the press motion, or we could say selection region. In an example, the plural form of a word, often with an "s" ending in English, could be located in the top most selection region 81 (FIG. 4B). In another example, the past tense form of a word could be located in the left most selection region 87 (FIG. 4B). In an example, the gerund form of a word, usually ending with "ing" in English, could be located in the right most selection region 83 (FIG. 4B). Whereby the user will be able to more quickly learn where words are in the (sub-) multidirectional buttons, keys, or menus by having common types of words in consistent directions, or selection regions. Due to multidirectional buttons, keys, or menus being able to be fully nested, thousands of words may be quickly accessed through a single press and release. So having common word types accessed in common directions is a superior result. In an aspect of the invention, a person skilled in the art could assign a variety of different, but consistent positions or directions for words of different types of speech, without departing from the scope of the invention.

A data file, accessed from some methods of the invention comprises one or more of the following: the commands of a multidirectional button, key, or menu (or sub-multidirectional button, key, or menu), what graphic to display to the user which may comprise characters or words, and/or symbols, and/or some other graphics, and where to display the graphic comprising some coordinates, what size to display the graphic comprising some size values, motion thresholds of displacement or force, time thresholds, angles for determining the angular apertures, and first and/or second order command frequency data. The data may also comprise a pointer to other data files or dictionaries or data structures. It is common for software methods to enable a user to modify a data file. In a method, the user can modify the multidirectional button, key, or menu to their preference through editing or modifying the data file through common software means. For example, a user could enter his name or email signature as a command of the multidirectional button, key, or menu. In an aspect of the invention, it might be cumbersome to allow a user to modify the angular apertures. As such, an embodiment of the invention comprises some (sub-) multidirectional buttons, keys, or menus with 16 selection regions. In this embodiment, each of the selection regions 81-88 of FIG. 4B may simply be divided into two selection regions each. In this embodiment, if there were to be eight commands, then each pair of the divided selection regions would contain the same command. However, if the (sub-) multidirectional buttons, keys, or menus were to contain four commands for example (like button 37 in FIG. 3A, however, we will call the commands "left" "right" "up" and "down", and the commands are in the expected locations determined from their names), then the selection regions in the corners that were divided would be filled with the command from its outside neighbor. For instance, the selection region 82 is divided into two regions, which we will call 82a and 82b. 82a is to the left of 82b. Region 82a would contain the command "up", and 82b would contain the command "right". In this embodiment, there are no selection regions without commands, and the total angular aperture that the user may move the press towards has been increased for reliability. In a method of the invention, the user may select a selection region to place a command into, and the method will determine if its neighboring selection region is empty, and copy the command into it. Similarly, the programmer of the button, or a method that may automatically assign commands to the buttons programmatically may likewise make use of this embodiment and method. Whereby the user may more easily modify or define commands of the (sub-) multidirectional buttons, keys, or menus, or the programming of the (sub-) multidirectional buttons, keys, or menus may be simplified.

In an alternative method, the method detects a release in a selection region that does not have a command for the device assigned to it; the method then determines the nearest selection region and inputs the command from the nearest selection region to the device. Determining the nearest selection region may be comprised of determining the displacements of the position of the press motion at the time of the press release to nearest points on the two nearest angular aperture and comparing the two determined displacements, or the angle at the time of the press release may be compared to the nearest two angles that define borders with neighboring selection regions. Determining displacements of nearest points, or determining nearest angles is common math. A person skilled in the art may select from a variety of slightly different methods for determining the nearest selection region. In an enhancement to the method, the method further comprises determining if the release of a user press is within a threshold of displacement, or within a threshold of angular difference, to a selection region border, and then only determines a command from the nearest neighboring selection region if the release is within the threshold.

In a method of the invention, full exclamations and questions may comprise the commands of a multidirectional button or a sub-multidirectional button. For example, if the user were to press multidirectional button 38 and move the press motion, or we could say "slide" or "flick", to the left past the motion threshold, and initiate a sub-multidirectional button, the button may contain full questions like "What?", or "What for?"; whereby a user may quickly and reliably enter/input frequently used questions, or enter/input frequently used exclamations within one press and release of a multidirectional button.

In an aspect of the invention, the commands of a multidirectional button or a sub-multidirectional button or menu or secondary (sub-)multidirectional button, key, or menu may comprise cursor control keys. In an aspect of the invention, the commands of a multidirectional button or a sub-multidirectional button may comprise a return or enter keystroke or command. Display data for the command may comprise a graphic comprising a "search" or "go" or "dial" or "send" icon, as is common in software keyboards.

In an aspect of the invention, the commands of a multidirectional button, key, or menu or secondary (sub-)multidirectional button, key, or menu may comprise common word endings, such as but not limited to "s", "ed", "tion", "ing", "ly", etc. In an aspect of the invention, the commands of a multidirectional button, key, or menu or menu or secondary (sub-)multidirectional button, key, or menu may comprise common smileys or emoticons.

In an aspect of the invention, the commands of a multidirectional button, key, or menu or menu or secondary (sub-)multidirectional button, key, or menu may comprise a command to go to settings for the button or keyboard, or may comprise a command to switch to a different keyboard or start a common keyboard switcher/picker menu or method. The different keyboard may comprise a common QWERTY keyboard comprised of common keys, or may comprise a different language or different symbols. Settings that control the behavior of an input object are common in the art, as is a keyboard switch/pick menu. Settings may comprise switches to turn off or on features such as audible or tactile feedback such as a click sound when a button or key is pressed or released, an autocorrect function, word predictions, and auto-capitalization. Settings may further comprise a switch or menu to choose between keyboard layouts and languages and differing graphics, sometimes called "skins" in the art. Settings may also comprise a user settable motion threshold value and/or timer threshold values. Settings may also comprise means to enable the user to edit the data for the buttons, keys, or menus of this disclosure.

In an aspect of the invention, the commands of a multidirectional button, key, or menu, or secondary (sub-) multidirectional button, key, or menu may comprise one or more of the following: a delete word command, whereby a full word is deleted; and a redo command, wherein the redo command comprises one or more of the following: reinserting a previously deleted word, reinserting one or more previously deleted characters, undoing or reinserting an autocorrected word, inserting or reinserting a prediction word, and inserting one or more characters or words from the system clipboard. Wherein reinserting may comprise replacing a character, word, or command in the text stream with a replacement word, or may comprise detecting some characters, words, or commands have just been deleted and then inserting some characters, words, or commands. FIG. 18 illustrates a redo command in the right selection region of multidirectional button 36 comprising a graphic symbol of a double right arrow; indicating the use the to user. The command associated with the selection region calls a method to execute the redo command.

FIG. 18 illustrates the delete word command, which is the command in the left selection region of multidirectional button 36. The delete word command may also be referred to as a backspace word command. Whereby, in the touch screen embodiment of the present invention, the user may simply touch a multidirectional button, or an area of the screen and slide/move the press motion to the left to backspace over the entire last word within one press and release. (The phrase "within one press and release" is intended to include the press and release in this context. Specifically, the phrase may be a press and release only (in other sections of this disclosure), or it may be a press, release and other button events occurring between the press and the release, as is the case for the preceding sentence.)

In a method of the invention, the method will track words that have been autocorrected in the text stream, and will detect when one of these words has been deleted, or replaced by a common autocorrect or spell check function. The method may build and update a list, array, or database, of autocorrected words comprising one or more of the following: an originally typed word, a replacement autocorrect word, one or more prediction words, and one or more text selection positions in the text stream where a word was autocorrected. The method may further track insertions in the text stream and update the text selection positions in the list or database. Upon the user selecting the redo command, the method may search the list to find if the current cursor position is at a word or within a text selection region or at a text selection position that was previously replaced by an autocorrect or spell checking function, and substitute and/or insert the originally typed word, which was previously found to be misspelled, and input the originally typed word to the device. Wherein the text selection position comprises any cursor, or text selection position within a range of text selection positions found in the list or database. Whereby the user may quickly fix a word that has been autocorrected in error by deleting the word, which may be quickly accomplished with the delete word command, and then selecting the redo command. Alternatively, a user may move the cursor, or text selection point, within a word that was previously autocorrected, or at the beginning or end of the word, and select the redo command to replace the word with the originally typed word.

In an another method, the method may determine that the current cursor position is at the end of a currently typed word that has just been replaced with a common autocorrect or spell check function, or the current cursor position is to the right (or left for right to left languages) of the last replaced word and there is one or more common punctuation characters or symbols, such as a period, question mark, exclamation, and including a space character between the current cursor position and the end of the word. The replaced word may be referred to as the autocorrect word or autocorrected word. The method upon detecting the user selecting a redo command from a multidirectional button, key, or menu replaces the autocorrected/spell-checked word with the originally typed word. Whereby the user may redo a misscorrected word that he just typed with one press and release, and optionally "flick" or "slide", of a multidirectional button, key, or menu or secondary (sub-) multidirectional button, key, or menu.

In another method, the method detects the selection of a word ending character or command, and saves the currently typed word as a redo word, insert word, or paste operation word, before calling an autocorrect function. If the user were then to select the delete word command, followed by a redo command, the redo command would then reinsert the originally typed word. In an enhancement of the method, the method detects the cursor at the end of the text stream, or detects that the user has not moved the system cursor since the last word was typed or inserted or replaced, and replaces the word just typed and optionally autocorrected with the originally typed word after detecting the user selecting a redo command. In an enhancement to the method, the method detects the user selecting the redo command again, and replaces the word to the left (right in right to left written languages) with word predictions. The method may loop through an array or list of prediction words returned by an autocorrect function, and replace the word to the left in the text stream with words from the array sequentially in response to detecting a sequence of redo commands selected by the user.

Arrays, lists, and databases are common in the art. They are common data structures for containing and accessing data, such as characters, words, or commands. The arrays, lists, and databases may be multi-dimensional comprising multi-dimensional arrays or lists whose values comprise sub-lists. They may also comprise a dictionary of words and/or commands. A key to look up values in these data structures is also commonly referred to as an index or array index. It is also common to refer to the values as elements or variables. Further, these data structures may also be referred to as, but not limited to, matrices, tables, lookup tables, or just by a more general term such as database, array, or list. Building, updating, checking, and accessing a list, array of data, dictionary, database, or similar data structures are common knowledge in the art. The list, database, or data structure may comprise an array of data, which is also common in the art. The list, database, or data structure may comprise an XML or Plist file, which is also common in the art. Further, replacing, inserting, deleting, or reinserting words in a text stream or reinserting characters in words is also common knowledge in the art. It is also common to determine cursor positions and determine if the cursor position is in, or borders a word in a text stream. It is also common for text stream to contain formatting characters, punctuation characters, symbols, and other common objects such as, but not limited to, graphics.

An alternative method would be to just store the autocorrected words and the corresponding originally typed words in a list, array, database, or similar data structure. Upon the method detecting a redo command selected by the user, the method parses the current word that the cursor is in, or bordering, and uses the parsed word to look up the original typed word from the database or data structure. The method then replaces the autocorrected word with the original typed word. This method, while easier to implement, may make mistakes if the word the cursor is on is a word that was not autocorrected (or spell checked and replaced), but is the same word as another word in the text stream that was autocorrected. However, this method has the advantage of being easier to implement, as the positions in the text stream of autocorrected words need not be updated during cursor position changes and editing operations.

In an aspect of the invention, the autocorrect word may comprise a replacement word, sometimes referred to as a "candidate" word in the art, which has been selected by the user through a common spell check or autocorrect function. The term "candidate word" may also refer to any word that is presented the user as a suggested word, or considered as the word the user intends to input or correct. For example, a candidate word may be a prediction word, or a spell correction word. A prediction word is a word that is predicted that the user is trying to type. For example: if the user types "typ", a prediction word might be "type", "typed", or "typing".

In a method of the invention, the method comprises determining one or more of the following conditions: the system clipboard containing an object that can be input to the device as a command, a current cursor position not in a cursor position where a word was previously replaced by an autocorrect or spell check function, a current cursor position at the end of the text, a current cursor position at the end of the text and the last entered word was not replaced by an autocorrect or spell check function, a current cursor position placed to the right (or left for right to left written languages) of a non-alphabetical character of the current language, a current cursor position at the beginning or end of a new line, or a current cursor position placed at the end of a word or sentence. The method further detects the user selecting a redo or insert command, and the method upon determining one or more of the above conditions being true inputs the characters, words, or object from the clipboard to the device upon detecting the user selecting the redo or insert command. An advantageous result of the present method is that a multidirectional button, key, or menu may provide one selection and/or command that may both redo a previous undo command or redo a previous autocorrect or spell check replacement, and insert content from the clipboard, dependent on where the cursor is, and the above listed conditions.

In an aspect of the invention, commands for the device may comprise a common "insert" command to insert objects from a common computing clipboard. The command need not check the above stated conditions before inserting the contents of the clipboard, through common means.

In an aspect of the invention, commands for the device may comprise common "undo" and/or "redo" commands, as found in modern device operating systems. In a method of the invention, the method detects the system cursor, or insertion point, has not been changed by the user since the last character or word or phrase or command has been inserted or input, and upon detecting the user selecting a common undo command, inputs the undo command to the device or deletes the last inserted or input word or partial word from the text stream. The method detecting the user continuing to select the undo command, undoes the last text changes in the same method that is common in modern operating systems and software. The method may further comprise detecting the user selecting a redo command from the multidirectional button, key, or menu and implements a redo function through means common in the art.

In an aspect of the invention, parsing streams of text to determine the characters that make up a word that a cursor, or a text selection point, is currently on, and deleting those characters is common in the art. Further, inserting, replacing, reinserting, and substituting words into a text stream are common in the art.

In an aspect of the invention, a command of a multidirectional button, key, or menu may comprise an originally typed word that was replaced by another word through an autocorrect, or common spell check function.

It is common for application programs to provide undo and redo commands. However, it is not common for keyboards to comprise buttons, keys, or menus providing undo and/or redo commands beyond providing a delete key and a right cursor key. In a method of the invention, the method comprises updating a database, array, list, or similar data structure comprising recently entered commands, as is known in the art, as the user enters commands from a keyboard of the invention or a multidirectional button, key, or menu of the invention. The recently entered commands may also comprise some undo and/or redo commands as well as characters, keystrokes, symbols, and any commands that can be input to the device from a multidirectional button, key, or menu, including a delete key and a backspace key. The method upon detecting a user selecting an undo or redo command deletes or reinserts recently entered commands, as is common in the art. The method upon detecting a user selecting an undo or redo command also updates the database, array, list, or similar data structure.

In an aspect of the invention, a command of a multidirectional button, key, or menu may comprise a word that is expected to be the next word typed. In a method of the invention, the method checks a common database comprising second order, and/or first order, word frequencies or probabilities. This database holds one or more words that frequently follow common words. (Wherein common words may comprise words commonly used in a language and/or words commonly used by a user, which may be accessed from a user dictionary or parsed from a user's messages or data.) The currently typed word serves as a key to look up the expected next word from this database.

The database may further be enabled to provide expected next words for different word types—such as, but not limited to, nouns, adjectives, pronouns, etc. In an enhanced method, the method may parse words of the text stream to determine if the next expected word is a plural, or singular, and the commands of the multidirectional button, key, or menu may be populated with the corresponding singular or plural forms determined from the parsed words. In another method, the method may parse words of the text stream to determine if the next expected word is a particular type of speech, often called the parts of speech such as nouns, verbs, adjective, etc., and the commands of the multidirectional button, key, or menu may be populated with the corresponding type of speech determined from the parsed words. These two methods may be combined.

In a method of the invention, a method for implementing a software keyboard: detects the crossing of a first motion threshold of a multidirectional button, or detects a time exceeding a threshold comprising a time interval set during the detection of a button event; upon detection of the crossing or exceeding of one of the thresholds, the method displays a second level of command choices; wherein the second level of commands may be comprised of, but not limited to, common variations of a word or combinations of words. For example, FIG. 13 shows a multidirectional button of the invention 130 populated with commands comprising common variations of the word "make". Of course, the multidirectional button shown could be comprised of any number of selection regions and commands. The number of outside selections being comprised of three selection choices in this example was chosen just for the simplicity of understanding the invention.

In a method of the invention, a method for implementing a software keyboard: detects the crossing of a first motion threshold of a multidirectional button or detects a time exceeding a time interval set during the detection of a button event; displays a second level of command choices; detects the crossing of a secondary motion threshold or detects a time exceeding a time interval set during the detection of a button event; and displays a third level of command choices. The third level of commands 130 (FIG. 13) may be comprised of, but not limited to, common variations of a word or combinations of words.

In an aspect of the invention, the commands of a multidirectional button, key, or menu 130 (FIG. 13) of any level comprises common variations of a word or combinations of words.

FIG. 12 illustrates a user sequence of commands, described previously, that initiates a second level multidirectional button. The button 120 contains three words "mad", "made", and "make" and the "a" character. If the user moves the press to the right and downward, into selection region 63, illustrated in FIG. 6D, the command "make" will become the new center selection. Upon the detection of the new center selection, the button method will display a third level of command choices. As illustrated in FIG. 13, the newly displayed multidirectional button 130 displays three new commands, comprised of the words "makes", "making", and "make up". If the user were to subsequently move the press back to the left and down and release the press, the user could select the phrase "make up", followed by the space key. In total, the user would have had to select the "m" key with a press, motion, and release, and then pressed a button, moved the press in three directions, and released the press to enter eight characters into the device. By comparison, on a conventional keyboard, the user would have had to move his fingers to eight keys and pressed and released the eight keys. As the reader can see, a software keyboard comprised of multilevel multidirectional buttons allows the user to enter complete words, and even pluralities of words, with a reduced amount of presses and motions. Further, the amount of motion required to exceed a motion threshold may be significantly less than the motion required to move between keys on a conventional keyboard.

In an aspect of the invention, a multilevel multidirectional button may wait to initiate a next level multidirectional button, or set of command choices, until the motion of a press has both exceeded a motion threshold and the motion is below a threshold of velocity and/or below a threshold of velocity for a threshold of time, and/or above a threshold of velocity or displacement in a direction substantially different from the direction of the press motion from the initial press point to the point at which the motion threshold was reached. There are many possible methods that a person skilled in the art could implement to determine when to initiate a next level multidirectional button. Further, a multilevel multidirectional button may initiate the next level while delaying displaying the button on the display screen. As such, a user who quickly moves a press in one or more directions need not be distracted by the display of multidirectional buttons flickering by on the screen.

In an aspect of the invention, a multilevel multidirectional button may wait to initiate a next level multidirectional button, secondary or sub-multidirectional button, or set of command choices, until the motion of a press has both exceeded a motion threshold and the motion is below a threshold of velocity in a direction substantially different from the direction of the press motion from the initial press point or position to the point or position at which the motion threshold was reached, or a time interval from the time of a button event has been reached (or it could be stated: the method detects a time interval exceeding a time threshold). There are several possible methods that a person skilled in the art could implement to determine the initial and current directions of the velocity and/or motion of the press.

In a method of the invention, the method comprises: determining when to initiate a next level multidirectional button comprising the following steps:

1. Determining an angular direction $\beta'$ (FIG. 14) of the press motion at the time the press motion crosses a motion threshold 28 from the position of the press motion substantially at the time of the crossing 202, and the initial position of the press 201. Angular directions may be determined from the inverse tangent (sometimes called "Arctan") function using the difference in X and Y press position offsets, as has been previously described.
2. Saving the determined angular direction $\beta'$. We will call this angular direction "Angle1".
3. Determining the current angular direction of the press motion from the current position of the press motion 204 and one or more previous positions of the press motion 203.
4. Saving the determined current angular direction $\beta''$. We will call this angular direction "Angle2".
5. Finding the angle between Angle1 and Angle2 comprising finding the absolute value of the difference between these two values. We will call this angle "Angle3".

6. Determining if Angle3 is greater than Pi radians, provided the determined angles were found in radians (180 degrees, if the angles were found in degrees).
7. If the method determined that Angle3 is greater than Pi radians (or 180 degrees), subtract Angle3 from 2*Pi radians (360 degrees for degrees) and save the result as Angle3, overwriting the previous value.
8. Determining a current velocity of the motion of the press V2 (FIG. 15) from the current position of the press 204, a previous position of the press 203, and a time interval calculated from time values or time stamps determined from the two motion signals that provided the two press motion positions. (Alternatively, a running average of the current velocity could be used.)
9. Determining the current velocity of the press motion in the initial press direction V3 (FIG. 15) by multiplying the determined current velocity of the press motion V2 by the cosine of the determined Angle3. We will call this value "velocityInInitialDirection". (Of course, the correct cosine function for the type of angle supplied, radians or degrees, needs to be used.)
10. Determining if the determined velocityInInitialDirection value is below a velocity threshold value by comparing the two values.
11. Initiating a secondary or next level multidirectional button, key, or menu (or we could say "sub-multidirectional button, key, or menu"), or command for the device, upon the method determining the velocity of the press motion in the initial press motion direction, as found in velocityInInitialDirection, to be below the velocity threshold.

FIGS. 14 and 15 show a graphical representation of the elements of the method. V1 represents the velocity in the initial direct from initial press position 201 to the position of the press 202 at the time the press motion exceeds the motion threshold. Press position 203 is the last or previous press position before the press position at the time of release of the press 204. (Press position 203 has been moved to the press position of 202 in FIG. 15 to form the reference triangle.) FIG. 15 shows a common right triangle used for reference with which any person skilled in the art of mechanical engineering could use to determine the velocity V3 in the initial press motion direction, which is represented by the direction of V1. V2 is the current velocity and direction of the press motion. H is the hypotenuse of the triangle and is shown just for reference. Angle3 is the angle between V3 and V2 in this drawing. As the reader can see, V3 in this drawing is a small fraction of V2 and may represent a velocity within a threshold of velocity, which upon detection may then initiate a sub-multidirectional button, key, or menu.

Using this method, a user may be able to select from a plurality of choices and selection regions without having to substantially stop the press motion, and/or wait for a time interval, before starting in another direction. For example, a next level multidirectional button may contain eight directions. For the majority of these directions, the user just needs to move the press in an initial direction past the initial motion threshold, and then move the press motion in a second direction without pausing. Because the component of second press motion velocity in the first motion direction is below a velocity threshold, for the majority of directions, the next level multidirectional button will be initiated and a command selected from it without pausing the motion.

In an aspect of the method, Angle1 and/or Angle2 may be averaged from a plurality of angles, as previously noted.

In another method of determining when to initiate a sub-multidirectional button, key, or menu, running averages of the current angle and/or direction of the press motion may be determined, as previously disclosed, and the determined average current angle and/or direction of the press motion may be compared to an initial angle and/or direction of the press motion. If the difference of the two angles and/or directions exceeds an angular threshold, the next level sub-multidirectional button is initiated. In another method, the first and/or second derivatives of the angle/direction of the press motion may be found with respect to time. A sub-multidirectional button of the invention may be initiated when it is detected that the first or second derivative crosses a threshold value. The presently disclosed methods of determining when to initiate a sub-multidirectional button may be used in any combination.

In some embodiments of the invention, pluralities of multidirectional buttons comprise a keyboard, as has been disclosed previously. The key layout of a common keyboard may not be ideally adapted from common keys and buttons to multidirectional buttons. The most common keyboard layout in many countries is the QWERTY keyboard layout. FIG. 7 illustrates an example QWERTY keyboard layout 70 adapted to multidirectional buttons. All of the main Latin characters, A-Z, remain in substantially the same positions as they do on a common keyboard. This keyboard layout would provide a user, who is assumed to be familiar with the QWERTY layout, the easiest multidirectional button keyboard layout to learn. However, the center command, or key, choice in a multidirectional button is the most efficient command to execute. In the QWERTY layout, the characters "s", "g", and "k" occupy these positions. These characters, however, are not the most common characters to type.

In an embodiment of the invention, a keyboard consists of a plurality of multidirectional buttons. As illustrated in FIG. 8, the layout of the buttons is comprised of the QWERTY keyboard layout 80 with the positions of three key pairs swapped. The swapped pairs are the "s" character and the "e" character, the "g" character and the "t" character, the "k" character and the "i" character. The swapping of these three letter pairs will have the result that the center button command choices, or keys, are executed approximately 15% more often when typing common English text. (This has been found from commonly available character usage frequency data. The center commands are used approximately 22% of the time with the swapped pairs layout, verses 7% of the time with a conventional Qwerty layout during normal typing.) This keyboard layout will be herein referred to as the "Temple" keyboard layout.

The Temple keyboard layout will have a slightly higher learning curve, for a user accustomed to the QWERTY layout, but will result in greater typing efficiency. The Temple layout reduces the learning curve by only swapping adjacent keys. If the user looks for one of the six keys that have changed positions, the user will find the key, at most, one key away from the expected position. The reader should note that while the "a" key is the third most used character in the English language, the "a" key is not used as frequently as the "e" key. To place the "a" key in the center position of a multidirectional button would require that the "a" key be moved to a different multidirectional button, which would raise the learning curve substantially for a user accustomed to the QWERTY layout. (The Temple keyboard layout is only 1.3% less effective than if the "a" replaced the "i" key in a center position.)

In adapting the QWERTY keyboard layouts to multidirectional buttons, the "p" key, if left in its relative position to the other characters, sits alone in the right most of the four, nine commands per button, multidirectional buttons that comprise the basic Latin characters, as illustrated in FIG. 7 and FIG. 8. In an embodiment of the invention, the "p" is moved to be placed in the third, from the left, multidirectional button and to the right of the "m" key, as illustrated in FIG. 1A and FIG. 3A. In this embodiment, all of the basic Latin characters are contained in three multidirectional buttons. This minimizes the number of multidirectional buttons required to hold all of the basic Latin characters to three which can, in turn, allow for bigger sized multidirectional buttons for a given keyboard size.

In an aspect of the invention, many languages, such as English, may comprise fewer characters than will fit in three multidirectional buttons, keys, or menus of the invention, or more or less buttons. There may be one or more extra selections in the keys that comprise the basic letters of the language. In an enhancement to the keyboard of the invention, an extra selection may comprise a command that comprises a common combination of basic characters of the language. For example, key 32 (FIG. 18) contains a "th" combination. This combination of characters/letters is a frequently used combination of characters. Further, this selection may initiate a secondary or sub-multidirectional button, key, or menu comprising common word that begin with "th", such as but not limited to words like: "the", "them", "these", "though", "this", and "that" etc. Not only is the combination frequently used, but many of the words that begin with the combination are some of the most frequently used words in English. It is of obvious benefit to the user to provide quick and reliable access to easily type the "th" combination, and the words that begin with the combination, or words that contain the combination, within one press and release of a multidirectional button, key, or menu of the invention. In another example, the combination "ch" is a frequently used combination in German. This combination may fill the extra selection in German. Given the present disclosure, one skilled in the art could easily identify other combinations of characters in other languages, or the example languages, and add them to a keyboard layout.

Another common keyboard layout is the QWERTZ layout, widely used in Eastern European countries. The main difference between this layout and the common QWERTY layout is that the "Y" and "Z" characters are swapped. In an embodiment of the invention, the "Temple" layout, as well as the adapted QWERTY layouts of this disclosure, may be similarly adapted for countries that use the QWERTZ layout by swapping the "Y" and "Z" characters.

Another common keyboard layout is the AZERTY layout. The main difference between this layout and the common QWERTY layout is that the "A" and "Q" characters and the "Z" and "W" characters are swapped, and the "M" is moved the right of the "L". In an embodiment of the invention, the "Temple" layout, as well as the adapted QWERTY layouts of this disclosure, may be similarly adapted for countries that use the AZERTY layout by swapping the "A" and "Q" characters and the "Z" and "W" characters. However, the "M" character would have to be moved to a fourth multidirectional button/key to be to the right of the "L", as there would be no room for it. The "M" character could thus occupy a position in a fourth multidirectional button/key, or could occupy a position in a common key, or could occupy the position shown in FIG. 3A.

On a common QWERTY keyboard layout, the number keys are commonly above the basic character keys. These number keys do not adapt well to multidirectional buttons without changing their positions relative to a basic QWERTY keyboard layout. FIG. 7 illustrates the QWERTY keyboard layout, and the number keys, as adapted to multidirectional buttons. The reader can see that the number keys have been moved to the two upper right most multidirectional buttons. The multidirectional button containing the "1" through "9" keys has the number keys arranged in the same relative positions as found on the number pad of a common computer keyboard. The multidirectional button in the upper right contains the "0" key in the center, with an assortment of keys that are normally used with the number keys occupying the outer positions.

FIG. 9 illustrates a number pad 90 comprised of multidirectional buttons, which may be part of a larger keyboard layout, with the numbers "1" through "9" arranged in the position of a common phone key layout. The multidirectional button on the right contains the "0" key in the center, with an assortment of keys that are normally used with the number keys occupying the outer positions.

FIG. 10 illustrates another embodiment of a number pad 100 comprised of multidirectional buttons. In this embodiment, the numbers are placed in multidirectional buttons that are comprised of five command choices. Five command buttons are comprised of a center command choice and four command choices that may be selected by the user moving the press past a motion threshold into one of four selection regions. The buttons of this embodiment require less angular accuracy of the motion of the press from the user. This results in greater input accuracy, but at the expense of having another button, which may result in the multidirectional buttons needing to be smaller to fit into a given space.

In an aspect of the invention, a command issued by a multidirectional button may be a command to enter the results of a calculation into the device. It is common for a keyboard to contain an "=" (Equal) symbol as a command to enter into the device. However, it is not common for a keyboard that offers a full set of characters and numbers for writing in a language to offer a symbol to perform a calculation and enter the result of the calculation.

In a method of the invention, a multidirectional button may contain a special "=" equals symbol that not only enters an "=" symbol into the device, but parses the currently entered text for equations to calculate, calculates the equations, and enters the result of the calculation after the "=" symbol. The method of the invention may parse the current line, or may parse backwards from the current position to find a symbol that is not part of a calculation, and then parse from the position of the non-calculation position to the current insert position of the text. For example, if the method were to parse characters from the current insert position to the beginning of the current stream of text, and a "." (Period) character was found that did not have a number to its right, then the text calculation would start one character to the right of the period and the parsing to find the calculation string would stop. Then the calculation string could be parsed with an algorithm to calculate a result from the string. In an aspect of the invention, the method need not input the "=" symbol along with the calculated result. Parsing a stream of text or symbols to determine an equation, and calculating the equation and returning a result, is common in the art.

In an embodiment of the invention, a keyboard comprising one or more multidirectional buttons, keys, or menus comprising the characters or letters of the alphabet of a language and numbers and some mathematical functions; and further comprising an equals key/button that comprises parsing the entered text to determine an equation and calculating a result form the equation, and inputting the result of the calculation to the device. Optionally, the "=" symbol may be entered before the result of the calculation, and optionally, one or more space characters may be entered just before or after the "=" symbol, and optionally after the result to nicely format the result in the input text. Whereby a user of a keyboard of the present embodiment may easily enter text and equations and calculate and enter the result of the equations into the device without having to switch to a different application or keyboard. In an aspect of the invention, the alphabetical characters/letters of a language and the numbers and mathematical functions and symbols of a language may comprise separate screens of the keyboard. However, it is novel for a keyboard for inputting/entering letters to also comprise a calculator with an "=" equals key that returns a result as presently disclosed.

FIG. 11 illustrates an embodiment of the invention comprising the common QWERTY keyboard layout 110 implemented with three command multidirectional keys. Three command multidirectional keys have a center command selection that will be selected if the user releases a press of the button without press motion that has exceeded the motion threshold of the button. The center command is surrounded by two selection choices, one above the center command and one below the center command. The button method of this embodiment may simply detect press motion vertically, along the Y axis, to detect motion that has exceeded a motion threshold. As the reader can see in FIG. 11, if the user pressed the left most button, and released the press with no motion, the "a" character would be entered into the device. If the user pressed the same button and moved the press beyond the motion threshold in the positive Y direction and released the press, the "q" character would be entered into the device. The advantage to this keyboard layout is that the user needs less angular press motion accuracy. The disadvantage is that the buttons width would remain the same as a common keyboard layout. The user may prefer this keyboard layout if the user finds that flicking his fingers laterally, along the X axis, is not comfortable. Three command multidirectional buttons, as with all multidirectional buttons, may be embedded in common keyboards. For instance, the center rows of keys, (the "asd . . . " row) in a common QWERTY keyboard, may be replaced by the keyboard layout 110 of FIG. 11.

A common keyboard is a keyboard that comprises common keys that can be simply pressed and released to enter all of the common characters. In English for example, all the letters A-Z can be entered by pressing and releasing (also referred to as "tapping") each common key. For a keyboard comprising a number pad, all of the digits 0-9 can likewise be entered with a press and release/tap. A common key comprises one keystroke that the user can input with a simple press and release.

FIG. 16 illustrates an embodiment of the invention comprising the common QWERTY keyboard layout 160 implemented with three command multidirectional keys. Three command multidirectional keys have a center command selection that will be selected if the user releases a press of the button without press motion that has exceeded the motion threshold of the button. The center command is surrounded by two selection choices, one to the left of the center command and one to the right of the center command. The button method of this embodiment may simply detect press motion horizontally, along the X axis, to detect motion that has exceeded a motion threshold. As the reader can see in FIG. 16, if the user pressed the top left most button, and released the press with no motion, the "w" character would be entered into the device. If the user pressed the same button and moved the press beyond the motion threshold in the negative X direction and released the press, the "q" character would be entered into the device. The advantage to this keyboard layout is that the user needs less angular press motion accuracy. The disadvantage is that the buttons height would remain the same as a common keyboard layout. However, the height of a key on a common keyboard is generally greater than its width, so this three-command multidirectional key keyboard layout may have greater accuracy than the prior embodiment illustrated in FIG. 11.

As the reader can surmise, adapting other commonly used keyboard layouts, such as the Dvorak keyboard layout or international keyboard layouts, to the keyboard layouts of this disclosure does not require special skills and is within the scope of the invention of placing a plurality of keystrokes and commands within multidirectional buttons.

Portable computing devices are often viewed in multiple orientations. The user of the devices may rotate a portable device to change screen orientation between portrait and landscape displays. Portable computing devices often contain an orientation sensor that provides signals for processes to change the orientation of the display screen. It is common for software keyboards to rotate with the display screen and for the software keyboards to adjust their size to fit when changing orientation. In a method of the invention, the method, upon detecting a signal to change screen orientation, changes the orientation of a software keyboard, of the invention, on the display screen. The software keyboard is comprised of a plurality of multidirectional buttons, and may contain non multidirectional buttons.

In an aspect of the invention, the software keyboard presented may change its layout, along with its size, in response to an orientation change.

In an embodiment of the invention, a device comprised of a plurality of screens that may be substantially displayed to the user in a side-by-side orientation, such that the user may view the plurality of display screens substantially as one display screen may display a software keyboard of the invention to the user over two or more display screens in one or more orientations, and may display the keyboard on one display screen in a second orientation.

In an embodiment of the invention, a portable computing device displays a conventional software keyboard in one orientation of the display screen, and the device displays a software keyboard, containing at least one multidirectional button, in the other orientation. In an embodiment of the invention, a portable computing device displays a software keyboard, containing at least one multidirectional button with more than one copy of the multidirectional button on the display screen. For example, many users prefer to hold a portable device with two hands, and to type with their thumbs. If the device is sufficiently large that the user may not be able to comfortably use all the buttons of a keyboard, or other collection of user input objects, then a plurality of copies of buttons may be placed near the thumbs of the user. Whereby, the user may select a command from a button, which may be a multidirectional button, with either of his two thumbs.

In an aspect of the invention, the keyboards of this disclosure are compatible with many current software based typing enhancements. The enhancements comprise, but not limited to, one or more of the following: spelling correction, auto-correction, auto-capitalization, word prediction, case changing commands, common formatting commands, font selection commands, and word disambiguating software. The enhancements may further comprise a bar displayed above the keyboard comprising predicted next typed words, whereby the user may tap one of the words to input the word to the device.

In an aspect of the invention, the commands of a multidirectional button, key, or menu comprise: commands to change the font of the input characters, commands to change the formatting of the current text stream, the color of the background, or any other common word processing commands.

In an aspect of the invention, it is common for software keyboards to display an auto-correct and/or word prediction bar 180 (FIG. 18) on the top of the keyboard to show a current auto-correct word, and/or word predictions. The bar, sometimes referred to as a candidate bar, may further comprise common spell checking functions. The user may touch a word on the bar to input or enter the word on the bar. Or the word on the bar may comprise a button. FIG. 19 illustrates the button boundaries of the buttons 181-184 on the autocorrect bar 180.

In a method of the invention, the currently typed word or partially typed word 181 may be displayed on the bar 180 to allow the user to press on the word to save the word to a user dictionary. In another method of the invention the user may touch a word 182 on the bar, or a button or symbol or graphic, to prevent the currently typed word or partially typed word from being auto-corrected, or it could be said, replaced by the autocorrect word. The word that prevents the auto-correction of the currently typed word or partially typed word may be highlighted by common means, and/or it may display a graphic next to or around the word indicating the use in pressing the word. For example, the graphic may comprise an "x" symbol 183. The user may press the word 182 or the symbol 183, or press within the button boundary 182 (FIG. 19) to prevent the auto-correction. The method may further show prediction words 184 (FIG. 18) comprising alternative words or spellings, or word completions that the method may look up in a data structure, such as a dictionary; whereby the user may select one of the words to insert into the text stream. The words displayed on the bar may replace a currently typed word, or may be inserted after the last word. The method may further comprise determining, through common means, whether an alphabetical character/letter is to the immediate left of the text cursor, or not. If an alphabetical character/letter is found, the method replaces the currently typed word, or partial word. If an alphabetical character/letter not found, the word is inserted in the text stream. Alternatively, the method could look for non-alphabetical characters to make the determination. In a method of the invention, the user may be able to swipe the bar to scroll the bar, or a portion of the bar to see more words. Further, the words may be presented ordered by frequency of use, or a ranking comprising the likelihood that a word is the word the user intended to type. The bar may also comprise arrow buttons or keys to enable the user to scroll the bar to see more words.

In a method of the invention, the method detects a press of a word, button 182, symbol, or graphic 183 on the autocorrect bar 180 to temporarily disable the autocorrect function. The method may further comprise detecting the user selecting, inputting or entering, a command to re-enable the autocorrect function after the current word has been input; wherein the command comprises a word ending character of symbol, or any command that is not a letter of the current language. Alternatively, the method may detect the first letter of the next word, and upon this detection re-enable the autocorrect function. The method may comprise setting a flag upon detecting a command to temporarily disable the autocorrect function, and may reset the flag upon detecting a command to re-enable the autocorrect function. The flag may comprise a simple and common Boolean value in memory. Declaring, allocating, setting and checking flags are common in the art. The autocorrect function can be enabled or disabled in a method that simply checks the flag either before calling an autocorrect function or method, and calls or does not call the function depending on the state of the flag. Alternatively, the check could be incorporated into the autocorrect function or method and the replacement of the typed word may be suppressed depending on the state of the flag. A person skilled in the art may choose from a variety of common techniques to check the flag and to temporarily disable the autocorrect function based on the state of the flag.

FIG. 19 illustrates the button boundaries of the buttons 181-184 on the autocorrect bar 180, as well as the button boundaries (33-35, 46-48) of the multidirectional buttons. FIG. 19 also illustrates an alternate display of a sub-multidirectional button 190. This comprises the same sub-multidirectional button 120 as illustrated in FIG. 18, but with a different button display, which further illustrates that what is displayed to the user, often referred to as a "skin", may vary widely. It is within the ability of a person skilled in the art to generate different button displays.

In an aspect of the invention, common user input objects and/or the multidirectional buttons, keys, or menus of the present invention may contain a command to disable, or enable an autocorrect function, whether it is for the duration of the currently entered word, or until another enable or disable command is selected by the user. In an embodiment of the invention, a command of a multidirectional button, key, or menu comprises a command to disable, or enable, an autocorrect function. The command may also comprise a command to disable, or enable an autocorrect function and input a word ending character, such as but not limited to a space character, a period (sometimes called a "full stop"), a question mark, or an exclamation mark. Whereby a user may efficiently choose a word ending character, such as a space character, and prevent the autocorrect function from replacing the typed word within one fast and reliable press and release of a multidirectional button, key, or menu.

In a method of the invention, the method disables the autocorrect function upon determining a long press of a multidirectional key.

In a method of the invention, the method detects the selection of a command; checks if a flag has been set to disable an autocorrection function, and changes the state of the flag to re-enable the autocorrect function.

In a method of the invention, the method detects the selection of one or more of the selection regions in one or more of the corners of multidirectional button 37 (FIG. 18). The method upon the detecting the selection inputs a space character into the device and suppresses an autocorrect function until a next command is selected. In an enhancement to the method, the method detects if the next command selected is a backspace word command (FIG. 18 Button 36, left selection region/command), and upon the detection, deletes the last word and populates the autocorrect bar and/or selections of a multidirectional button, key, or menu of the invention with the autocorrect word that was suppressed, and/or the prediction words comprising the candidate words from the word that was just deleted. Whereby a user could realize that he made a mistake in entering the typed word, and easily delete the word and enter one of the candidate words by pressing a word on the bar or selecting the word from multidirectional button. In an enhancement to the method, the autocorrect word could be set as the redo word that a user could input to the device by selecting the redo command (FIG. 18 Button 36, right selection region/command).

In an aspect of the invention, the phrase "within one . . . press and release of a multidirectional button, key, or menu" does not necessarily mean that the user pressed and immediately released the multidirectional button, key, or menu. The user may have moved the press beyond one or more motion thresholds, or one or more time thresholds, and/or in one or more directions between the press and release.

In an aspect of the invention, on small-screened devices, there may not be enough room to display a bar 180 (FIG. 18) on top of the keyboard. In a method of the invention, an auto-correct and/or word prediction bar may be displayed at the top of the display screen. The auto-correct and/or word prediction bar may only be displayed during typing, or when it is detected that the currently entered characters do not spell a word found in one or more software dictionaries. If the bar is shown during typing, the bar may be removed from the screen after a time interval has crossed a time threshold from the time of the last entered command. It is common in the art to display a status bar 11 (FIG. 3A) at the top of a display screen. The auto-correct and/or word prediction bar may replace the status bar during typing, or when the keyboard is displayed on the display screen, or the contents of the auto-correct and/or word prediction bar 181-184 (FIG. 18) may be incorporated into the status bar.

In a method of the invention, the auto-correct and/or word prediction bar 180 may comprise some multidirectional buttons, keys, or menus, or sub-multidirectional buttons, keys, or menus of the invention. For example, if a user presses a prediction word 184 on the bar, the commands and selections of the multidirectional button 130 may comprise alternative versions of the word, as seen in FIG. 13, or other suggestion words or phrases. (However, the words would most likely comprise words like: "answer", "answers", etc.) If the auto-correct and/or word prediction bar is at the top of the screen, the multidirectional button could display one to five alternative words from a right selection clockwise through a left selection, in conjunction with the base word, giving the user six possible words to select from in the space of one word displayed on the bar. Provided the display of the multidirectional button is displayed more in the center of the display screen, or is sufficiently thick so the user press would have room to move towards the edge, the button could comprise more than five, such as eight outer selection choices. (Six and nine total selection choices.) However, depending on the size of the display screen, the user may not have enough screen space to reliably select selections in the direction of the edge of the screen. If the auto-correct and/or word prediction bar is at the top of the keyboard, the multidirectional button could display but not limited to eight alternative words, in conjunction with the base word, giving the user nine possible words, phrases, or commands from which to select in the space of one word displayed on the bar. This is a greatly expanded number of choices for the user, and of obvious benefit.

In a method of the invention, the auto-correct word and/or the prediction words may comprise the commands of a multidirectional button 37 (FIG. 3A), key, or menu or a sub-multidirectional button, key, or menu that is displayed on the main keyboard. These words may be accessed from a multidirectional button, key, or menu that has the space character in the center selection, or may comprise the commands of any selection regions of the multidirectional button, key, or menu.

In an embodiment of the invention, the commands of the selections of a multidirectional button, key, or menu may comprise common variations of a word, such as but not limited to the past tense of a word, and the common variations may be contained in one or more data structures comprising an array, list, or database of data, which may further comprise a dictionary comprising a plurality of words and associated common variations of the words. In a method of the invention, a word, which may comprise a currently typed word or a word from a command or selection of a multidirectional button, key, or menu, is used as a key, the method then searches the data array, list, or database using the key to find the common variations of the word. The method then populates the selections and commands of a multidirectional button, key, or menu with the common variation words. Populating the selections and commands of a button, key, or menu with search results is within the abilities of a person skilled in the art, as is storing, accessing, searching, and using common lists, arrays, and databases.

In an embodiment of the invention, any command bar that can comprise buttons may comprise some multidirectional buttons, keys, or menus. In an embodiment of the invention, a bar that is at the edge of the screen and borders the edge of the display screen, or is to close to the edge of the display screen to accurately allow the user to select a command in the direction of the edge, may comprise some multidirectional buttons, keys, or menus with some invalid selection regions or selection regions not containing commands for the device in the directions of the edge of the display screen. In another embodiment, any multidirectional button, key, or menu that is to close to the edge of the display screen to accurately allow the user to select a command in the direction of the edge, may comprise some invalid selection regions or selection regions not containing commands for the device in the directions of the edge of the display screen.

In an embodiment of the invention, a word in a text field, which may be highlighted, may comprise an on-screen multidirectional button. The word may comprise the currently entered/typed word, sometimes also referred to as a word candidate. In an enhancement, the word in a text field currently being typed, just typed, or just selected by the user, may display predicted word candidates to around the display of the typed, just typed, or selected word as the display of the multidirectional button, key, or menu. The display may be semi-transparent, so the user can also see the surrounding text or graphics. In a method to initiate the embodiment, the method may detect a press, which may comprise a long press, on the word and initiate a multidirectional menu. Whereby the embodiment and/or method enables a user to press a word and move the press to a selection region of the multidirectional button, key, or menu to select a word candidate, predicted word, or alternative word or command.

A sub-multidirectional button initiated from the space character command, and associated selection region, of a multidirectional button may comprise the same commands in the same order as the multidirectional button of the candidate/currently entered/typed word. Whereby a user may see an alternative word displayed next to the typed word and enter it from the keyboard of the present invention, which may be easier to reach for the user.

In an aspect of the invention, many modern smart devices allow a user to "pull down" or "push up" (as it is commonly said) a screen, or menu of choices from a side of the display screen. For example, both Apple's iOS and Google's Android operating systems allow a user to "pull down" a notification screen from the top of the display screen, which may be the status bar 11. Similarly, iOS version 7 now contains a control screen that can be "pushed up" from the bottom of the display screen. In an embodiment of the invention, a bar 11 (FIG. 18), or a portion of the bar, or a portion of the screen near the edge of the screen or near the edge of a window on the display screen may be a multidirectional button, key, or menu. In a further embodiment, the multidirectional button, key, menu, bar, or a portion of the screen near the edge of the screen or near the edge of a window may comprise a command in the selection region in a direction towards the center of the display screen comprised of a command to "pull down" or "push up", or "drag" in from the side, a screen, or menu of choices, such as a notification screen, a control screen, or a menu of controls. Whereby a user may not only pull down, push up, or drag in a screen of choices and information, but may also choose from one or more other commands for the device within one reliable and efficient press and release.

In another embodiment, the user may press the display screen at the edge of the screen and move or slide the press towards the center of the display screen, similar to the way a user can "pull down" or "push up" a common notification or control screen, and then initiate a sub-multidirectional button, key, or menu of the invention through previously disclosed user gestures and methods, which may comprise but not limited to slowing the press motion within a velocity threshold after exceeding a motion threshold, or the press exceeding a time threshold. In this embodiment, a sub-multidirectional button, key, or menu may be incorporated into a common slide gesture. Whereby a user could move the press, or slide, in a first direction, and then optionally move the press, or slide in a second direction (and third, fourth, etc. . . . ) before releasing the press to reliably and efficiently choose from an expanded selection of commands for the device within one press and release. The embodiments just disclosed of having a multidirectional button, key, or menu contain the slide command to open a control or notification screen and a sub-multidirectional button, key, or menu being incorporated into a common slide gesture need not be mutually exclusive. The multidirectional button, key, or menu containing the slide command to open a control or notification screen may further comprise commands to initiate sub-multidirectional buttons, keys, or menus from any command including the slide to open a screen command.

In an aspect of the invention, the computing device may comprise a virtual screen, wherein the virtual screen may display only a portion of running application program. Virtual screens are not yet common on portable computing devices, but have been used on desktop computers in the past. A virtual screen method is a method that tricks application programs into thinking the display screen is larger than it really is. The application writes to what it thinks is the display screen, but is generally a buffer which the virtual screen method then displays a portion of the buffer on the physical display screen. Virtual screen methods are common and have been in existence for decades.

In a previous disclosure by the inventor (U.S. application Ser. No. 12/590,413), a method of implementing a virtual screen is taught whereby a user may use linear device motion to scroll the contents of the virtual screen, to see the full displayable contents of the display screen. A keyboard method of the present invention could display the keyboard on the virtual screen, whereby the user may not be able to see and access the entire keyboard at one time. In this scenario, there may be an advantage on a very small screen to be able to scroll the screen to a desired button, and then operate the button, as the button would be larger than it would if the keyboard were to be shown sized to fit on the entire small physical display screen. However, on more common sized display screens, it would be more advantageous for the user to display the keyboard sized to fit the physical display screen, and not written to the virtual screen. In a method of the invention, the method detects a virtual screen function, and displays a keyboard on the physical display screen through common means allowing the method to write directly to the physical screen. In a further enhancement of the method, the method places the keyboard on top of the scrollable virtual screen contents, and does not overwrite the displayed keyboard during scrolling functions. In another method of the invention, the method displays a keyboard on the physical display screen through common means allowing the method to write directly to the physical screen. Implementing software means to write directly to a display screen, and to enable a portion of the screen to be non-scrollable, and to enable an application to write to a portion of the screen that remains on top of other displayable content is within the scope of a person skilled in the art of computer programming. There are many possible ways for a person skilled in the art to implement in software the function just disclosed.

In an aspect of the invention, the center selection region need not comprise a command for the device. In a method of the invention, if a multidirectional button, key, or menu does not have a command assigned to the center selection, the press and/or the release signals within the center selection region may be passed on to other methods of the device, or a release detected in the empty center selection may exit the multidirectional button, key, or menu.

Another enhancement is the modification of press motion or touch boundaries through predictive typing methods. In a method of the invention, the method: detects the letters or characters of a word, or the one or more commands, that are currently being entered into the computing device; determines which command or commands are most likely to be entered next; and adjusts the size of the selection regions of multidirectional button selections; whereby the odds of the user selecting his intended user input command is increased. The size of a selection region may be changed by changing the motion threshold and/or by changing one or more of the angular apertures of the multidirectional button, key, or menu. To determine the most likely next characters or commands, the method may access a database comprised of second order, or first order character or command frequencies. The method uses the last character or command as a key to look up the most frequently typed characters or commands that follow the last character or command. The method may adjust any or all angular apertures and/or adjust the motion threshold. Alternatively, the method may wait until a next release signal of the press is detected and then adjust the closest found selection region border by comparing the relative frequencies of use of the commands found in the selection regions that share the determined closest border.

In an aspect of the invention, the angular apertures and motion thresholds which comprise a selection region may also be adjusted to increase the size of selection regions for multidirectional buttons, keys, or menus that comprise commands other than text characters of a language through accessing first or second order command frequency data.

In an aspect of the invention, first and/or second order (n-gram) frequency, or probability, data may be stored, updated, accessed, and/or searched from an array, list, database, or similar data structure stored in memory, or accessed from the Internet. Methods for storing, updating, accessing, and/or searching arrays, lists, databases, or similar data structures are common for computer implemented methods, and may be implemented in a variety of methods by a person skilled in the art. A first and/or second order frequency data structure may comprise a key comprised of the currently typed character, characters, word, or command or commands as a key, and one or more characters, words, phrases, or commands as the one or more values. The one or more values may comprise a list in order of probability of the value being the next command, or the values may comprise one or more commands, which may be in list form, and the frequency data corresponding to the probability of the commands being the next command.

For example, if the English language is considered and the key is the letter "q", the values may comprise a list of characters from "a" to "z" and the corresponding frequencies or probabilities may comprise a fraction for each letter. All of the corresponding frequencies or probabilities total 1 in sum, for the example. For a first order list, the probability of a "q" character being the next command would be well less than one half, as "q" is not one of the most typed letters in English. For a second order list, a method could access the "q" list or array to get a list or array of the probabilities of the letters that follow a "q", which has just been typed. Then the method may access the frequency or probability for a next expected letter, or command of the list or array. For example, if the method were to access a "u" character and find the frequency or probability of "u" following the "q" character, the probability for the "u" would be a value close to 0.9, as "u" almost always follows "q" in the English language. A list or array of second order data may contain a list or array of first order data by using a key, such as, but not limited to the space character. The frequency or probabilities of characters that follow the space key are generally similar to the frequency or probability of the characters use in the language.

In another method, the method detects a position of the release of the user press within a threshold displacement of a selection region border, looks up the frequency of use of the commands of both selection regions that share the selection region border, and inputs the command that has a higher use frequency to the device. After determining the release is within a threshold of a selection region border, the method may optionally compare the use frequencies of both the command in the selection region in which a press release has been detected and the command that shares the border to determine if the difference in frequency use data is above a threshold value before inputting the command with the higher frequency of use. The method may detect the last typed command or character and access of the second order frequency of use of the commands using the last input command or character as an initial key, or the method may access the first order frequency of use. As the reader can surmise, there are a variety of similar methods one skilled in the art could implement to increase the overall accuracy of input from a multidirectional button, key, or menu by using second or first order character or command frequency data.

In another method of the invention, the displacement of a release position from a selection region border may by scaled and subsequently compared to the difference in frequency of use between the command in a first selection region in which the release occurs, and the command of a second selection region which shares the closest selection region border with the first selection region, determined from the press release position. If the difference in use frequency is greater than the scaled displacement, then the command of the second selection region is input into the device in place of the command from the first region. In an aspect of the method, the difference in use frequency may be scaled and the displacement not scaled, or both may be scaled to make a meaningful comparison. Wherein scaled may comprise multiplying the value by a scaling factor number, and/or adding a number. Further, the scaling may be uniform, or non-uniform. In an alternative aspect of the method, the angle difference to a selection region border may be substituted for the displacement, and may be likewise scaled to make a meaningful comparison. A person skilled in the art could code, test, and adjust any scaling factors to find the right scaling factor that minimizes typing errors. In a method of the invention, the method applies Bayes' Theorem to the scaled data, which may be probability or estimated probability data. Further, the method may correct the last word using an overall probability, or estimated probability, of a word at the end of inputting the word.

In an enhanced method of determining second or first order command frequencies, the method tracks the commands; and updates a data structure comprising an array or list or database comprising the command usage frequency data comprising the relative frequencies of times the command is chosen compared to other commands. Wherein the array or list or database comprises the expected use frequency of a command derived from the user's usage patterns. In a first order array or list or database, the usage of the commands are kept track of as the array or list or database is updated. In a second order array or list or database, the usage of the commands is correlated to the preceding command, character, or word. There exists a variety of methods a person skilled in the art could use to maintain and update the array or list or database. Maintaining and updating arrays or lists or databases are common in the art.

While the larger and fewer keys of a keyboard comprised of multidirectional keys is inherently more reliable than the small keys on a common keyboard on small mobile devices, the user may still make mistakes. In a method of the invention the method checks the currently entered/typed word, or partially entered word, to determine if it is a valid word. If the word has not been found to be valid, the method checks if replacing one or more of the typed characters of the word, or partially entered word, with one or more alternative candidate characters complete a valid word, or partially entered word, to enter or input in a device, or to change the candidate word or words. If an alternative candidate character is found to form a valid word, the valid word is input to the device in place of the word found to be not valid.

Another method of the invention comprises: determining an alternative candidate or selection character, wherein the alternate selection characters comprise the nearest neighboring character in a keyboard of the invention to a presently typed character; detecting if a typed word, or partially completed word, is not in one or more dictionaries; replacing the presently typed character with the alternate selection character to determine a new word candidate, or partially completed word candidate, checking if the new word candidate, or partially completed word candidate is in the dictionaries; and replacing the word currently being typed with the new word, or partially completed word candidate.

In an aspect of the invention, the methods of the invention may be applied to command sequences. Examples of command sequences are the presently typed characters or word, and candidate characters or words. However, the methods may apply to other command sequences, and should not be limited to the examples.

In an aspect of the invention, a nearest neighboring character or command may be determined from finding the distance to the nearest selection region border of a first selection region where a press release has just been detected, or a press motion is currently in, and finding the character or command in a second selection region that shares the border with the first selection region. For instance, FIG. 14 shows a press release 204 in selection region 86. The position of press release 204 is closest to the border, represented by the dashed line between selection regions 86 and 87. The command contained in the second selection region 87 would be the nearest neighboring character or command, if the release was determined to be within a threshold of the border. The method may determine the distance to the border through simple geometric methods known to a person skilled in the art, or the angle of the position of the release of the press may be compared to the angle of a border to find if the absolute value of the difference of the two angles is within a threshold of angle.

The second selection region may be in the same multidirectional button, key, or menu, or it could be in another neighboring multidirectional button, key, or menu. The nearest neighboring character or command also may be considered the closest missed character or command. The methods presented herein determine if it is likely the user made a mistake, and the user intended to select the neighboring character, whereby the method will correct the user's mistake. All the present methods of correcting the user's mistake, if there was one, may be turned on and off by a user setting through any common means, or the methods may not replace the currently typed word (or one or more characters or commands) with a corrected word (or one or more characters or commands), but may present the determined corrected word (or one or more characters or commands) or words to the user through common means to enable the user to select one, as opposed to automatically making the change. Presenting the determined corrected word or words may be comprised of placing the words in an autocorrect/spell checking bar 180 (FIG. 18), or in a small window, or in a multidirectional button, key, or menu, where the user can select one.

Another method of the invention comprises: determining and storing alternative selection characters in an array or list or similar data structure, wherein the alternate selection characters comprise the nearest neighboring characters in a keyboard of the invention; detecting if a typed word, or partially completed word, is not in one or more dictionaries; looping through the array replacing characters in the typed or partially completed word with the closest missed characters comprising the nearest neighboring characters to form one or more new candidate words, checking if the new candidate word is in one or more dictionaries, wherein the new words were created from replacing characters in the typed word with the nearest neighboring characters; checking if the new word is in the dictionary, and inputting the new word to the device.

In an enhancement, the method may optionally build an array or list of new candidate words, created from replacing characters in the typed word with the nearest neighboring characters, checking if each of the new words are in the dictionary, and comparing the word use frequency data to find a best replacement new word of the words found in the dictionary or dictionaries; and replacing the word currently being typed with the best candidate. In another enhancement, the method may build the list of candidate new words, ranking them in order corresponding to nearest neighboring characters, then optionally remove the words not found in a software dictionary, and then re-rank the words with frequency data to find the most probable replacement word. In an aspect of the method, the candidate new words could first be ranked by frequency of use data, and second by nearest neighboring character data, or vice versa. The method could also apply an heuristic comprising weighting the rankings of closest misses/nearest neighboring characters more or less than a weighting of the rankings of the frequency of use data. Wherein weighting may comprise reducing the rankings to a number and scaling the number so it may be compared to another number scale, as previously disclosed.

In a method of the invention, the method receives a release of the press signal; determines if the command for the device comprises a character of a currently typed word; checks if the currently selected character completes a word by checking if the word, or a partial word exists in a dictionary; enters the character into the device if the word, or partial spelling of a word is in the dictionary; or checks the dictionary to determine if another neighboring character may be substituted as an alternate character for the selected character to compose a word, or partial word in the dictionary. In an aspect of the invention, the neighboring character is determined from the character in the nearest selection region. The nearest selection region may be determined from one or more of the following: determining the distance to the selection regions of the multidirectional button, key, or menu determined from the point of the release and determining the region closest by distance, and comparing the angular offsets from the angle of the release to the angular borders of the selection region and determining which border is closer, and detecting if a press release is within a distance threshold of a border of a selection region and then determining the neighboring selection region. The selection region is comprised of the following: the area within the motion threshold, and/or the area in an angular aperture.

The user may miss pressing the button he intended, and press a neighboring button instead. In this case, another embodiment or method may comprise determining whether the nearest alternate character is in a neighboring button. This may be determined in one or more of the following steps: finding the nearest neighboring button, which may share a button boundary with the pressed button; checking the distance from the press position to the boundary of the closest neighboring button; determining if the distance is within a threshold of distance to the boundary of the closest neighboring button; using the detected direction of the press motion and the detection of the press motion exceeding one or more motion thresholds, optionally detecting the press motions exceeding some time and/or velocity thresholds, and optionally detecting the initiations of sub-multidirectional buttons; applying these detections to find the corresponding selection in the neighboring button; checking if the command of the corresponding selection in the neighboring button completes the currently entered word by checking if the completed word exists in the dictionary, or if the command of the corresponding selection completes a valid partial spelling of a word in the dictionary; and inputting the command of the corresponding selection in the neighboring button in place of the command currently selected.

In a further improvement of this method, the method comprises: determining the distance to the closest neighboring button boundary; determining the distance to the closest neighboring selection region boundary; comparing the determined distance of the closest neighboring button boundary to the determined distance of the closest selection region; determining a first alternative character comprising either a character that comprises the command of the closest determined selection region if the region was determined to be closer, or a character that comprises the command of the determined selection region in a neighboring button, through the above disclosed method, if the button border was determined to be closer; checking if the first alternative character completes a word, or partial word, found in the dictionary. If a valid word, or partial word, was not found, then the method optionally may check the second closest selection region to find a valid word, or partial word. If a valid word, or partial word is still not found, the method may continue to check the third, forth, and so on closest selection region commands, or the closest selection regions in a neighboring button or key.

In a further improvement to the method, the method may comprise: storing the closest neighboring selection commands comprising the alternate commands, and the distances to the neighboring selection regions or borders that contain the alternate commands in an array, list, or similar data structure; looping through the array, list, or similar data structure when a selection command is found that does not complete, or partially complete a word found in the dictionary; compiling a list of all possible valid words found in the dictionary by substituting the alternate commands for characters in the typed or partially typed word and ordering the list of words from the smallest distances to the larger. The list may then be presented to the user by known means, such as a bar 180 comprising predictions. The method may further comprise comparing the candidate words by frequency of use in the currently typed language through an heuristic to reorder the list to move more frequently used word higher in the list; The method may then present this reordered list in a prediction bar, or the method may enter or input the command that completes the most frequently used word. Wherein the frequency of use may comprise first and/or second, and/or any order frequency, or any other common method of finding the most frequent used, and thus most likely currently or next typed word. There are many methods for ranking and re-ordering the list that a person skilled in the art could create to weight the comparison of frequency of use to smallest distance to an alternative command or character.

For example, the method may find and store in a list the nearest one to three commands or characters from the nearest selection regions to a release, or the nearest one to six selection regions if the initial press position was found to be within a threshold of displacement to a button boundary that borders another multidirectional button, key, or menu. The method may then loop through the list and compare the frequency of use, if available, of a word in the list to a next word in the list, and switch positions of the word if there is a threshold value of frequency of use difference between the two words. The method may continue to loop through the list until it no longer switches any words in a pass through the list. Then the word at the top of the reordered list can be used as the autocorrect word, or the list can be presented to the user to choose a word from the list. The autocorrect word may comprise the word that is input to the device in place of the typed word when the user selects a word ending command.

In an aspect of the invention, the user may miss pressing the button he intended and press a neighboring area of the screen, which may be but not limited to, a user interface object such as a candidate (autocorrect/prediction/spell check) bar or text input field. In an embodiment of the invention, the user's intent in pressing a user input object is disambiguated by a number of methods. For example, if the user presses the candidate bar (FIG. 18 180/FIG. 20 184) and slides (moves the press motion) in a downward direction, a method of the invention determines that the user intended to press the neighboring multidirectional button below the bar (FIG. 18 31/FIG. 20 34). The method may easily disambiguate this sliding gesture if the bar normally only handles only presses and releases without any sliding motion. FIG. 20 shows the boundaries of the user input fields shown in FIG. 18. FIG. 20 illustrates an example user action comprising the user pressing the candidate bar in Prediction Word area 185 at an initial press position 221. If the user were to release the press without moving it past the motion threshold 28, the user would select a candidate/prediction word from the bar. However, if the user moves the press through press path 223 to press release position 224, and released the press, a method of the invention would determine that the user intended to press the multidirectional button below 34 (37 in FIG. 18). In this particular example, the "b" character would be input in place of the "ant" word 184 (FIG. 18) from the bar, as if the press and downward sliding gesture started in, and was applied to the neighboring multidirectional button 34 (37 in FIG. 18).

Likewise, FIG. 20 illustrates an example user action comprising the user pressing the text entry area 12 (FIG. 20), which may be a text input field, at an initial press position 220. While the text entry area 12 does not directly border a multidirectional button, it is still a neighboring user input object that is close enough to the border of the multidirectional button 34 that the user may unintentionally press it. If the user were to release the press without moving it past the motion threshold 28, the user would input a touch to the text entry area 12, which may move the cursor. However, if the user moves the press through press path 222 to press release position 224, and released the press, a method of the invention would determine that the user intended to press the multidirectional button below 34 (37 in FIG. 18). In this particular example, the "b" character would be input. As is apparent, the user may miss a multidirectional button and still enter the command he intended. This is of great advantage on very small screens, like smartwatches.

In an improvement, a method of the invention may take more into consideration to disambiguate the user's intentions and correct for missed presses. For example, but not limited to, a method of the invention determines the time the user entered a last character, or another user input event. If the time is within a threshold, a press by the user into a neighboring area may be processed as a press starting within a neighboring multidirectional button 34. For example, if the user pressed and released the button at position 221 (FIG. 20) and the method determines that the user just entered a character within the time threshold, the center character ("t" in button 31 FIG. 18) from the neighboring multidirectional button is input, even though the press and release button events did not occur within multidirectional button boundary area 34.

Further, a method of the invention may consider a threshold of distance/displacement 225 (FIG. 20) of the press from the border of the multidirectional button and another user input object to disambiguate the users action and determine what command the user intended to enter. Further, a method of the invention may consider the slide/press motion direction. For example, the method may only consider press motions in the downward (negative Y) direction for disambiguation.

Further, a method of the invention may consider the current use of presses, releases, and/or press motions within a neighboring user input object when disambiguating user presses, releases, and motions. For example, a method may determine that there is no text within a text input area, or there is text but it is well above the border or is not near the area that the user may mistakenly press intending to use a multidirectional neighboring button. In this example case, the press would not set a cursor in this area and it is thus probable that the user intended the press actions to select commands from the neighboring multidirectional button.

Further, a method of the invention may consider whether a press, release, and some or no motion, generates a command that would complete a currently typed word a valid partial or full word using dictionary methods described elsewhere in this specification. Further, a method of the invention considers the currently typed word or command, wherein the method may consider if the currently typed word is a valid word or valid partial word. The method may consider any previously entered commands. A method of the invention can use, but not limited to, any combination of the above methods to disambiguate user input between neighboring user input areas.

Further, methods of the present invention may disambiguate user input between two adjacent multidirectional buttons using some of these methods. A method of the invention determines if a command from a neighboring multidirectional button completes a valid word or partial word and the command that would be normally input from the multidirectional does not. If so, then the command from the neighboring multidirectional button may be input instead.

In an aspect of the invention, a user input object neighboring a multidirectional button may determine a command disambiguated as a command the user intended to input from the multidirectional button and input it to the device itself, or the user input object may simply forward messages to the multidirectional button. For example, but not limited to, the user input object may simply forward the press, release, and motion (touch) messages to the neighboring multidirectional button, so that the multidirectional button processes them as if the button actions originated in, and were intended for, the button.

In another aspect of the invention, a user input object neighboring a multidirectional button may use a variety of methods of determining a neighboring multidirectional button. For example, the text area may determine if the initial press is in a first, second, or third area (third) of the display screen with respect to the X axis using the X axis press/touch information, as well as determining that the touch is close to the bottom of the text area with respect to the Y axis. From this determination, the closest neighboring multidirectional button may be determined.

In an aspect of the invention, upon the detection of the user selecting a word ending command or symbol, a method of the invention may pass the currently typed word on to a common autocorrect function, which may check for other common spelling errors, such as but not limited to missing characters or reversed pairs of letters, etc. The method may then substitute a word returned from the autocorrect function for the typed word and input it to the device.

In a method of the invention, the method detects the user selecting a word ending command or symbol and first calls a method of the invention to loop through an array of closest missed characters or commands, and determines a replacement word for the currently typed word through methods described herein, which may be a null value if a word was not found. The method upon detecting the null value then calls a common autocorrect function to determine a replacement word, and/or more candidate words. If a replacement word is found, then the method will replace or substitute the currently typed word with the replacement word.

In an aspect of the invention, ranking closest missed characters may be determined using probability data. Further, the probability of a candidate word may be determined from a dictionary or other data structure, or other source that returns the probability of the current candidate word, which may be used as a suggestion word or the autocorrect word or for other uses. Candidate words may be suggested words based on the characters currently typed. Probability data can be determined from the currently typed character, and the previously typed characters or words. This can be first, second or any order word probability data. This is sometimes referred to as n-grams. For instance, a bigram would give the probability of one word following a second word. This probability is the probability that a candidate word is the correct word.

In an aspect of the invention, probability or frequency data may be stored that gives the frequency or probability of a word or character that precedes the next word or words in an n-gram. In a method of the invention, the method corrects a word that precedes the current cursor position using n-gram frequency or probability data.

A second type of probability is the probability of the character or word is the character or word the user intended to type. A method of the invention can determine the probability data of the candidate characters through the methods of the invention. From this probability data, this method can make a list of candidate words and may determine an overall probability of the words. However, several valid candidate words may be found and the most probable word determined by this method using the probability data of each candidate character may not be the word the user intended to enter. This method may return a word as most probable that is very infrequently used, while a second much more frequently used word is not returned as the autocorrect word. In a further improvement, this method may also determine the probability of the candidate words from the first method above and rank the candidate words by multiplying the probability of these words by the second method of this paragraph to get a final ranking to find the most probable words that the user intended to type.

In an aspect of the invention, probability data may be used in the methods of this invention in place of frequency data. Also, frequency data may be used in place of probability data to give an approximation of probability data. In a method of the invention, the method may use calculations to turn frequency data into approximate probability data. For example, the frequency data of a word may return a value between "A" and "Z". The method would then cast the character frequency value to an integer value. Subtracting 64 (the Unicode/Ascii integer value of the character before the "A") from the integer value. This now makes a range of 1 through 27. (Or a range of 0 to 26 if 65 is subtracted, or another subtraction value and range for other languages.) Then this computed value can be divided by a scaling factor greater than 26 to make the range between 0 and a fraction of one. A scaling factor can be selected that gives numbers that approximate the real probabilities. A person skilled in the art is capable of selecting, trying, and testing values to come up with a value that works best.

Further, the angles and displacements determined by some methods of this invention to determine how much the user missed either pressing the correct button or selection region in terms of displacement, or how much the user missed the correct slide/press motion direction in terms angles can likewise be turned into approximated probability values. Bayes theorem can be used to determine the overall probability of candidate words and rankings, or to rank the words based of frequency values. The highest ranked word can be used as the autocorrect word. Any of the candidate words may be presented to the user as suggestions.

One of the most common user errors in typing with a keyboard of the present invention comprised of multidirectional buttons is for the user to miss moving the press motion/sliding in slightly the wrong direction and selecting a neighboring angular selection region. FIG. 14 shows a press release 204 in selection region 86. The position of press release 204 is closest to the border, represented by the dashed line between selection regions 86 and 87. The command contained in the second selection region 87 would be the nearest neighboring character or command, if the release was determined to be within a threshold of the border. The probability, or estimated probability can be determined for the two candidate characters that are the commands of selection regions 86 and 87 using methods described else ware in this disclosure. Most user misses are slight misses, which gives a higher probability, or estimated probability, to the selection region in which the release of the press occurs. By comparison, one of the most common errors of keyboards comprised of a common keys that a user taps, or keyboards where the user slides over a key, is an error of the user pressing the wrong key. If the keyboard is very small, such as the keyboard of a smartwatch, the user will generally miss the correct key by a displacement that is a large percentage of the keys height and width. Thus, it is much more difficult for a common keyboard or swiping keyboard to generate or estimate good probability data from miss displacement values.

Further, when a user misses pressing, or sliding over, the correct key of a common keyboard, the key is surrounded by other keys. A center key is surrounded by 8 other keys. A top or bottom key is surrounded by 5 other keys. So the candidate characters that a key press will generate 8+1, or 9 candidate keys, as the pressed key is also a candidate. If we take an average is 7 candidate characters per key press, than a five letter word will generate 7^5 or 16,807 candidate words on a common keyboard. To compare with a keyboard of the present invention, let's assume the user generates 2 candidate characters per keystroke. (This is generous; as a user will most often press both the correct key and slide [move the press motion] in the correct direction.) This then yields 2^5, or 32 generated candidate words. As the reader can surmise, a keyboard of the present invention generates approximately 500 times fewer candidate words for a five character word, which clearly translates into a large advantage when compared to other common keyboards in correctly identifying the correct word. This is, of course, a simplified analysis and doesn't take into consideration other problems, such as the problems of a user mistakenly pressing a backspace key, symbol or shift/number/function key, or the space key on a conventional keyboard, or the user missing by a displacement of more than one character on a conventional keyboard.

In an aspect of the invention, a dictionary may comprise more than one dictionary. The plurality of dictionaries may comprise different information and data. For example, one dictionary may comprise a common dictionary comprising the words of a language, while another dictionary may comprise the most common words, while another dictionary may comprise a user dictionary that contains words not in the common dictionary that the user frequently types. The dictionaries may be accessed in any order. In a method of the invention, the method accesses one dictionary comprising more frequently typed words to first return results that are more likely the word the user intended to type, and second accesses a common dictionary to get more results. In another method of the invention, the method accesses the common dictionary first and saves a list of returned words, and second accesses one or more other dictionaries, and third, looks for matches between the words of the two lists, and then the method uses only the matches.

In an aspect of the invention, valid words found in the dictionary may be phrases, or words from the user dictionary, which might not otherwise be present in common dictionaries. The words may also contain symbols not normally found in dictionaries. For example, the user dictionary may be comprised of words the user entered into the dictionary, or scans of words the user has used in communications such as, but not limited to, messages, and posts to social networks. These words could comprise letters and symbols, such as emotion symbols :-). A user dictionary may further have words automatically added to it. In a method, the method detects the user replacing a word with a word not found to be in a common dictionary, and adds the word to the user dictionary. In another method, the method prompts the user if he would like to add a word to the user dictionary.

The dictionaries of the invention may also comprise common misspelled words and a corresponding correct word to substitute for the misspelled word. The methods of the invention and embodiments of the invention may receive the correct word as a return value, in place of, or in addition to a simple Boolean value indicating if the word was found in the dictionary or a list of close words. Further, dictionaries may return a list, array, or similar data structure of close words; wherein close words comprise predicted close matches. The return value may also comprise a null list indicating the word was found in the dictionary. The dictionary may comprise a method that queries one or more data structures that holds the word data. Dictionary methods and data structures are common in the art. Return values are also common in the art and a person skilled in the art can easily implement a method to receive and handle common return values.

A dictionary, or dictionary methods of the invention may also comprise common switched letter pairs, and other common misspellings for the methods to check, such as but not limited to checking for not enough, or too many repeated characters. For example, the "spell" might have been typed as "spel" or "spelll". This is common in the art.

In an aspect of the invention, the methods and embodiments of the invention for providing spelling correction and autocorrection may be used in any combination. In a method of the invention, the method detects the nearest neighboring character or command; checks in one or more dictionaries to determine if the character or command in the selection region of the press release and the neighboring character or command added to the presently input text or word or partially completed word comprise valid words or partially completed words; determines the frequency of use or probability of the two characters and determines which is the more likely to be typed; provided both words are valid words or partial spellings of words, the method inputs the character determined to be more likely to be typed; provided no words are valid, the method inputs the more frequently used character; provided only one word was determined to be valid, the character used to complete that word or partial spelling is input to the device. In an enhancement of the method, the method only detects a nearest neighboring character if the position of the release of a press is within a threshold of displacement, or a threshold of an angular difference to the shared border between the selection regions.

In an enhancement to the method, the method determines if the release of the press is within a threshold of displacement from the motion threshold; if the determination is true, the nearest neighboring characters or commands comprise the command associated with the center selection region and the selection region to the outside of the motion threshold in a determined direction of the press. For example, FIG. 4B shows a release of a press motion position 40 in selection region 88. If that press was within a threshold of displacement from the motion threshold 28, which is represented by the circle which defines center selection region, then the command of the center selection region is the nearest neighboring character. If release position 40 is outside the threshold, the nearest neighboring character or command would be associated with selection region 81 or 87, whichever was determined to be different.

In another aspect of the invention, it is common for a keyboard method to detect the type of text input field it is inputting characters, commands, and words into, and the method enables or disables autocorrection, word prediction and/or spell check functions depending on the type of the input field. The input field is generally accessed through an input connection. For example, if a method detects that the keyboard has an input connection to a text box used for entering passwords, the method disables one or more autocorrection, word prediction and/or spell check functions. Wherein an input connection to a text box is an input object into which a user will enter text, such as a password field. In a method of the invention, the method detects the type of input connection, or text entry field type, and may disable or enable one or more autocorrection, word prediction, and/or spell check functions upon detection of the type of input connection.

In another method of the invention, the method detects the type of input connection, or text entry field, and enables upon detection of the type of input connection detected the method of autocorrection or word prediction that compares the frequency of use of neighboring commands and selects the most frequent command to input to the device when the method detected that the release of the press was within a threshold from a selection region boundary. The method also disables all other autocorrection, word prediction, and/or spell check functions.

In an embodiment of the invention, the commands of a multidirectional button, keys, or menus comprises instructions to initiate methods to determine the word currently typed by the user, or the word that a cursor is at or over, and look up dictionary results, and/or encyclopedic results, and/or thesaurus results, and/or search results; and presents the results to the user. Wherein the dictionary results comprise word or command definitions. Wherein the encyclopedic results return common reference material and information for the word. Wherein the thesaurus comprises synonyms, antonyms, and other related or alternative words. Wherein the search results comprise links to information returned from a search engine, such as Google Search. In an aspect of the method, all the results may be returned from data local to the device, or from a network the device is connected to, such as the Internet. The results may be displayed to the user in, but not limited to, an autocorrect bar or status bar, or a popup text box, or as a system notification, or through an audio or video feed or link, or as the commands or selections of the multidirectional button, key, or keyboard. If the results are displayed to the user in an autocorrect bar or status bar, the result may be scrolled across the bar, or portion of the bar at a set rate.

In an embodiment of the invention, the commands of a multidirectional button, key, or menu comprise a command to parse the currently typed text, or a sequence of commands, by common means, and initiate a method of the device to post the currently typed text to a social network, messaging app or service, or an internet site. Whereby a user may use a keyboard of the present invention to post any text typed by the user to another text recipient service. Whereby a user may easily and efficiently decide to send his currently entered text to an external service directly from a button or a button on a keyboard. It is common for modern operating systems to provide methods for sending text to popular messaging services, such as Facebook and Twitter, etc. However, it is novel to provide a command to parse the current text and send it directly to an external text service, messaging service, or social network from a common keyboard, or a keyboard or multidirectional button, key, or menu of the invention.

In an embodiment of the invention, the commands of a multidirectional button, key, or menu, or a button on an autocorrect/word prediction bar of a keyboard of the invention comprise a command to initiate a system method for voice to text input. Methods to provide voice to text input are commonly provided in many modern operating systems.

In a method of the invention, the multidirectional buttons, keys, or menus or secondary or sub-multidirectional buttons, keys, or menus of the invention may determine the last typed character and populate the selections with accented versions of the character. For example: if the user had just typed the "a" character, then proceeded to initiate another multidirectional button, which may be a next level of the same multidirectional button, the selections may include choices and commands such as the "á" character, which is an accented version of "a". In this example, the "a" character is referred to as the "root" character. In an aspect of the invention, the accented versions of a character may be accessed from a selection other than the root character. The "a" character in many keyboard layouts, such as the popular QWERTY keyboard layout, is on the far left side of the keyboard 14 (FIG. 3A). On small touch screen devices, the "a" character is next to the edge of the screen. If the user presses button 30 in FIG. 3A, slides left to the "a" selection, then initiates a next level multidirectional button, there may not be enough screen space for the user to slide to select from all the accented "a" characters that may be provided. This problem may also exist for other characters. A user of the present method could instead simply choose a root character, such as the "a" character first, and then press another multidirectional button, or press and slide to a different selection that is not located near the side of the screen to bring up a secondary level multidirectional button populated with accented versions of the "a" character; whereby the user will then have room to choose from one of the displayed accented characters. This is of great benefit on small-screened devices. The selection of a multidirectional button, key, or menu may comprise a shift key or an alternative shift key. For example, FIG. 18 shows an alternative shift key comprised of the graphic/symbol "á" in the upper right of multidirectional button 36. If the user selects this alternative shift key and initiates a sub-multidirectional button, key, or menu, the selections of the sub-multidirectional button, key, or menu may comprise accented versions of the last typed character. It is beneficial to place the shift key or alternative shift key in a position away from the edge of a display screen to allow a user room to move the press motion, or slide in a touch screen embodiment, to all the accented characters in the selections of the sub-multidirectional button, key, or menu.

In another method, the method stores or checks the last typed character or command and populates the selections of a multidirectional button, key, or menu that contains the space character with one or more accented versions of the last character, and/or populates a sub-multidirectional button with one or more accented versions of the last character that is initiated from the selection that contains the space character. In an aspect of the invention, the accented versions of a root character may comprise one or more alternative symbols of a root symbol.

In another method of providing accented or alternative characters, a command of a multidirectional button, key, or menu may comprise an alternative shift key. The alternative shift key (upper right symbol in multidirectional button 36, FIG. 18) sets a flag the method may read. The alternative shift key could be toggled on or off by the user selecting the command from the multidirectional button, key, or menu. The multidirectional button, key, or menu, or secondary (sub-) multidirectional button, key, or menu, having detected the alternative shift flag set to on may change the commands, and/or the display of the commands of one or more multidirectional buttons, keys, or menus or some secondary (sub-) multidirectional buttons, keys, or menus to comprise accented or alternative characters or symbols. In an aspect of the method, the method may optionally turn off the alternative shift key flag after a command has been selected, other than a command to set the shift flag to on. Whereby the user may simply select an alternative shift command, and then select an accented character or alternate character or command from a multidirectional button, key, or menu, or a secondary (sub-) multidirectional button, key, or menu. In an aspect of the invention, a common shift key or button could also be pressed and released, or pressed and held, to change the commands of one or more multidirectional buttons, keys, or menus, or a secondary (sub-) multidirectional buttons, keys, or menus to comprise accented characters or alternate commands. In an aspect of the invention, an alternative shift key or command may be combined with a common shift (FIG. 18 Button 36, top selection region/command) or CAPS lock command; whereby the user may enter upper or lower case version of accented characters of alternate characters or commands. An example of alternate characters is the Greek symbols, which comprise upper and lower case versions.

In a method of the invention, the method detects a common shift key set to on and capitalizes the next selected command of a multidirectional button, key, or menu or a secondary (sub-) multidirectional button, key, or menu. In an aspect of the method, the command may comprise a word, or several words. If the command does comprise a word or words, only the first letter of the word, or first letter of the first word of several, may be capitalized. In an enhancement of the method, the method may also detect if a common CAPS Lock flag is set. If the CAPS Lock flag is set, the method will capitalize the entire word, or words that comprise the command. The method may also turn off the shift flag, if the method detects that the shift key is not being held. Changing the case of first characters, or whole words or phrases is common in the art.

In an aspect of the invention, multidirectional buttons of this disclosure may be embedded within other user interface objects such as, but not limited to, the keys of a common keyboard, number pad, menus, control bars, toolbars, or other collection of buttons, keys, or menus. Multidirectional buttons may be embedded within a keyboard that is primarily composed of common buttons, or keys.

In an aspect of the invention, icons are commonly displayed on some screens of modern smart devices to start application programs, sometimes called "apps", by pressing and releasing/tapping the icon. The icon will be referred herein as an "app icon". In an embodiment of the invention, an app icon comprises a multidirectional button. Wherein the app icon can be pressed by the user to start the app in the common way, or the user may press and slide/move the press motion past a motion threshold in one or more directions, and/or hold the press past one or more time thresholds, or press past a force threshold, to start the app and input one or more commands to the app.

In another embodiment of the invention, a common folder icon comprises a multidirectional button. Wherein the folder icon can be pressed by the user to open the folder in a common method, or the user may press and slide/move the press motion past a motion threshold in a direction, and/or hold the press past a time threshold, to directly start an app contained in the folder. In a further embodiment of the invention, any object that can be tapped/pressed and released and generally functions like a common button can comprise a multidirectional button, key, or menu. For example, a tile in the Microsoft Windows 8 OS could comprise a multidirectional button, or a widget in the Android OS could comprise a multidirectional button to add command selection choices to these user input objects.

In an embodiment and method of the invention, the user may press a multidirectional button, key, or menu for a time greater than a time threshold, also known as a "long press", and a command of the selection corresponding to the long press may comprise a command to start a method. The method comprises detecting user press motion, or as it is commonly called, a common "drag" gesture. Upon the method detecting the user dragging his finger or cursor across the screen, or detecting the user press motion, the method moves the multidirectional button, key, or menu, which may comprise an icon, widget, tile, graphic, or other user input object, to reposition the object on the screen. Whereby the user may reposition objects on a screen or desktop screen and input one or more commands from the object within one user press and release. It is common for a user to be able to long press an object and then drag the object to a new location. And it is common for a user to be able to press and release/tap the same object to input a command to the device. But it is novel for the user to be able to flick (press and move the press beyond a motion threshold) in a direction to select from an expanded set of commands in addition to a common tap, and a common long press and drag combination sequence to reposition the object. In an aspect of the method, the method may wait to begin dragging the object across a screen until the press motion has exceeded a displacement threshold of motion. Further the method may smooth the motion of the object across the screen, or use any common methods for moving objects across the screen, or between screens, or any methods for repositioning objects by responding to a common drag and/or drop gesture.

In an aspect of the invention, a button method may respond to a press, a motion of the press exceeding a motion threshold, a press that exceeds a time threshold, a release of a press, and/or any button events by generating audible, tactile, and/or haptic user feedback. The type of user feedback may vary by button and by the type of event to which the feedback corresponds.

In a method of the invention, a multidirectional button method, upon detection of a press and motion exceeding a motion threshold, determines the angle of motion, with respect to the initial press position, and generates user feedback. The user feedback is different for motions that correspond to selection regions that are at approximately 90 degree angles to the positive X direction from selection regions that are at approximately 45 degree angles; whereby the user is given audible, tactile, and/or haptic feedback that informs the user of the direction of the press motion.

In a method of the invention, a multidirectional button method, upon detection of the selection of a command from the user, generates audible feedback, by any common means provided by computing devices, corresponding to the selected command. For example, feedback from a keyboard comprised of one or more multidirectional buttons may be comprised of an audible representation of the selected command, which can be a character. A blind user, for instance, could choose a character, such as the "a" character, and then get immediate feedback by hearing the letter "a" from the speaker of the device. A user interface comprised of multidirectional buttons of this disclosure, which may include a keyboard and other user interface objects, would be of great advantage to the visually impaired, if provided with this type of audible feedback. Further, multidirectional buttons can have much larger buttons, for the amount of commands that can be selected from them, compared to a group of conventional buttons. Thus, a visually impaired user would have less trouble pressing, and selecting from a multidirectional button.

Additional Embodiments

The touch screen in many electronic devices is commonly used to unlock the device upon device startup, or wakeup. It is common to display a start screen to the user and to detect the user pressing the touch screen and sliding his finger across the touch screen in a direction, and/or detecting the user releasing the press, to detect a user gesture to unlock the device. In an embodiment of the invention, a computing device displays one or more multidirectional buttons, keys, or menus of the present invention on the start screen to give the user of the device a plurality of command choices. Wherein the commands comprise unlocking the device and starting, or proceeding, directly to an application program or function of the device. Whereby the user can quickly and reliably unlock the electronic device and go to a desired application or function chosen from a plurality of choices within one press and release of a button. In an aspect of the embodiment and the invention, a multidirectional button, key, or menu may not be displayed to the user until the user presses the touch screen.

In an aspect of computing devices, the device may ask the user for a user name and/or password to unlock the device at startup or wakeup, or to access any other function. It is common for an electronic device to have multiple users, or multiple levels of security with differing access to system applications, data, and functions. In an embodiment of the invention, the device may display a keyboard comprised of multidirectional buttons, keys, or menus of the invention to enable the user to input the user name and/or password. The keyboard may be comprised of characters of an alphabet 14 (FIG. 3A), and/or may be a numberpad to enter numbers 14 (FIG. 5B). In an aspect of the embodiment, the commands of the buttons or keys of the keyboard may comprise commands to input any identifying information commonly used to unlock the device or a function, and/or may comprise commands to directly rout the user to a desired function of the device.

In a method of the invention, the keyboard of the invention displayed to the user at the time of device or function unlocking or wakeup may be used to enter a password from a plurality of passwords. The passwords may be used by one or more users to directly unlock the device, or function, and to proceed directly to a function of the device that corresponds to the password entered. In an example of the method, a user could enter one password to unlock the device and go to the home screen of the device, or the user could enter a second password to unlock the device and go directly to a messaging application to check his messages. In an aspect of the method, the different passwords entered through the keyboard of the invention may access different levels of security, whereby one password may give the user access to a different selection of applications, data, and/or functions than another password.

In an aspect of the invention, a button may comprise a thumbprint reader. The iPhone 5S contains a thumbprint reader within its home button. In an embodiment of the invention, a multidirectional button, key, or menu may comprise a thumbprint reader. Whereby a user may unlock a device, application, or function by pressing the button, and the user may choose from a plurality of commands for the device within one press and release of the button.

In an aspect of the invention, it is common to encrypt a message by entering characters into a message, and then subsequently encrypt the characters of the message for security before saving or sending the message. In a method of the invention, one or more characters input to the device from a multidirectional button, key, or menu may be encrypted before they are input to the device from the button, key, or menu. The method may access an encryption key through any known means, such as but not limited to, storing the key in a data value accessible from the method, and use any known means of encrypting the characters to be input to the device. In another method of the invention, the method may display a keyboard substantially comprised of the multidirectional buttons, keys, or menus of the invention and may further display some unencrypted text in a text box or a bar above, below, between, or in the buttons, keys, or menus of the keyboard to display the entered text, whereby the user can view the unencrypted text he has just entered, or the user can view an unencrypted message that the keyboard method has unencrypted from a detected encrypted message. A method of detecting an encrypted message may comprise receiving the focus of some text window or box comprising text, and detecting that the text is encrypted by any common means. A method may un-encrypt a detected encrypted message by any common means and may display the un-encrypted text by any means. Methods for encrypting and un-encrypting messages are common and well known in the art. In an embodiment, a command of a multidirectional button, key, or menu may read the currently entered text, encrypt the text, and replace the text with the encrypted text.

One Key Keyboard

The multidirectional buttons, keys, and menus of the present invention are a flexible set of building blocks. They can define a limitless number of user interface objects, as the number of nested multidirectional buttons, keys, and menus are limitless, the number of selections from a single multidirectional button, key, or menu is limited only by the smallest angular aperture the user may reliably select from, the command choices are not limited, and the display is not limited in scope and in timing. As such, all embodiments of the invention cannot be shown in the drawings. The drawings show the basic building blocks from which complex multidirectional buttons, keys, menus, or other embodiments can be assembled by a person reasonably skilled in the art.

In an aspect of the invention, the multidirectional buttons, keys, and menus of the present invention can comprise a keyboard that can comprise one or more multidirectional buttons, keys, and menus. In an embodiment of the invention, a keyboard comprises one first level multidirectional button or key. The commands of the button or key comprise commands to initiate sub-multidirectional buttons or keys comprising the commands of the keys of keyboard 14, buttons 30-32, and may also comprise the commands of keys 36-37 and keys 30 and 31 in FIG. 5B, and may also comprise the commands of other keys. The commands of the button or key may also comprise the center command choice or selection region.

In an example of one embodiment of a one key multidirectional button or key, if a user were to press on the multidirectional buttons or key, and move the press in the upward direction, beyond the motion threshold, and then release the press, the user could input the character "t" into the device. If a user were to press on the multidirectional buttons or key, and move the press in the upward direction, and initiate a sub-multidirectional button or key through one of the many methods disclosed previously, the user could bring up button 31 (FIG. 3A or 4A depending the present case state of the keyboard), and then make a selection through releasing the press in the desired selection region. Whereby, a single first level button or key can comprise a complete keyboard. A keyboard of this embodiment would be slightly slower to use than the other keyboard embodiments of this disclosure, however the keyboard would be usable down to a very small size. If the user were to use a precise stylus, this one key keyboard could possibly be used on a device as small as the side of a pen.

As such, the reader can surmise that a keyboard, or other user interface object, with a large set of commands can be implemented with one or more multidirectional buttons, keys or menus in very little space with accuracy, reliability, and efficiency. The reader can also surmise that there can be a great variety of embodiments that can be built with the basic building blocks of methods and embodiments that have been presently disclosed and that the unlimited number embodiments cannot all be described in a disclosure that is limited by nature.

Mouse with Touch Screen

In an embodiment of the invention, a computer mouse may comprise a touch screen placed on a top surface of an otherwise common computer mouse. Multidirectional buttons, keys, and/or menus of the present invention may be displayed to the user to interact with on the touch screen of the mouse. In an enhanced embodiment, a keyboard of the present invention substantially comprised of the multidirectional buttons, keys, and/or menus may be displayed to the user on the touch screen of the mouse for the user to interact with. Further, multidirectional buttons, keys, and/or menus of the present invention may also be displayed to the user to interact with on another display screen of the computing device, which may be the mouse embodiment or the touch screen embodiment of the present invention, as previously disclosed. Whereby a user of a mouse-based computing interface may both use the mouse in a conventional manner, and input commands to the device, which may include typing, through the efficient and accurate multidirectional buttons, keys, and menus of the present invention.

In an alternate embodiment, one or more physical multidirectional buttons could be placed on the top, or sides of a computer mouse.

Two or More Display Screens

In an embodiment of the invention, the computing device may comprise two or more display screens with one display screen on a front side of the device, which may or may not be a touch screen, and a touch screen on the backside of the device. A user of the device may type on the back of the device by interacting with some multidirectional buttons, keys, or menus of the present invention comprising a keyboard located on the touch screen on the back of the device. Wherein the user interacting with the multidirectional buttons, keys, or menus comprises pressing the multidirectional buttons, keys, or menus with one or more fingers, optionally moving the presses in a direction, and releasing the presses. The multidirectional buttons, keys, or menus of the keyboard may be displayed to the user on the back and/or front display screens. The display of the keyboard on the front display screen may be semi-transparent, such that the user may be able to both see the keyboard, and see and be able to interact with software program that is displayed below and/or through the keyboard. In an optional embodiment, the keyboard may be displayed to the user on the front display screen and the keyboard may be operational from the front display screen, whereby the user could type from the front or rear screen of the device.

In an aspect of the invention, it is common for computing devices, particularly mobile devices, to have means to determine orientation of the device with respect to gravity. Common means comprise using an accelerometer to determine the gravity vector along some axes. In a method of the invention, the method determines which display screen is facing a substantially upward position, with respect to gravity, and uses that display screen as the front display screen. In an aspect of the invention, it is common to enable a user to set which display screen is considered the front display screen through a common setting or command.

In an embodiment, a computing device comprises a touch screen 16 (FIG. 3A) on a first side of the device and a second side of the device, which opposes the first side, comprises a display screen and a physical keyboard. It is common for computing devices to comprise one of the two sides just described. Take for example the Z10 and Q10 smartphones made by the Blackberry Company. The Z10 is an example of a common mobile device comprising a touch screen on one side. The Q10 is an example of a common mobile device comprising a display screen and a physical keyboard on one side. For users who prefer a physical keyboard, they must choose between having a smaller display screen with a physical keyboard, and giving up the physical keyboard to use a device with a larger touch screen display screen. Currently in the state of the art, a user must choose one of the two devices. However, in the present embodiment a user may have a two-sided device with both a large touch screen display screen and a physical keyboard. Whereby a user may simply turn the phone over, or turn the phone over and input a command, to use a desired side.

In a method of the invention, a user may choose which side of a device of the present embodiment to interact with one or more, or any combination of, the following methods: determining which side of the device is facing upwards, which may be determined from accelerometer data by known means, and enabling the upward facing side; determining a common command to unlock the device on a side of the device, such as, but not limited to sliding a finger on a touch screen; detecting a slide of a common mechanical switch; detecting a press, or a long press, or a plurality of presses on one or more buttons or keys of the device; detecting typing on the mechanical keyboard; detecting a hand covering, or close to, a camera of the device; detecting one or more taps on a side of the device through common accelerometer means; detecting a sequence of button presses of the mechanical keyboard; or any common means of choosing a command for the device. In a method, the side not chosen by the user to interact with may be disabled to prevent unintended user input. A method of the invention may use the camera to detect panning beyond a threshold to determine the user switching sides of the device by substantially rotating the device by approximately Pi radians, and switching the side with which the user interacts. Another method of the invention may automatically switch the enabled side of the device, through the disclosed detections, and further detect the user entering a command, by any known means, to override the switch and choose the side of the device the user wishes to interact with.

In an aspect of the invention, the device need not have to enable or disable a side of a device for use by the user. Both sides may be enabled. In a result, the user may type with the physical keyboard from back, while seeing the text he just typed on the front side.

In an embodiment of the invention, one or more of the keyboards of the two-sided device may comprise a keyboard of the present invention comprised of one or more multidirectional buttons, keys, or menus.

In an embodiment of the invention, a computing device comprises a plurality of display screens, which may be touch screens. Wherein the display screens may pivot or slide from a folded or stacked position to a position where the display screens are substantially in the same plane. The display screens may pivot or slide into the same plane next to each other, in a substantially side-by-side orientation, whereby the user can substantially view the plurality of display screens as one screen. Optionally, the display screens after pivoting, or sliding in a first direction, can slide in a second direction to slide the display screens next to each other whereby the user can substantially view the plurality of display screens as one screen. In a method, a software keyboard may be displayed to the user that spans the two or more display screens. In a further method, a software keyboard is displayed on one or more of the display screens when the screens are in a folded state, and the keyboard is then reconfigured to span the two or more display screens upon the method detecting the two or more display screens unfolded or un-stacked into the side-by-side orientation. The software keyboard may be a common keyboard, or may comprise a keyboard comprised of one or more of the multidirectional buttons, keys, or menus of the present invention.

In an embodiment, the two or more display screens may comprise one or more magnetized edges, whereby the magnetized edges may slide, or help slide, and/or keep the display screens abutted together to substantially by viewed by the user as one display screen. In another embodiment, two or more display screens may simply be held together to be used by the user as one device. And the two, or more, display screens may also be separated by the user to be used as two, or more, devices. Further, the two devices may be placed side by side and held together by a magnetic force between the touching edges of the devices.

Summary, Ramifications, and Scope

The embodiments and aspects of the invention are disclosed herein to summarize the invention and are not intended to limit the scope of the invention.

The present disclosure generally relates to user input objects to enter commands into a computing device. The input objects are comprised of one or more multidirectional buttons and may contain other input objects or other input objects that comprise one or more multidirectional buttons. The disclosed embodiments and methods allow the user of the device to easily and quickly enter commands with high accuracy and speed, particularly with small portable computing devices with limited space.

The disclosed portable computing device reduces or eliminates the deficiencies and other problems associated with user input with computing devices, as listed above. In some embodiments, the device is portable. In some embodiments, the device has one or more display screens, the means to detect user input, one or more processors, memory and one or more modules, processes, programs, or sets of instructions stored in the memory for performing multiple functions. In some embodiments, the user presses one or more multidirectional buttons, optionally moves the presses, and releases the presses to input commands into the device. Instructions for performing these functions may be included in a computer readable storage medium or other computer program product configured for execution by one or more processors. Instructions for performing these functions may apply one or more methods and heuristics to the motion, presses, releases, and other button events to determine a command for the device, and instructions for processing the command.

The disclosed embodiments and methods allow computing devices with multidirectional buttons to behave in a manner desired by the user. Accordingly, the reader will see that a user interface with multidirectional buttons, which may also contain a keyboard comprised of multidirectional buttons, is a preferred method for inputting user commands.

The disclosure of the present invention, as well as references to the embodiments and methods, are not for limiting the scope of the invention. Persons having ordinary skill in the art may make various modifications and changes without departing from the scope and spirit of the invention. Therefore, the scope of the appended claims should not be limited to the description of the embodiments described above.

I claim:

1. A computer implemented method for enabling a user to interact with an electronic device through one or more keyboards comprising one or more multidirectional buttons, the method comprising:
   a. receiving one or more signals associated with one or more user presses on a top surface of the multidirectional button;
   b. determining some initial positions of the user presses;
   c. determining one or more motion thresholds from the determined initial positions of the user presses, wherein the motion thresholds comprising some thresholds of displacement or thresholds of force and wherein the motion thresholds are unrelated to the size of the multidirectional buttons;
   d. receiving some motion signals associated with some lateral user press motions, wherein the press motions are substantially within a plane generally coincident to the top surface of the multidirectional button;
   e. detecting if the lateral press motions exceed the one or more motion thresholds;
   f. determining five or more directions of the lateral press motions from the determined initial positions of the user presses and the motion signals, wherein the directions are unrelated to the placement of the multidirectional buttons;
   g. detecting one or more release signals associated with the user releasing the user presses of the multidirectional button;

h. determining a command for the device from a plurality of command choices, wherein the command is determined from the detections and determinations of the method comprising the detections of the press motions exceeding the motion thresholds and/or the directions of the lateral press motions, wherein a plurality of the command choices comprise commands for the device exclusive from commands for the method of the device;

i. inputting the command to the device;

whereby the user may quickly and reliably choose from a plurality of commands within one press and release of each of the multidirectional buttons.

2. The method of claim 1, wherein the commands comprise some accented characters determined from a command previously selected.

3. The method of claim 1, wherein the commands comprise some predicted next words or a determined most likely command.

4. The method of claim 1, wherein the commands comprise a command to disable an autocorrection function, or a delete word command, or an undo command, or a redo command.

5. The method of claim 1, wherein the commands comprise a command to look up some encyclopedic results, or a command to look up some thesaurus results, or a command to look up some internet search results.

6. The method of claim 1, wherein the commands comprise a command to calculate a currently entered mathematical equation and enter some results of the calculation into the device.

7. The method of claim 1 further comprising: populating some selections of the multidirectional buttons with some commands determined from an heuristic; wherein the heuristic comprises searching for the commands from some data structures comprising a list of one or more command sequences that likely follow some presently entered commands and populating the selections with the searched for commands; determining if one or more selection regions are still empty; and further searching a dictionary and populating the remaining empty selection regions with the results of the dictionary search.

8. The method of claim 1, the method further comprising: detecting and storing some letters of a word that are currently being entered into the device; determining which of the commands are most likely to be entered next; wherein the determining of which commands are most likely to be entered next comprises searching a data structure comprised of some character or word or phrase frequency data.

9. The method of claim 8 wherein the frequency data comprises n-gram frequency or probability data.

10. The method of claim 1, further including detecting a nearest neighboring command from a selection region of the release of the press; determining if the user most likely was intending to enter a nearest neighboring command; and substituting the nearest neighboring command for the command the user selected from the multidirectional button.

11. The method of claim 1, further including detecting one or more nearest neighboring commands; saving the neighboring commands in a data structure; substituting one or more of the saved neighboring commands for some commands input by the user to form one or more candidate command sequences; detecting if one of the command sequences is found in the dictionary or the data structure and comprises a valid command sequence; inputting the valid candidate command sequence to the device.

12. The method of claim 11, further comprising determining a distance from a position of the release of the press to a border of a neighboring selection region; determining some data corresponding to the determined distance to the nearest neighboring commands; saving the data in the data structure; and ranking the candidate commands by looping through the saved data in the data structure; using the data to rank the candidate commands.

13. The method of claim 11, wherein an angle from a position of the release of the press to a border of a neighboring selection region is saved corresponding to the nearest neighboring commands in the data structure; and wherein the method loops through the data structure to first check the commands with the smallest angles to check for a valid command sequence for the device.

14. The method of claim 1, wherein one or more of the multidirectional buttons are embedded in a candidate bar comprising autocorrect words and/or word predictions and/or word completions.

15. The method of claim 14, wherein the candidate bar comprises one or more multidirectional buttons comprising a prediction word in a center selection region and common variations of the prediction word in some outer selection regions of the buttons.

16. The method of claim 1 further comprising: finding a nearest neighboring multidirectional button; applying the detection of the direction of the press motion and the detection of the press motion exceeding the motion threshold to determine a corresponding selection in the neighboring button; inputting the command of the corresponding selection; whereby the user may miss pressing the intended multidirectional button and still input the command the user intended.

17. A computing device comprising: one or more display screens; one or more processors; and one or more programs, wherein the one or more programs are executed by the one or more processors, the one or more programs comprising: instructions for displaying and processing one or more virtual keyboards comprising four or more multidirectional keys concurrently displayed on one or more display screens; wherein each of the multidirectional keys comprises a plurality of commands; wherein one of the multidirectional keys comprises a center selection containing a command to input a common space character to the device; wherein the multidirectional button containing the space command comprises a third or greater of the height of the keyboard; whereby a user may expediently and accurately press a large key relative to the overall height of the keyboard to input the space character.

18. A computer implemented method for enabling a user to interact with an electronic device through a keyboard, the keyboard comprising at least 26 keys comprising the letters of the alphabet, with a least one of the keys comprising an embedded multidirectional button, the method comprising:

a. receiving one or more signals associated with one or more user presses on a top surface of the multidirectional button;

b. receiving some motion signals associated with some lateral user press motions;

c. detecting if the lateral press motions exceed one or more motion thresholds, wherein the motion thresholds comprising some thresholds of displacement or thresholds of force;

d. detecting one or more release signals associated with the user releasing the user presses of the multidirectional button;

e. determining a command for the device from a plurality of command choices, wherein the command is determined from the detections of the method comprising the detections of the press motions exceeding the motion thresholds and/or the detections of the user releasing the one or more user presses without the press motions having exceeded the motion thresholds;

f. inputting the command to the device;

whereby the user may type all the letters of the alphabet conventionally by tapping the keys, or the user may choose from the commands of the embedded multidirectional button with one or more press motions within the press and the release of the embedded multidirectional button.

* * * * *